US012681298B2

(12) United States Patent
Xu et al.

(10) Patent No.: US 12,681,298 B2
(45) Date of Patent: Jul. 14, 2026

(54) WAVEGUIDE BASED IMAGING SYSTEM FOR OBJECT TRACKING AND WAVEGUIDE BASED DISPLAY SYSTEM FOR REDUCING WORLD SIDE GHOST

(71) Applicant: Meta Platforms Technologies, LLC, Menlo Park, CA (US)

(72) Inventors: Jian Xu, Redmond, WA (US); Xiang Li, Redmond, WA (US); Miaomiao Xu, Redmond, WA (US); Xingzhou Tu, Redmond, WA (US); Shaobai Li, Redmond, WA (US); Xiayu Feng, Kirkland, WA (US); Wanli Chi, Sammamish, WA (US); Wai Sze Tiffany Lam, Lynnwood, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 124 days.

(21) Appl. No.: 18/608,831

(22) Filed: Mar. 18, 2024

(65) Prior Publication Data

US 2024/0345389 A1      Oct. 17, 2024

Related U.S. Application Data

(60) Provisional application No. 63/500,912, filed on May 8, 2023, provisional application No. 63/496,381, filed on Apr. 14, 2023.

(51) Int. Cl.
*G02B 27/00* (2006.01)
*F21V 8/00* (2006.01)

(52) U.S. Cl.
CPC ....... *G02B 27/0093* (2013.01); *G02B 6/0016* (2013.01); *G02B 6/0036* (2013.01); *G02B 6/0076* (2013.01)

(58) Field of Classification Search
CPC ......................... G02B 27/0093; G02B 6/0016; G02B 6/0036; G02B 6/0076
See application file for complete search history.

(56) References Cited

U.S. PATENT DOCUMENTS

| | | | |
|---|---|---|---|
| 10,234,686 B2 | 3/2019 | Vallius | |
| 10,241,332 B2 | 3/2019 | Vallius | |

(Continued)

FOREIGN PATENT DOCUMENTS

| | | |
|---|---|---|
| WO | 2020023266 A1 | 1/2020 |
| WO | 2020146451 A1 | 7/2020 |
| WO | 2020191224 A1 | 9/2020 |

OTHER PUBLICATIONS

Zhao J., et al., "Design of a High-Resolution Holographic Waveguide Eye-Tracking System Operating in Near-Infrared with Conventional Optical Elements," Optics Express, Jul. 19, 2021, vol. 29, No. 15, pp. 24536-24551.

(Continued)

*Primary Examiner* — Dmitriy Bolotin
(74) *Attorney, Agent, or Firm* — Greenberg Traurig, LLP

(57) ABSTRACT

A system is provided. The system includes a light source configured to emit a infrared ("IR") light for illuminating an object. The system also includes a waveguide imaging assembly including a waveguide, an in-coupling element disposed at a first portion of the waveguide, an out-coupling element disposed at a second portion of the waveguide, and an optical sensor disposed facing the out-coupling element. The in-coupling element is configured to couple the IR light reflected by the object into the waveguide, the waveguide is configured to guide the IR light to propagate toward the out-coupling element through total internal reflection, and the out-coupling element is configured to couple the IR light out of the waveguide toward the optical sensor. The optical (Continued)

sensor is configured to generate a tracking signal of the object based on the IR light output from the waveguide.

14 Claims, 30 Drawing Sheets

(56)                    References Cited

U.S. PATENT DOCUMENTS

| | | | |
|---|---|---|---|
| 10,466,478 B2 | 11/2019 | Klug et al. | |
| 10,983,341 B2 | 4/2021 | Geng et al. | |
| 11,300,789 B2 | 4/2022 | Dong et al. | |
| 11,953,696 B2 * | 4/2024 | Noui | G02B 27/0172 |
| 2018/0120563 A1 * | 5/2018 | Kollin | G03B 21/005 |
| 2020/0004019 A1 * | 1/2020 | Ishii | G02B 27/0977 |
| 2021/0026135 A1 * | 1/2021 | Ishii | G02B 27/0101 |
| 2021/0063765 A1 * | 3/2021 | Yang | H04N 13/337 |
| 2021/0096364 A1 * | 4/2021 | Kern | G02B 27/0081 |
| 2021/0141224 A1 * | 5/2021 | Kern | G02F 1/011 |
| 2021/0294106 A1 | 9/2021 | Meitav et al. | |
| 2021/0325677 A1 | 10/2021 | Gao et al. | |
| 2022/0004006 A1 | 1/2022 | Pfeiffer et al. | |
| 2022/0108458 A1 | 4/2022 | Vostrikov et al. | |
| 2022/0334395 A1 * | 10/2022 | Kim | G06T 19/006 |
| 2023/0393398 A1 * | 12/2023 | Oh | G02B 27/0172 |
| 2023/0408826 A1 * | 12/2023 | Oh | G02F 1/1368 |
| 2024/0111084 A1 * | 4/2024 | Groet | G02B 6/0041 |
| 2024/0168299 A1 | 5/2024 | Tu et al. | |
| 2024/0210611 A1 | 6/2024 | Xu et al. | |

OTHER PUBLICATIONS

International Preliminary Report on Patentability for International Application No. PCT/US2024/023681, mailed Oct. 23, 2025, 14 pages.
International Search Report and Written Opinion for International Application No. PCT/US2024/023681, mailed Oct. 14, 2024, 20 pages.

* cited by examiner

200

200

200

718

718

715-2

712

717

716

714

$P_B$ $P_V$

714

715-1

$P_{in}$

712

715-2

$P_{in}$ 715-1

1

WAVEGUIDE BASED IMAGING SYSTEM FOR OBJECT TRACKING AND WAVEGUIDE BASED DISPLAY SYSTEM FOR REDUCING WORLD SIDE GHOST

CROSS REFERENCE TO RELATED APPLICATIONS

This application claims the benefit of priority to U.S. Provisional Application No. 63/496,381, filed on Apr. 14, 2023, and to U.S. Provisional Application No. 63/500,912, filed on May 8, 2023. The contents of the above-referenced applications are incorporated by reference in their entirety.

TECHNICAL FIELD

The present disclosure relates generally to optical systems and, more specifically, to a waveguide based imaging system for object tracking, and a waveguide based display system for reducing a world side ghost.

BACKGROUND

An artificial reality system, such as a head-mounted display ("HMD") or heads-up display ("HUD") system, generally includes a near-eye display ("NED") system in the form of a headset or a pair of glasses configured to present content to a user via an electronic or optical display within, for example, about 10-20 mm in front of the eyes of a user. The NED system may display virtual objects or combine images of real objects with virtual objects, as in virtual reality ("VR"), augmented reality ("AR"), or mixed reality ("MR") applications. Object tracking devices, such as devices for tracking eyes and/or faces, have been implemented in a variety of technical fields, e.g., HUDs, HMDs, smart phones, laptops, televisions, vehicles, etc. For example, object tracking devices have been implemented in AR, VR, and/or MR applications. Through monitoring an eye, the surrounding region of the eye, and/or the face of a user, a three-dimensional ("3D") head pose, facial expressions, pupil positions, and eye gazes of the user may be tracked in real time, which can be used for various purposes, including, for example, adjusting display of content to the user, monitoring user's attention, physical and/or psychological status, etc.

In an AR or MR system, a user may view both images of virtual objects (e.g., computer-generated images ("CGIs")) and the surrounding environment by, for example, seeing through transparent display glasses or lenses. One example of an AR system may include a pupil-expansion waveguide display system, in which an image light representing a CGI may be coupled into a waveguide, propagate within the waveguide via totally internal reflection, and be coupled out of the waveguide at different locations to expand an effective pupil. The waveguide may also combine the image light representing the CGI and a light from a real-world environment, such that the virtual image may be superimposed with real-world images. The pupil-expansion waveguide display system may potentially offer an eye-glass form factor, a large field of view, a large effective pupil area, a small thickness, and a light weight.

SUMMARY OF THE DISCLOSURE

One aspect of the present disclosure provides a system that includes a light source configured to emit a infrared ("IR") light for illuminating an object. The system also includes a waveguide imaging assembly including a waveguide, an in-coupling element disposed at a first portion of the waveguide, an out-coupling element disposed at a second portion of the waveguide, and an optical sensor disposed facing the out-coupling element. The in-coupling element is configured to couple the IR light reflected by the object into the waveguide, the waveguide is configured to guide the IR light to propagate toward the out-coupling element through total internal reflection, and the out-coupling element is configured to couple the IR light out of the waveguide toward the optical sensor. The optical sensor is configured to generate a tracking signal of the object based on the IR light output from the waveguide.

Another aspect of the present disclosure provides a device that includes a waveguide configured to guide an image light to propagate inside the waveguide via total internal reflection ("TIR"). The device also includes an array of first mirrors embedded inside a first portion of the waveguide, and configured to split the image light into a plurality of redirected image lights propagating inside the waveguide. The device also includes an array of second mirrors embedded inside a second portion of the waveguide, and configured to couple the redirected image lights out of the waveguide as a plurality of output image lights. The device also includes an optical filter disposed at a surface of the waveguide and at least partially overlapping with the first portion of the waveguide. The optical filter is configured to deflect a light from a real-world environment incident onto the optical filter at an incidence angle greater than or equal to a predetermined angle back to the real-world environment.

Another aspect of the present disclosure provides a device that includes a waveguide configured to guide an image light to propagate inside the waveguide via total internal reflection ("TIR"). The device also includes an array of folding mirrors embedded inside the waveguide, and configured to split the image light into a plurality of redirected image lights propagating inside the waveguide. The device also includes an array of out-coupling mirrors embedded inside the waveguide, and configured to couple the redirected image lights out of the waveguide as a plurality of output image lights. Each folding mirror has a first surface facing the real-world environment and a second surface facing an eye-box region of the device, and the folding mirror is configured to substantially transmit a light from a real-world environment incident onto the second surface of the folding mirror at an incidence angle greater than or equal to a predetermined angle.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
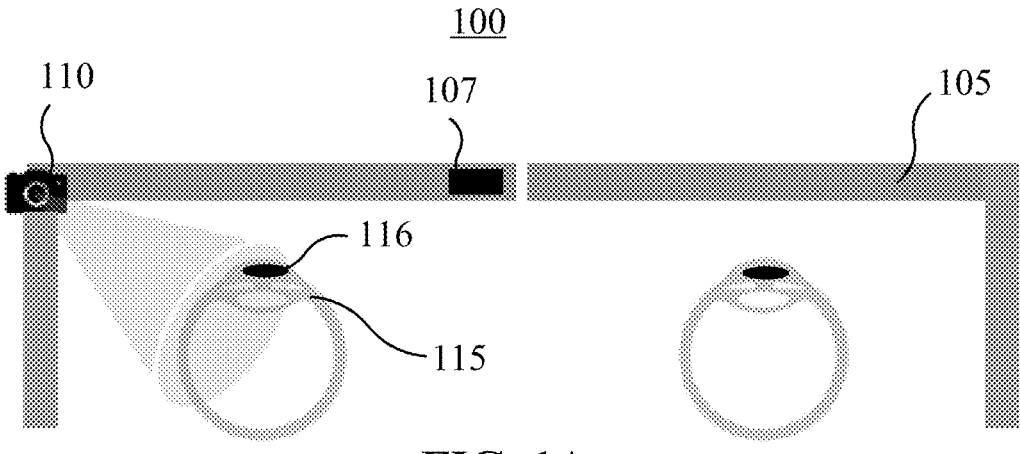
FIGS. 1A-1C illustrate schematic diagrams of a conventional eye tracking system used in an artificial reality device.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane.

The term "orthogonal" as in "orthogonal polarizations" or the term "orthogonally" as in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 95%, 90%, 85%, 80%, etc., which may be determined based on specific application needs.

Figure 1B:
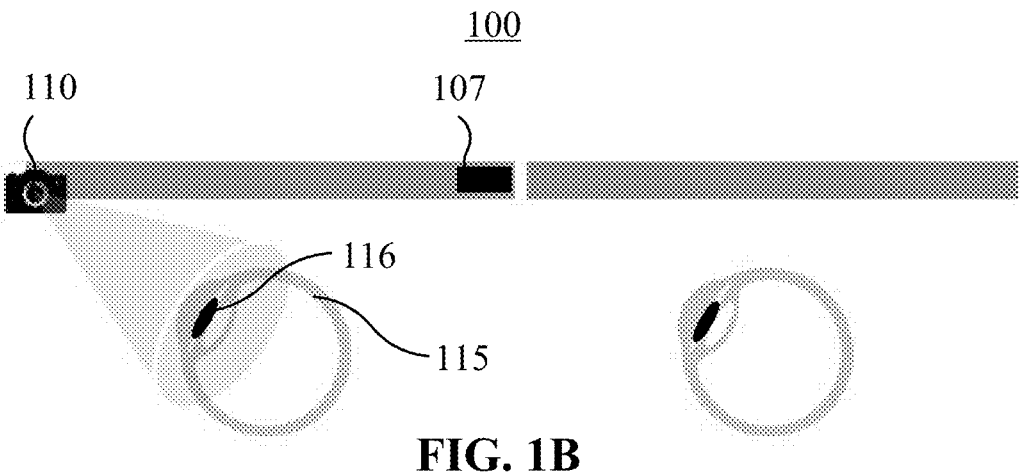
Figure 1C:
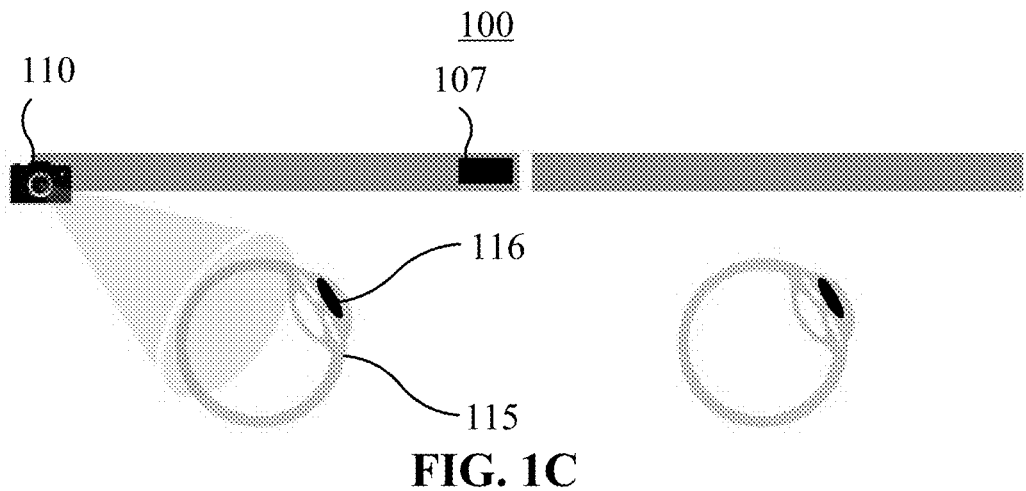

FIGS. 1A-1C illustrate schematic diagrams of a conventional eye tracking system 100 that is implemented into an artificial reality device. As shown in FIG. 1A, the artificial reality device may be in a form of eyeglasses or headset, which may include a frames 105 mounted to a user's head. The conventional eye tracking system 100 may include an infrared ("IR") light source 107 that emits an infrared light to illuminate an eye 115 of a user wearing the artificial reality device, such as a pupil 116, an iris, a sclera, the entire eye 115, etc. A camera 110 may be mounted on the frame of the eyeglasses or headset, arranged off-axis with respect to the eye 115 to receive the IR light reflected by the eye 115. The camera 110 may generate a tracking signal based on the received IR light. Based on the tracking signal, the camera 110 may generate an image of the eye 115, which may be used to extract eye tracking information relating to the eye 115, such as gaze direction, pupil location, movement direction, psychological state, etc.

The camera 110 disposed around the frame may provide an out-of-field imaging of the eye 115, and the tracking signal generated by the camera 110 may provide insufficient information for determining eye tracking information as the eye 115 moves or rotates away from the camera 110. As shown in FIG. 1B, when the eye 115 gazes substantially directly facing the camera 110, the tracking signal generated by the camera 110 may provide sufficient information for determining eye tracking information. In some cases, as shown in FIG. 1A, when the eye 115 gazes obliquely facing the camera 110, eye lashes may partially block the view of the camera 110. As shown in FIG. 1C, when the eye 115 gazes against the location of the camera 110, the view of the camera 110 may be completely or significantly blocked, and the view of the eye 115 (e.g., the entire pupil 116) may be completely or significantly lost. In FIGS. 1A-1C, the tracking signal generated by the camera 110 may provide insufficient information for determining eye tracking information, and the eye-tracking accuracy may be significantly degraded. Thus, the conventional eye tracking system 100 based on the out-of-field imaging of the eye 115 may not provide a high eye tracking accuracy, and the eye tracking range may be small.

Figure 2A:
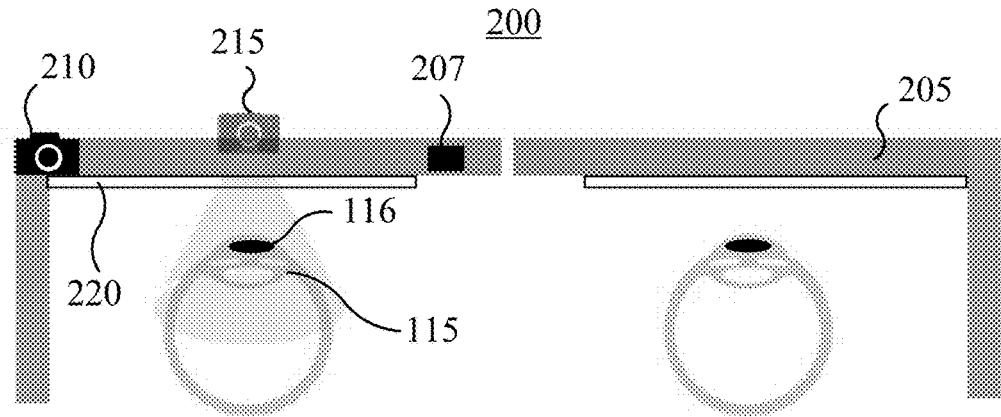
FIGS. 2A-2C illustrate schematic diagrams of an object tracking system, according to an embodiment of the present disclosure.
Figure 2B:
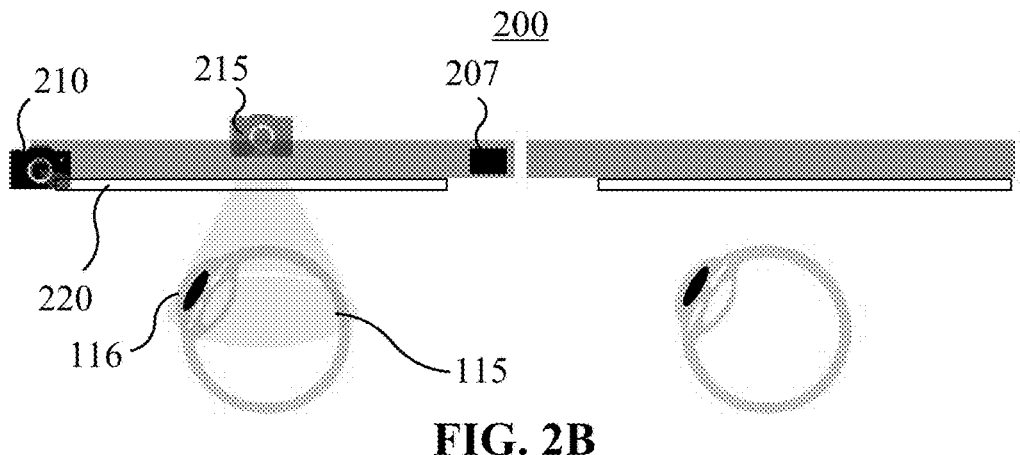
Figure 2C:
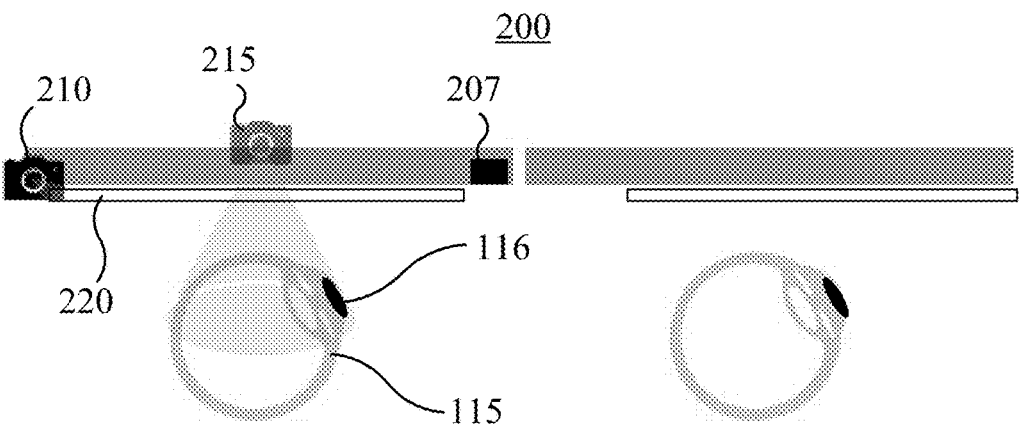

In view of the limitations in the conventional technologies, the present disclosure provides a waveguide (or light guide) based imaging system for object tracking (e.g., eye tracking and/or face tracking). FIGS. 2A-2C illustrate schematic diagrams of an eye tracking system 200 that may be implemented into an artificial reality device, according to an embodiment of the present disclosure. As shown in FIG. 2A, an IR light source 207 may emit an infrared light to illuminate the eye 115 of a user wearing the artificial reality device. An optical sensor (e.g., a camera) 210 may be mounted on a frame 205 of the eyeglasses or headset, and arranged off-axis with respect to the eye 115. A waveguide (or light guide) based imaging assembly 220 may bring the camera 210 virtually in front of the eye 115, forming a virtual, direct view camera 215 in front of the eye 115. The virtual, direct view camera 215 may provide an in-field imaging of the eye 115. "Field" in the phrases "out-of-field imaging" and "in-field imaging" refers to a field of view of an eye of a user when using a system or device including the elements that provide the out-of-field (or in-field) imaging of the eye 115.

As shown in FIGS. 2A-2C, when the eye 115 gazes obliquely facing, directly facing, or against the actual camera 210, the virtual, direct view camera 215 may constantly receive the IR light reflected by the eye 115 (e.g., the pupil 116), and the tracking signal generated by the virtual camera 215 may constantly provide sufficient information for determining eye tracking information. Compared to conventional camera based eye tracking systems, the disclosed eye tracking system 200 provides a larger tracking range when the eye 115 moves or rotates in the horizontal and/or vertical directions. Thus, the disclosed eye tracking system 200 enhances the accuracy of the eye tracking and improves the user experience.

Figure 3A:
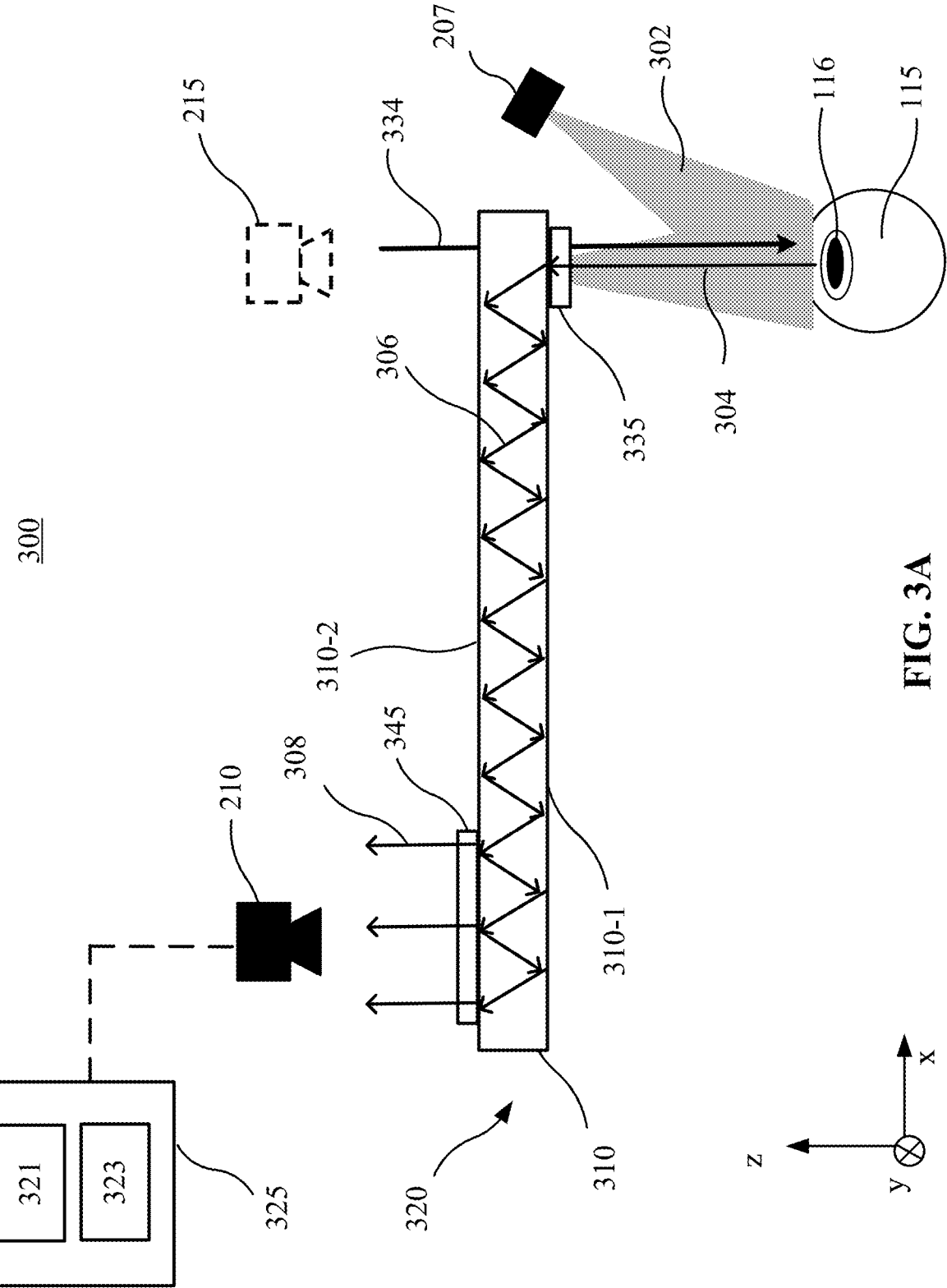
FIG. 3A illustrates a schematic diagram of an object tracking system, according to an embodiment of the present disclosure.

FIG. 3A illustrates an x-z sectional view (e.g., a top view) of an object tracking system (e.g., eye tracking system) 300, according to an embodiment of the present disclosure. For discussion purposes, the object tracking system 300 may also be referred to as an eye tracking (and face tracking) assembly 300. The eye tracking system 300 may be a detailed embodiment of the eye tracking system 200 shown in FIGS. 2A-2C. The eye tracking system 300 may be a part of a system (e.g., an HUD, an HMD, a smart phone, a laptop, or a television, etc.) for VR, AR, and/or MR applications.

The eye tracking system 300 may track a position, a movement, and/or a viewing direction of the eye pupil 116 when the eye 115 moves or rotates in the horizontal (e.g., x-axis direction and/or y-axis direction) and/or vertical directions (e.g., z-axis direction), with an enhanced eye tracking accuracy. In some embodiments, the eye tracking system 300 may measure the eye position and/or eye movement up to six degrees of freedom (i.e., 3D position, roll, pitch, and yaw) for each eye 115. In some embodiments, the eye tracking system 300 may measure a pupil size.

As shown in FIG. 3A, the eye tracking system 300 may include the light source 207 configured to emit a light 302 to illuminate one or both eyes 115 (and in some embodiments the face) of a user of the eye tracking system 300. The eye tracking system 300 may also include a waveguide (or light guide) imaging assembly 320 configured to generate an image of the eye 115 based on the light reflected by the eye 115. FIG. 3A shows one light source 207 and one eye 115 for illustrative purposes. It is understood that any suitable number of light sources 207 may be included, and components for tracking the eye 115 may be replicated for tracking the other eye of the user, which are not shown in FIG. 3A. The position of the light source 207 shown in FIG. 3A is for illustrative purposes, and the light source 207 may be arranged off-axis or on-axis with respect to the eye 115.

In some embodiments, the light source 207 may be positioned out of a line of sight of the user (e.g., above and in front of the eye 115). In some embodiments, the light source 207 may emit the light 302 in the IR spectrum. For example, the spectrum of the light 302 emitted by the light source 207 may be within, overlap, or encompass at least a portion of the IR spectrum. In some embodiments, the light source 207 may emit the light 302 in the near infrared ("NIR") spectrum, or any other spectrum such that the light 302 is not visible by the eye 115. IR lights are not visible to the human eyes and thus, do not distract the user during operations. The light 302 emitted by the light source 207 may be reflected as a light 304 by the pupil 116 of the eye 115, the entire eye 115, an area surrounding the pupil 116 or the eye 115, including the eye lid and/or the facial skins or other tissues around or inside the eye 115. For discussion purposes, the light reflected by such regions in or around the pupil 116 or the eye 115 is simply referred to as a light reflected by the eye 115. In some embodiments, the light source 207 may be configured to provide a structured light to illuminate the eye 115, or a structured illumination (or structured light pattern) to the eye 115. The structured illumination may increase the tracking accuracy of the eye 115. In some embodiments, the structured illumination may also enable the depth reconstruction of a tracked object, such as the face. The structured light may include at least one of an intensity-based structured light or a polarization-based structured light.

The waveguide imaging assembly 320 may include a waveguide (or light guide) 310, an in-coupling element 335, an out-coupling element 345, and the optical sensor 210. The optical sensor 210 may be disposed obliquely with respect to the line of sight of the eye 115. For example, the facing direction of the optical sensor 210 may not be parallel with the normal of the surface of the waveguide 310. The waveguide 310 may include a first surface or side 310-1 facing the eye 115, and a second surface or side 310-2 opposite to the first surface 310-1. Each of the in-coupling element 335 and the out-coupling element 345 may be disposed at the first surface 310-1 or the second surface 310-2 of the waveguide 310. FIG. 3A shows that the optical sensor (e.g., a camera) 210 and the eye 115 are disposed at different sides of the waveguide 310. The positions of the optical sensor (e.g., a camera) 210 and the eye 115 shown in FIG. 3A are for illustrative purposes. In some embodiments, the optical sensor (e.g., a camera) 210 and the eye 115 may be disposed at different locations on the same side of the waveguide 310.

In some embodiments, as shown in FIG. 3A, the in-coupling element 335 may be disposed at the first surface 310-1 of the waveguide 310, and the out-coupling element 345 may be disposed at the second surface 310-2 of the waveguide 310. In some embodiments, the in-coupling element 335 may be disposed at the second surface 310-2 of the waveguide 310, and the out-coupling element 345 may be disposed at the first surface 310-1 of the waveguide 310. In some embodiments, both of the in-coupling element 335 and the out-coupling element 345 may be disposed at the first surface 310-1 or at the second surface 310-2 of the waveguide 310. In some embodiments, the in-coupling element 335 or the out-coupling element 345 may be integrally formed as a part of the waveguide 310 at the corresponding surface(s). In some embodiments, the in-coupling element 335 or the out-coupling element 345 may be separately formed, and may be disposed at (e.g., affixed to) the corresponding surface(s).

The in-coupling element 335 and the out-coupling element 345 may operate in a predetermined wavelength range or spectrum that includes at least a portion of the IR spectrum, and may not operate in the visible spectrum. That is, the in-coupling element 335 and the out-coupling element 345 may deflect an IR light when the IR light satisfies a predetermined condition, while functioning as a transparent plate for visible lights without any deflection.

The in-coupling element 335 may be disposed at a first portion (e.g., an input portion) of the waveguide 310, and the out-coupling element 345 may be disposed at a second, different portion (e.g., an output portion) of the waveguide 310. The first portion (e.g., input portion) of the waveguide 310 may be closer to the eye 115 than the second, different portion (e.g., output portion) of the waveguide 310. The in-coupling element 335 may be disposed facing the eye 115, e.g., substantially directly facing the eye 115. The in-coupling element 335 may be positioned in a line of sight of the user. The in-coupling element 335 may be configured to couple, via deflection, the light 304 reflected by the eye 115 into the waveguide 310 as an in-coupled light 306 propagating inside the waveguide 310 toward the out-coupling element 345 via total internal reflection ("TIR").

The out-coupling element 345 may be disposed obliquely with respect to the line of sight of the eye 115. For example, the out-coupling element 345 may be disposed at a location that is off-axis with respect to the eye 115. The out-coupling element 345 may be positioned out of a line of sight of the eye 115. The out-coupling element 345 may be disposed facing the optical sensor 210, and configured to couple, via deflection, the in-coupled light 306 out of the waveguide 310 as one or more output lights 308 propagating toward the optical sensor 210. For illustrative purposes, FIG. 3A merely shows the light propagation path of a central ray of the light 304 inside the waveguide 310.

In some embodiments, each of the in-coupling element 335 and the out-coupling element 345 may include one or more diffraction gratings, one or more cascaded reflectors, one or more prismatic surface elements, and/or an array of holographic reflectors, or any combination thereof. In some embodiments, each of the in-coupling element 335 and the out-coupling element 345 may include a diffraction grating, such as a surface relief grating, a volume hologram, a polarization selective grating, a metasurface grating, or any combination thereof. Examples of polarization selective gratings may include a holographic polymer-dispersed liquid crystal ("H-PDLC") grating, a surface relief grating provided (e.g., filled) with LCs, a Pancharatnam-Berry phase ("PBP") grating, a polarization volume hologram ("PVH") grating, etc.

In some embodiments, the diffraction grating may be a reflective grating configured to backwardly diffract an IR light when the IR light satisfies a predetermined condition. In some embodiments, the diffraction grating may be a transmissive grating configured to forwardly diffract an IR light when the IR light satisfies a predetermined condition. The diffraction grating may be polarization selective, or polarization non-selective. In some embodiments, a period of the diffraction grating included in the in-coupling element 335 may be configured to enable TIR of the reflected light 304 within the waveguide 310. In some embodiments, a period of the diffraction grating included in the out-coupling element 345 may be configured to couple the in-coupled light 306 propagating inside the waveguide 310 through TIR out of the waveguide 310 via diffraction. In some embodiments, the diffraction grating in the in-coupling element 335 and/or the out-coupling element 345 may be configured with a substantially high diffraction efficiency for the IR light, such that the waveguide imaging assembly 320 may have a high overall efficiency.

The waveguide 310 may include one or more materials configured to facilitate the TIR of the in-coupled light 306. The waveguide 310 may include, for example, a plastic, a glass, and/or polymers. The waveguide 310 may have a relatively small form factor.

The optical sensor 210 may be disposed facing the output region of the waveguide 310, and facing the out-coupling element 345. The optical sensor 210 may be positioned out of a line of sight of the user, and may be disposed at locations that are off-axis with respect to the eye 115. The optical sensor 210 may be configured to generate images based on lights having a wavelength within a predetermined wavelength range or spectrum that includes at least a portion of the IR spectrum. In some embodiments, the optical sensor 210 may be configured to generate images based on IR lights but not visible lights. In some embodiments, the optical sensor 210 may include a camera, or a photodiode, etc., such as one or more of a charge-coupled device ("CCD") camera, a complementary metal-oxide-semiconductor ("CMOS") sensor, an N-type metal-oxide-semiconductor ("NMOS") sensor, a pixelated polarized camera, or any other optical sensors. In some embodiments, the optical sensor 210 may also be referred to as an imaging device.

The optical sensor 210 may be configured to receive the one or more output lights 308. The output light 308 may also be referred to as a signal light for determining the eye tracking information of the eye 115. For illustrative purposes, FIG. 3A shows that the optical sensor 210 is disposed at a side of the waveguide 310 opposite to the side where the eye 115 is located. In some embodiments, the optical sensor 210 and the eye 115 may be disposed at the same side of the waveguide 310. For illustrative purposes, FIG. 3A shows that the optical sensor 210 receives a single signal light 308. In some embodiments, the optical sensor 210 may receive a plurality of signal lights 308.

The eye tracking system 300 may generate a tracking signal or data based on the received signal light 308 for eye tracking (referred to as eye tracking signals, information, or data). The eye tracking system 300 may analyze or process the signal light 308 to generate the eye tracking information. In some embodiments, the optical sensor 210 may include a processor configured to process the received signal light 308 to generate an image of the eye 115. In some embodiments, the optical sensor 210 may further analyze the generated image of the eye 115 to obtain information that may be used for eye tracking and other purposes, such as for determining what information to present to the user, for configuring the layout of the presentation of the information, for addressing vergence-accommodation conflict, etc. In some embodiments, the optical sensor 210 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any methods disclosed herein.

In some embodiments, the processor and the non-transitory computer-readable medium may be provided separately from the optical sensor 210. For example, the eye tracking system 300 may include a controller 325 communicatively connected with the optical sensor 210 and configured to receive data from the optical sensor 210. The controller 325 may include a processor or processing unit 321 and a storage device 323. The processor 321 may be any suitable processor, such as a central processing unit ("CPU"), a graphic processing unit ("GPU"), etc. The storage device 323 may be a non-transitory computer-readable medium, such as a memory, a hard disk, etc. The storage device 323 may be configured to store data or information, including computer-executable program instructions or codes, which may be executed by the processor 321 to perform various controls or functions of the methods or processes disclosed herein. For example, the controller 325 may be configured to analyze the data (e.g., signals) received from the optical sensor 210 to obtain information for eye tracking or other purposes.

In the disclosed eye tracking system 300, the optical sensor 210 may be disposed facing the output region of the waveguide 310, and disposed obliquely or off-axis with respect to the eye 115 to provide an out-of-field imaging of the eye 115. The waveguide 310 coupled with the in-coupling element 335 and the out-coupling element 345 may guide the light 304 reflected from the eye 115 to the optical sensor 210, thereby virtually moving the optical sensor 210 from facing the output region of the waveguide 310 to a spatial location right in front of and facing the input region of the waveguide 310 where the eye 115 is located. As shown in FIG. 3A, a virtual, direct view optical sensor (e.g., virtual camera) 215 is created right in front of the input region of the waveguide 310, as if the actual optical sensor 210 is disposed right in front of the input region facing the eye 115. Therefore, an in-field imaging of the eye 115 is provided.

When the eye 115 gazes obliquely facing, directly facing, or against the optical sensor 210, the virtual camera 215 may constantly receive the light 304 reflected by the eye 115, e.g., the pupil 116, the iris, the sclera, the entire eye, the area surrounding the eye 115, including the eye lid and/or the facial skins or other tissues around or inside the eye 115. Thus, the tracking signal generated by the virtual camera 215 may constantly provide sufficient information for determining eye tracking information. Accordingly, the eye tracking range may be expanded, and the eye tracking accuracy may be increased. In some embodiments, the optical sensor 210 may be configured with a large depth of field, e.g., greater than 2 centimeters (e.g., along a z-axis direction). Thus, the optical sensor 210 may provide a tracking signal that includes the depth information of the eye 115 (and/or the face).

As the eye 115 often provides a diffusive reflection when illuminated by the light 302, the in-coupling element 335 configured with a small size may still receive the diffusive reflection from the eye 115 when the eye 115 moves or rotates in the horizontal (e.g., x-axis direction and/or y-axis direction) and/or vertical directions (e.g., z-axis direction). In some embodiments, the width of the in-coupling element 335 (e.g., along the width direction of the waveguide 310, e.g., the x-axis direction) may be configured to be at the sub-millimeter level, such as 200-300 micrometers, 300-400 micrometers, 400-500 micrometers, or 500-600 micrometers, etc. The length of the in-coupling element 335 (e.g., along the length direction of the waveguide 310, e.g., the y-axis direction) may be configured to be comparable with (e.g., the same as or slightly smaller than) the size of the length of the waveguide 310. The in-coupling element 335 having the sub-millimeter width may be substantially invisible to the eye 115. In addition, the width of the in-coupling element 335 may be at the sub-millimeter level, such that the in-coupled light 306 may propagate inside the waveguide 310 via TIR toward the out-coupling element 345, without interacting with the in-coupling element 335 again and being coupled out of the waveguide 310 by the in-coupling element 335. Thus, the optical efficiency at the input side of the waveguide 310 (or the input efficiency of the in-coupling element 335) is improved. In addition, both of the in-coupling element 335 and the out-coupling element 345 may be configured with a substantially high coupling efficiency for the IR light, such that the waveguide imaging assembly 320 may have a high overall efficiency.

In some embodiments, when the eye tracking system 300 is implemented in various systems for AR and/or MR applications, a visible polychromatic light 334 coming from a real-world environment may be incident onto the waveguide 310. The visible polychromatic light 334 may be diffracted, refracted, and/or reflected by a diffractive element having an operation wavelength range in the visible spectrum, causing a multicolored glare in a see-through view, especially when a user wearing the NED, HUD, or HMD looks at a bright light source from certain angles. Such a see-through artifact is referred to as a rainbow effect, which may degrade the image quality of the see-through view. As each of the in-coupling element 335 and the out-coupling element 345 deflects an IR light when the IR light satisfies a predetermined condition, while functioning as a transparent plate for visible lights without any deflection, the in-coupling element 335 and the out-coupling element 345 may not diffract, refract, and/or reflect the visible polychromatic light 334. Thus, the waveguide 310 coupled with the in-coupling element 335 and the out-coupling element 345 may substantially transmit the visible polychromatic light 334 without degrading the image quality of the see-through view.

In some embodiments, as shown in FIG. 3A, both the in-coupling element 335 and the out-coupling element 345 may be transmissive gratings. The in-coupling element 335 may be configured to couple, via forward diffraction, the light 304 reflected by the eye 115 into the waveguide 310 as the in-coupled light 306 propagating inside the waveguide 310 toward the out-coupling element 345 via TIR. The out-coupling element 345 may be configured to couple, via forward diffraction, the in-coupled light 306 out of the waveguide 310 as one or more output lights 308 propagating toward the optical sensor 210.

Figure 3B:
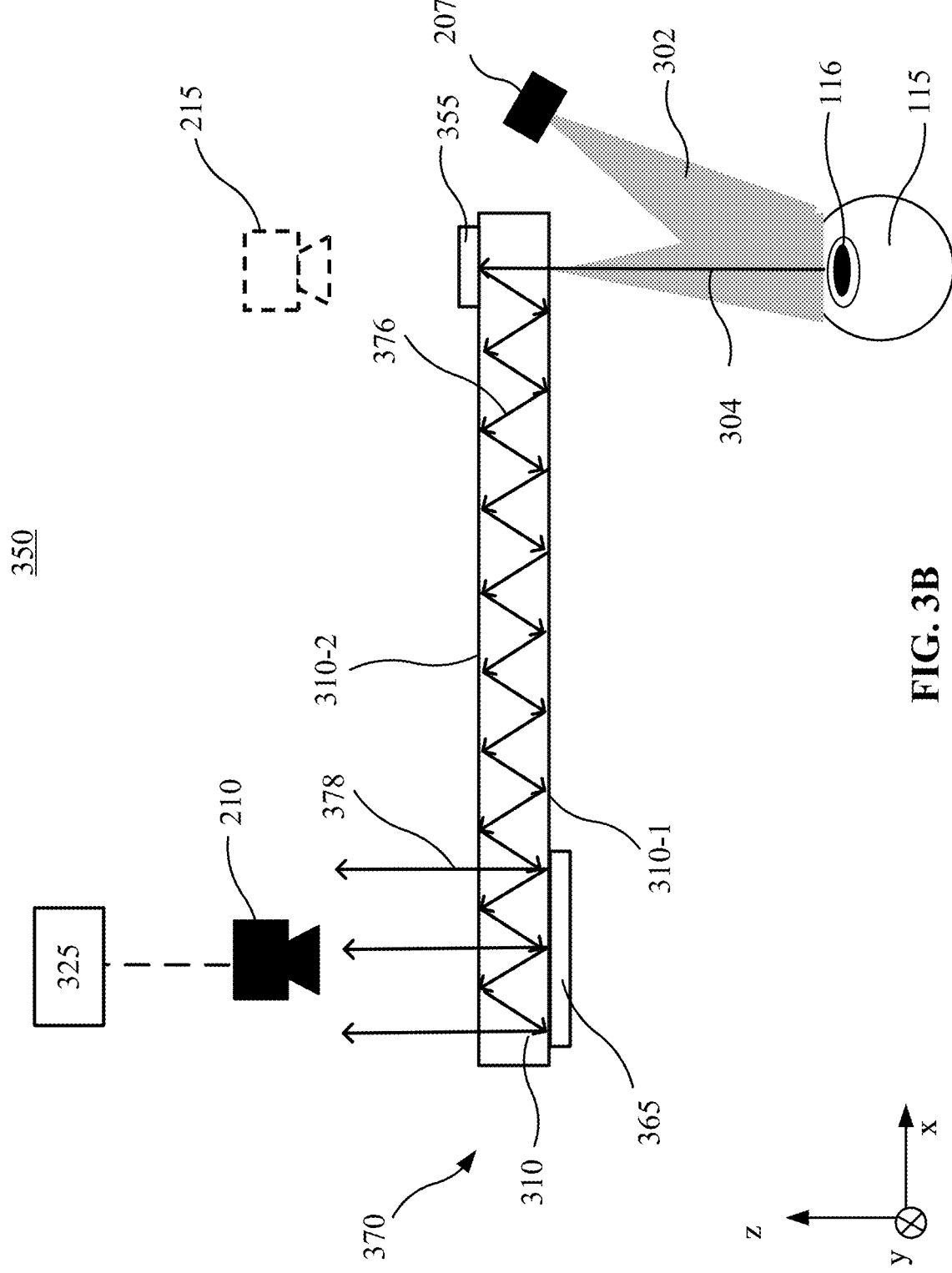
FIG. 3B illustrates a schematic diagram of an object tracking system, according to an embodiment of the present disclosure.

In some embodiments, both of the in-coupling element 335 and the out-coupling element 345 may be reflective gratings. In some embodiments, one of the in-coupling element 335 and the out-coupling element 345 may be a reflective grating, and the other one of the in-coupling element 335 and the out-coupling element 345 may be a transmissive grating. FIG. 3B illustrates an x-z sectional view (e.g., a top view) of an object tracking system (e.g., eye tracking system) 350, according to an embodiment of the present disclosure. For discussion purposes, the object tracking system 350 may also be referred to as an eye tracking (and face tracking) assembly 350. The eye tracking system 350 may be a detailed embodiment of the eye tracking system 200 shown in FIGS. 2A-2C. The eye tracking system 350 may include elements, structures, and/or functions that are the same as or similar to those included in the eye tracking system 300 shown in FIG. 3A. Detailed descriptions of the same or similar elements, structures, and/or functions may refer to the above descriptions rendered in connection with FIGS. 2A-2C and FIG. 3A.

As shown in FIG. 3B, the eye tracking system 350 may include the light source 207, and a waveguide (or light guide) imaging assembly 370. The waveguide imaging assembly 370 may include the waveguide (or light guide) 310, an in-coupling element 355 and an out-coupling element 365, and the optical sensor 210. The in-coupling element 355 may be disposed at the second surface 310-2 of the waveguide 310, and the out-coupling element 365 may be disposed at the first surface 310-1 of the waveguide 310. Both of the in-coupling element 355 and the out-coupling element 365 may be reflective gratings. The in-coupling element 355 may be configured to couple, via backward diffraction, the light 304 reflected by the eye 115 into the waveguide 310 as an in-coupled light 376 propagating inside the waveguide 310 toward the out-coupling element 365 via TIR. The out-coupling element 365 may be configured to couple, via backward diffraction, the in-coupled light 376 out of the waveguide 310 as one or more output lights 378 propagating toward the optical sensor 210. For discussion purposes, FIG. 3B merely shows the light propagation path of a central ray of the light 304 inside the waveguide 310.

The elements in the illumination systems and the features of the eye tracking system as described in various embodiments may be combined in any suitable manner. For example, in the embodiment shown in FIG. 3A, the in-coupling element 335 may be replaced by the in-coupling element 355 shown in FIG. 3B, such that the eye tracking system may include a reflective in-coupling grating 355 and a transmissive out-coupling grating 345 both disposed at the first surface 310-1 of the waveguide 310. As another example, in the embodiment shown in FIG. 3A, the out-coupling element 345 may be replaced by the out-coupling element 365 shown in FIG. 3B, such that the eye tracking system may include a transmissive in-coupling grating 335 and a reflective out-coupling grating 365.

In some embodiments, at least one of the in-coupling element 335, the out-coupling element 345, the in-coupling element 355, or the out-coupling element 365 may include a liquid crystal polarization hologram ("LCPH") element. Liquid crystal polarization holograms ("LCPHs") refer to the intersection of liquid crystal devices and polarization holograms. LCPHs have features such as small thickness (about 1 μm), light weight, compactness, large aperture, high efficiency, simple fabrication, etc. Thus, LCPHs have gained increasing interests in optical device and system applications. Detailed descriptions of the LCPH elements may refer to the descriptions rendered in connection with FIGS. 7A-8B.

The configurations of the object tracking system 300 shown in FIG. 3A or the object tracking system 350 shown in FIG. 3B are used as an example structure in illustrating and explaining the operation principles of using any disclosed waveguide imaging system to provide an in-field imaging of an object, and to enhance the tracking range and tracking accuracy of the object. The design principles may be applicable to any suitable object tracking systems other than the disclosed object tracking system 300 shown in FIG. 3A or the object tracking system 350 shown in FIG. 3B.

The disclosed object tracking system may have numerous applications in a large variety of fields, e.g., NEDs, HUDs, HMDs, smart phones, laptops, televisions, vehicles, etc. For example, the disclosed optical systems may be implemented in various systems for augmented reality ("AR"), virtual reality ("VR"), and/or mixed reality ("MR") applications, to determine what content to provide to the user, to solve the vergence-accommodation conflict, to enable pupil steered AR, VR, and/or MR display systems (including, but not limited to, holographic near eye displays, retinal projection eyewear, and wedged waveguide displays), etc. The disclosed object tracking systems may be implemented in sensing modules to extend the detecting range of the sensors, increase detecting resolution or accuracy of the sensors, and/or reduce the signal processing time.

Figure 4A:
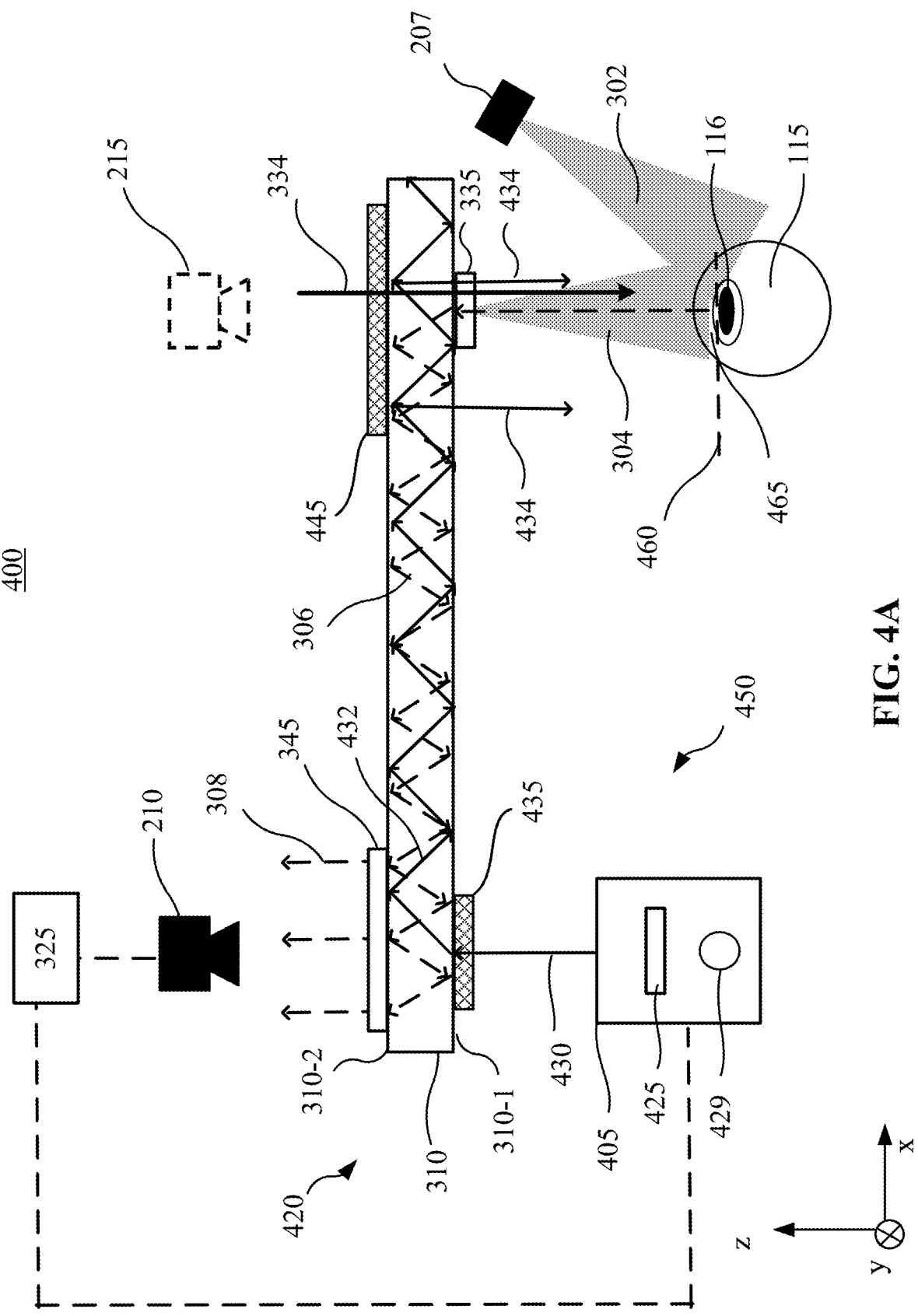
FIG. 4A illustrates a schematic diagram of an optical system including a display assembly and an eye tracking assembly, according to an embodiment of the present disclosure.

FIG. 4A illustrates an x-z sectional view of an optical system 400, according to an embodiment of the present disclosure. The optical system 400 may be a part of a system (e.g., an NED, an HUD, an HMD, a smart phone, a laptop, or a television, etc.) for VR, AR, and/or MR applications. As shown in FIG. 4A, the optical system 400 may include an object tracking assembly 420 and a waveguide (or light guide) display assembly 450. For discussion purposes, the object tracking assembly 420 may also be referred to as an eye tracking (and face tracking) assembly 420. The eye tracking assembly 420 may be an embodiment of the eye tracking systems disclosed herein, such as the eye tracking system 200 shown in FIGS. 2A-2C, the eye tracking system 300 shown in FIG. 3A, or the eye tracking system 350 shown in FIG. 3B. Detailed descriptions of the same or similar elements, structures, and/or functions may refer to the above descriptions rendered in connection with FIGS. 2A-3B.

As shown in FIG. 4A, for discussion purposes, the eye tracking assembly 420 may be similar to the eye tracking system 300 shown in FIG. 3A. For example, the eye tracking assembly 420 may include the light source 207, and the waveguide imaging assembly including the waveguide (or light guide) 310 coupled with the in-coupling element 335 and the out-coupling element 345, and the optical sensor 210. The light source 207 may be configured to emit the IR light 302 toward the eye 115. The waveguide 310 coupled with the in-coupling element 335 and the out-coupling element 345 may be configured to guide the IR light 304 reflected from the eye 115 toward the optical sensor 210, thereby providing the virtual, direct view camera 215 in front of the eye 215. Based on the one or more IR lights 308 output from the out-coupling element 345, the optical sensor 210 may generate one or more images of the eye 115, which include the eye (and face) tracking information. In FIG. 4A, an IR light is denoted by a dashed line with an arrow.

The waveguide display assembly 450 may be a pupil-replication (or pupil-expansion) display assembly, in which an image light representing virtual objects (e.g., computer-generated images ("CGIs")) may be coupled into a waveguide (or light guide), propagate within the waveguide, and be coupled out of the waveguide at different locations to expand an effective pupil. The waveguide display assembly 450 may offer eye-glasses form factors, a moderately large field of view ("FOV"), a high transmittance, and a large eye-box. As shown in FIG. 4A, the waveguide display assembly 450 may include a light source assembly 405, the waveguide 310 coupled with an in-coupling element 435 and an out-coupling element 445, and the controller 325. In the embodiment shown in FIG. 4A, the waveguide display assembly 450 and the eye tracking assembly 420 share the waveguide 310 and the controller 325. In some embodiments, the waveguide display assembly 450 and the eye tracking assembly 420 may have individual or separate waveguides and/or individual or separate controllers. The waveguide display assembly 450 may include the waveguide 310, the in-coupling element 435 and the out-coupling element 445, and the eye tracking assembly 420 may include the waveguide 310, the in-coupling element 335 and the out-coupling element 345. The in-coupling element 435 may be configured to couple a visible image light into the waveguide 310, and the out-coupling element 445 may be configured to couple the visible image light out of the waveguide 310 toward the eye 115 to provide a virtual image for the user to view. The in-coupling element 335 may be configured to couple a non-visible infrared light reflected from the eye 115 into the waveguide 310, and the out-coupling element 345 may be configured to couple the infrared light out of the waveguide 310 toward the optical sensor 210 for eye tracking purposes.

The light source assembly 405 may generate and output an image light (e.g., a visible light representing a virtual image) 430 propagating toward the in-coupling element 435. In FIG. 4A, a visible light is denoted by a solid line with an arrow. The waveguide 310 coupled with the in-coupling element 435 and the out-coupling element 445 may expand and direct the image light 430 to the eye 115 positioned in an eye-box 460 of the waveguide display assembly 450. The eye-box 460 is a region in space where an eye pupil 116 of the eye 115 of a user can perceive the full extent of the virtual image delivered by the waveguide 310 from the light source assembly 405. An exit pupil 465 may be a location where the eye 115 is positioned in the eye-box 460.

As shown in FIG. 4A, the light source assembly 405 may include a light source 429 and a light conditioning system 425. In some embodiments, the light source 429 may be a light source configured to generate a coherent or partially coherent visible light. In some embodiments, the light source 429 may be a display panel. The light conditioning system 425 may include one or more optical components configured to condition the light from the light source 429. For example, the controller 325 may control the light conditioning system 425 to condition the light from the light source 429, which may include, e.g., transmitting, attenuating, expanding, collimating, and/or adjusting orientation of the light.

The in-coupling element 435 may be disposed at the second portion of the waveguide 310. That is, both of the in-coupling element 435 for the visible image light and the out-coupling element 345 for the IR light may be disposed at the second portion of the waveguide 310. The in-coupling element 435 for the visible image light 430 and the out-coupling element 345 for the IR light may be disposed at the same surface or different surfaces of the waveguide 310. The out-coupling element 445 may be disposed at the first portion of the waveguide 310. That is, both the out-coupling element 445 for the visible image light and the in-coupling element 335 for the IR light may be disposed at the first portion of the waveguide 310. The out-coupling element 445 for the visible image light and the in-coupling element 335 for the IR light may be disposed at the same surface or different surfaces of the waveguide 310.

In some embodiments, each of the in-coupling element 435 and the out-coupling element 445 may have a designed operating wavelength band that includes at least a portion of the visible wavelength band. In some embodiments, the designed operating wavelength band of each of the in-coupling element 435 and the out-coupling element 445 may not include the IR wavelength band. For example, each of the in-coupling element 435 and the out-coupling element 445 may be configured to deflect a visible light, and transmit an IR light without a deflection or with negligible deflection.

The image light 430 output from the light source assembly 405 may propagate toward the in-coupling element 435 disposed at the second portion of the waveguide 310. The in-coupling element 435 may couple the image light 430 into the waveguide 310 as an in-coupled image light 432, which may propagate inside the waveguide 310 through TIR along the pupil expansion direction (e.g., an x-axis direction) toward the out-coupling element 445 located at the first portion of the waveguide 310. The out-coupling element 445 may couple the in-coupled image light 432, which is incident onto different portions of the out-coupling element 445, out of the waveguide 310 as a plurality of output image lights 434 propagating toward the eye-box 460. Each output image light 434 may include the same image content as the input image light 430 and, thus, the waveguide display assembly 450 may provide pupil replication (or pupil expansion) at a side of the waveguide 310 where the eye 115 is located.

In some embodiments, the waveguide 310 coupled with the in-coupling element 435 and the out-coupling element 445 may also function as an image combiner (e.g., AR or MR combiner). The waveguide 310 may combine the image light 432 representing a virtual image and the light 334 from the real world environment (or a real world light 334), such that the virtual image may be superimposed with real-world image. As the in-coupling element 335 and the out-coupling element 345 are configured for the IR light rather than the visible light, the in-coupling element 335 and the out-coupling element 345 may not alter the propagation path of the visible light. For example, the in-coupling element 335 for the IR light may substantially transmit both of the output image light 434 coupled out from the waveguide 310 and the real world light 334, without deflection or with negligible deflection. The image light 434 and the real world light 334 may propagate through the in-coupling element 335 toward the eye 115.

As shown in FIG. 4A, as the in-coupled image light 432 propagates inside the waveguide 310 via TIR, the in-coupled image light 432 may be incident onto a plurality of different portions of the out-coupling element 445. The out-coupling element 445 may couple the in-coupled image light 432 out of the waveguide 310 at the different portions as the multiple out-coupled (or output) lights 434, thereby expanding an effective pupil of the waveguide display assembly 450. For illustrative purposes, FIG. 4A shows a 1D pupil replication in the x-axis direction. For the pupil replication purpose, in the width direction (or the pupil expansion or replication direction) of the waveguide 310 (e.g., the x-axis direction), the width of the in-coupling element 435 for the IR light may be configured to be much smaller than the width of the out-coupling element 445 for the visible image light. For example, the width of the in-coupling element 435 for the IR light may be less than one third, one fourth, one fifth, one sixth, one seventh, one eighth, one ninth, or one tenth of the width of the out-coupling element 445 for the visible image light.

In some embodiments, the width of the out-coupling element 445 for the visible image light may be configured to be at least comparable with (e.g., the same as or slightly larger than) the size of the eye pupil 116. The size of the eye pupil 116 of an average adult user may vary in a range of 4-8 millimeters ("mm") in diameter when dilated (e.g., when in dark), or vary in a range of 2-4 mm in diameter when constricted (e.g., when in bright light). In other words, the size of the eye pupil 116 may vary in the range of 2-8 mm depending on the light intensity (or brightness) of the image light.

Figure 4B:
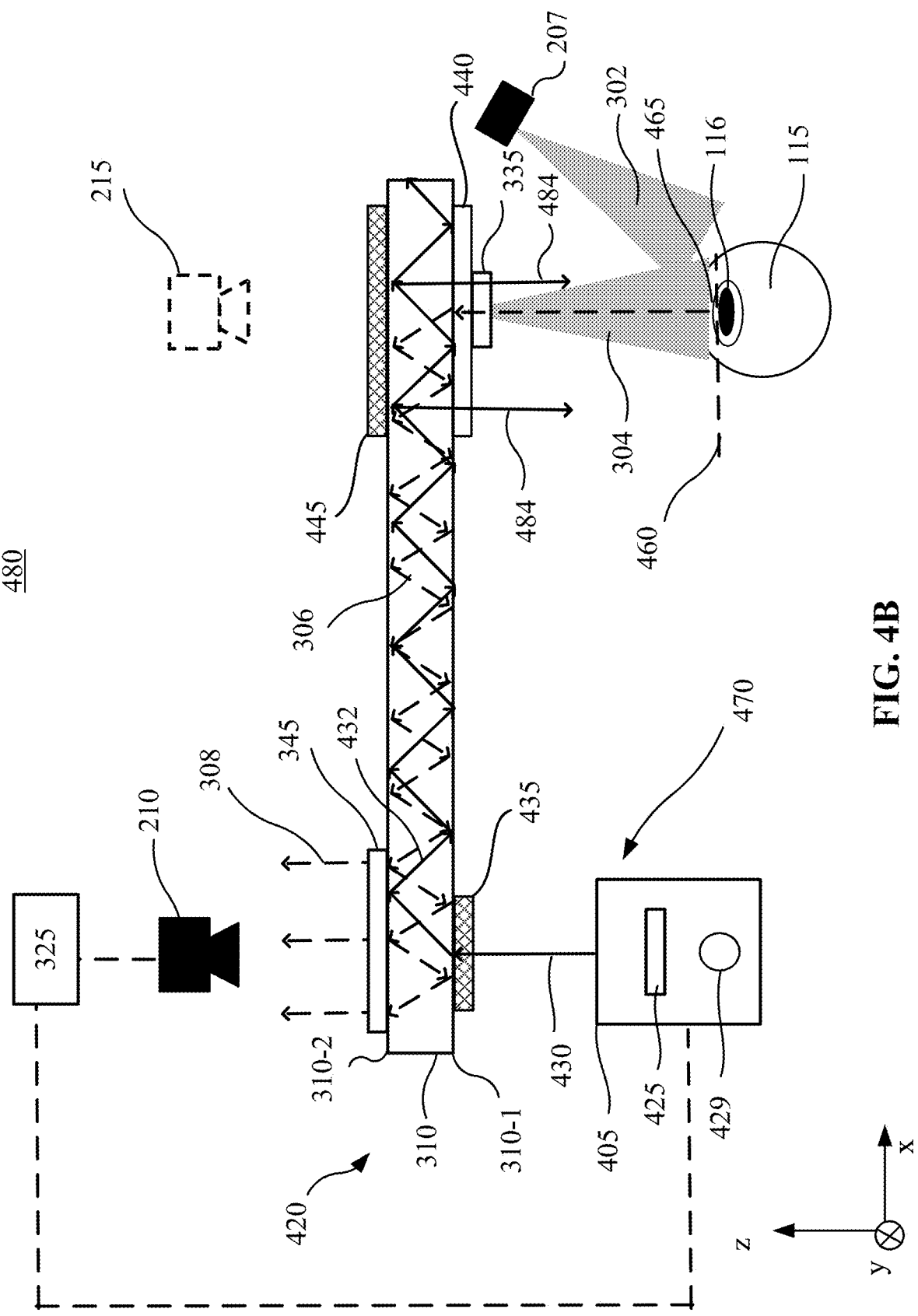
FIG. 4B illustrates a schematic diagram of an optical system including a display assembly and an eye tracking assembly, according to an embodiment of the present disclosure.

In some embodiments, to realize a 2D pupil replication (e.g., in the x-axis direction and the y-axis direction), as shown in an optical system 480 in FIG. 4B, a redirecting element 440 may be coupled to the waveguide 310, and configured to redirect the in-coupled image light 432 to the out-coupling element 445. In FIG. 4B, for illustrative purposes, the waveguide display assembly is referred to as 470, and the image light out-coupled by the out-coupling element 445 is referred to as 484. The out-coupling element 445 may couple the in-coupled image light 432 out of the waveguide 310. The redirecting element 440 may be configured to expand the input image light 430 in a first direction, e.g., the y-axis direction, and the out-coupling element 445 may be configured to expand the input image light 430 in a second, different direction, e.g., the x-axis direction. In some embodiments, the redirecting element 440 may be arranged at a location of the waveguide 310 opposing the location of the out-coupling element 445. For example, in some embodiments, the redirecting element 440 may be integrally formed as a part of the waveguide 310 at the corresponding surface. In some embodiments, the redirecting element 440 may be separately formed and disposed at (e.g., affixed to) the corresponding surface of the waveguide 310. In some embodiments, the redirecting element 440 and the out-coupling element 445 may have a similar structure. In the width direction of the waveguide 310 (e.g., the x-axis direction), the width of the redirecting element 440 for the visible image light may be configured to be greater than the width of the in-coupling element 335 for the IR light. In some embodiments, multiple functions, e.g., redirecting, folding, and/or expanding the pupil of the light generated by the light source assembly 405 may be combined into a single element, e.g., the out-coupling element 445, and the redirecting element 440 may be omitted.

Figure 4C:
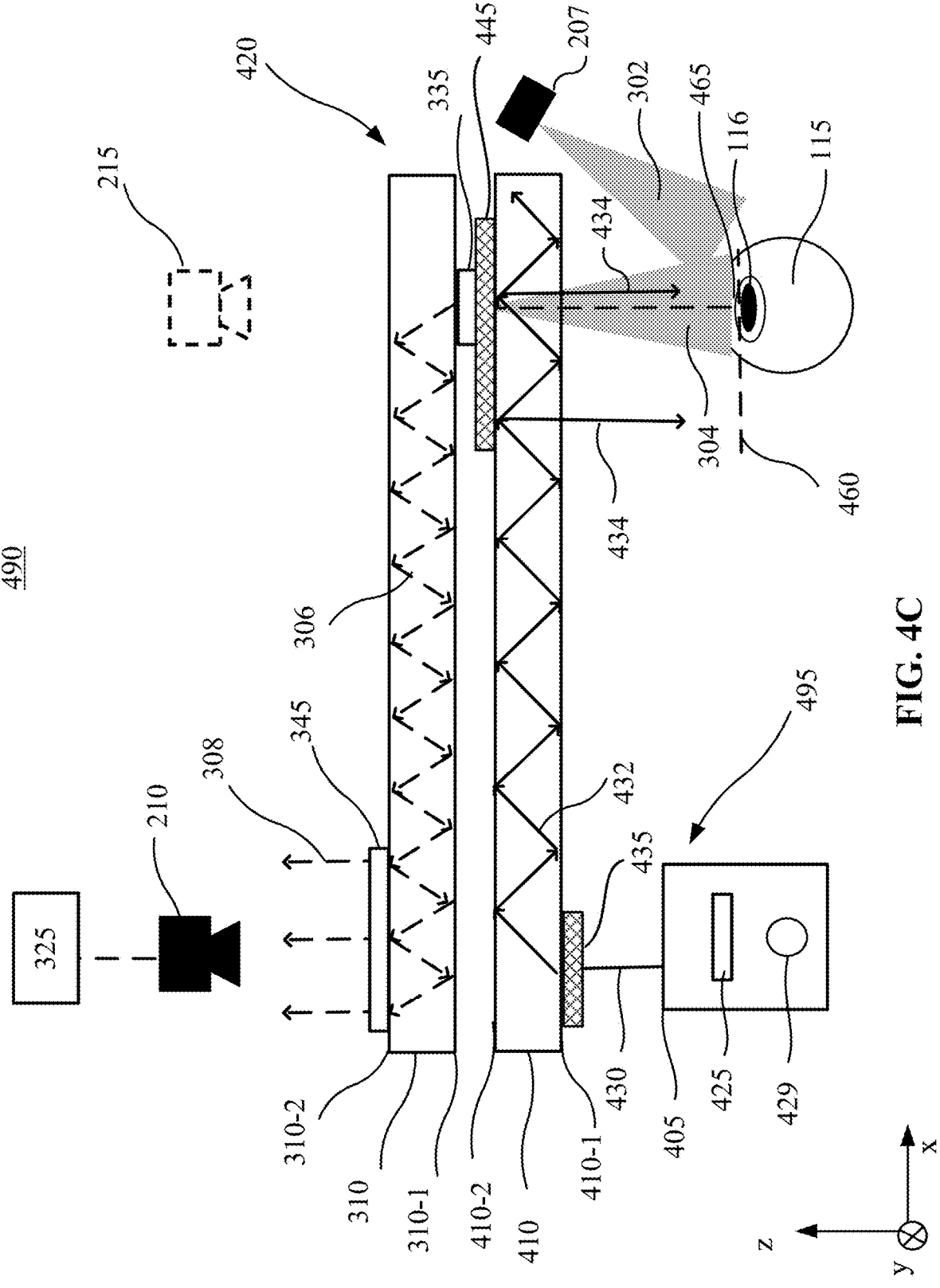
FIG. 4C illustrates a schematic diagram of an optical system including a display assembly and an eye tracking assembly, according to an embodiment of the present disclosure.

FIG. 4C illustrates an x-z sectional view of an optical system 490, according to an embodiment of the present disclosure. The optical system 490 may be a part of a system (e.g., an NED, an HUD, an HMD, a smart phone, a laptop, or a television, etc.) for VR, AR, and/or MR applications. The optical system 490 may include the same or similar elements, structures, and/or functions that are the same as or similar to those included in the optical system 400 shown in FIG. 4A, or the optical system 480 shown in FIG. 4B. Detailed descriptions of the same or similar elements, structures, and/or functions may refer to the above descriptions rendered in connection with FIGS. 4A and 4B.

As shown in FIG. 4C, the optical system 490 may include the eye tracking assembly 420 and a waveguide (or light guide) display assembly 495. The waveguide display assembly 495 and the eye tracking assembly 420 may have individual waveguides, e.g., waveguides 410 and 310. For example, the waveguide display assembly 495 may be similar to the waveguide display assembly 450 shown in FIG. 4A. The waveguide display assembly 495 may include the light source assembly 405, and the waveguide 410 coupled with the in-coupling element 435 and the out-coupling element 445. The waveguide 410 may be stacked with the waveguide 310 included in the eye tracking assembly 420. In some embodiments, for wave guiding to occur in the waveguides 310 and 410, the waveguides 310 and 410 may be separated by an air gap. In some embodiments, the air gap between the neighboring waveguides 310 and 410 may be at least partially filled with a material (e.g., a liquid glue) having a refractive index lower than that of the waveguides 310 and 410.

The out-coupling element 445 and the in-coupling element 435 may be disposed at a first portion and a second portion of the waveguide 410, respectively. In the embodiment shown in FIG. 4C, the in-coupling element 335 may be stacked with the out-coupling element 445. In some embodiments, when the out-coupling element 445 is disposed at the first surface 410-1 of the waveguide 410, the in-coupling element 335 may directly contact the second surface 410-2 of the waveguide 410. Because each of the in-coupling element 335, the out-coupling element 345, the in-coupling element 435, and the out-coupling element 445 may be disposed at either the first surface or the second surface of the respective waveguide 310, 410, in some embodiments, at least one of the in-coupling element 335, the out-coupling element 345, the in-coupling element 435, the out-coupling element 445 may be disposed between the two waveguides 310, 410, or in some embodiments, none of the in-coupling element 335, the out-coupling element 345, the in-coupling element 435, the out-coupling element 445 may be disposed between the two waveguides 310, 410. Any number of combinations of the in-coupling element 335, the out-coupling element 345, the in-coupling element 435, the out-coupling element 445 may be disposed between the two waveguides 310, 410.

Figure 5:
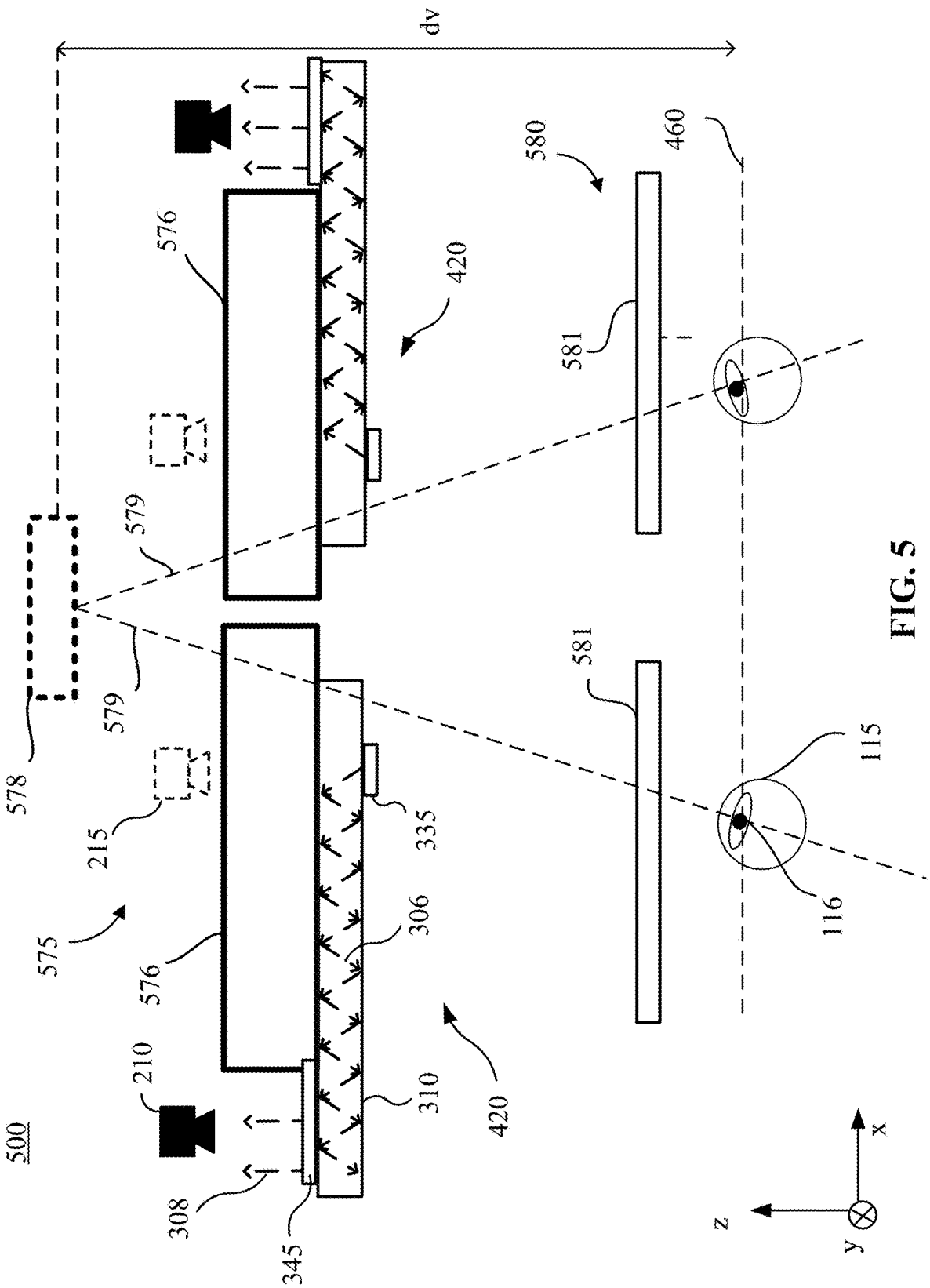
FIG. 5 illustrates a schematic diagram of an optical system including a display assembly and an eye tracking assembly, according to an embodiment of the present disclosure.

FIG. 5 illustrates an x-z sectional view of an optical system 500, according to an embodiment of the present disclosure. The optical system 500 may be a part of a system (e.g., an NED, an HUD, an HMD, a smart phone, a laptop, or a television, etc.) for VR, AR, and/or MR applications. The optical system 500 may include the same or similar elements, structures, and/or functions that are the same as or similar to those included in the optical system 400 shown in FIG. 4A, the optical system 480 shown in FIG. 4B, or the optical system 490 shown in FIG. 4C. Detailed descriptions of the same or similar elements, structures, and/or functions may refer to the above descriptions rendered in connection with FIGS. 4A-4C.

As shown in FIG. 5, the optical system 500 may include a display system 575, a viewing optical system 580, and the eye tracking assembly 420, and the controller 325 (not shown). The display system 575 may display virtual images to the user. In some embodiments, the display system 575 may include a single electronic display or multiple electronic displays 576 (e.g., a display for each eye 115 of the user). For discussion purposes, FIG. 5 shows that the display system 575 includes two electronic displays 576 for the left and right eyes 115 of the user of the optical system 500. The display system 575 and the viewing optical system 580 together may guide an image light (forming the virtual images) to the respective exit pupil 465 in the respective eye-box region 460. For discussion purpose, FIG. 5 shows that the viewing optical system 580 may include two lenses or lens assemblies 581 for the left and right eyes 115. The lens or lens assembly 581 may be configured to address the accommodation-vergence conflict in the optical system 500.

In some embodiments, the electronic displays 576 may display a virtual image. Based on the eye tracking information provided by the eye tracking assembly 420, the controller 325 may determine a virtual object 578 within the virtual image at which the eyes 115 are currently looking. The controller 325 may determine a vergence depth (dv) of the gaze of the user based on the gaze point or an estimated intersection of gaze lines 579 determined by the eye tracking assembly 420. As shown in FIG. 5, the gaze lines 579 may converge or intersect at the distance dv, where the virtual object 578 is located. The controller 325 may control the lens or lens assembly 581 to adjust the optical power to provide an accommodation that matches the vergence depth (dv) associated with the virtual object 578 at which the eyes 115 are currently looking, thereby reducing the accommodation-vergence conflict in the optical system 500. For example, the controller 325 may control the lens or lens assembly 581 to operate in a desirable operation state to provide an optical power corresponding to a focal plane (or an image plane) that matches the vergence depth (dv).

The configuration of the optical system 400 shown in FIG. 4A, the optical system 480 shown in FIG. 4B, the optical system 490 shown in FIG. 4C, or the optical system 500 shown in FIG. 5 are used as an example structure that includes both of a display assembly and a disclosed object tracking assembly. Other display assemblies may also be used in combination with a disclosed object tracking assembly.

Figure 6A:
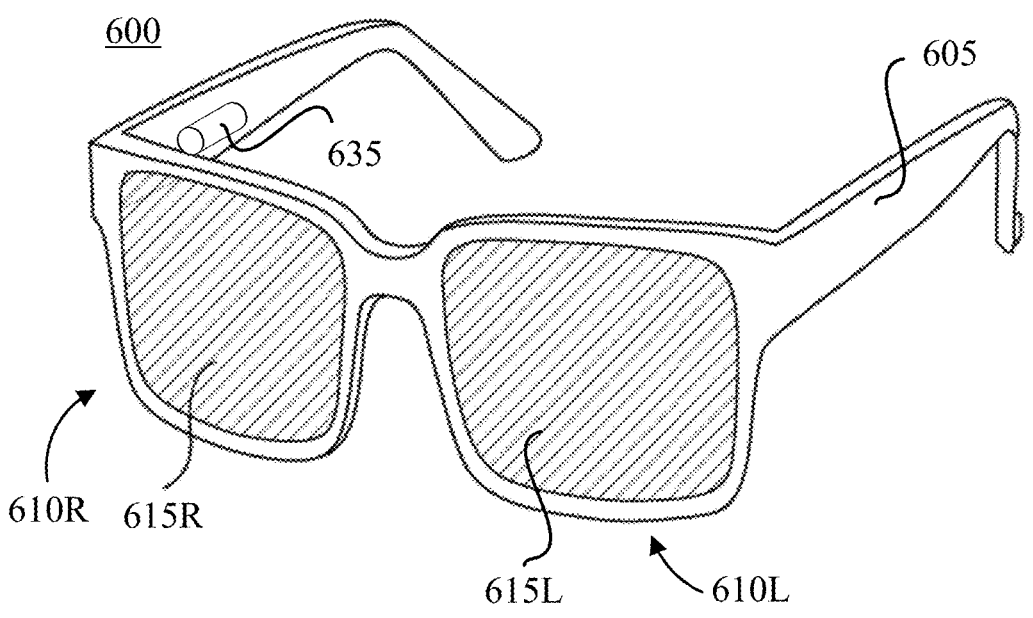
FIG. 6A is a schematic diagram of a near-eye display ("NED"), according to an embodiment of the disclosure.
Figure 6B:
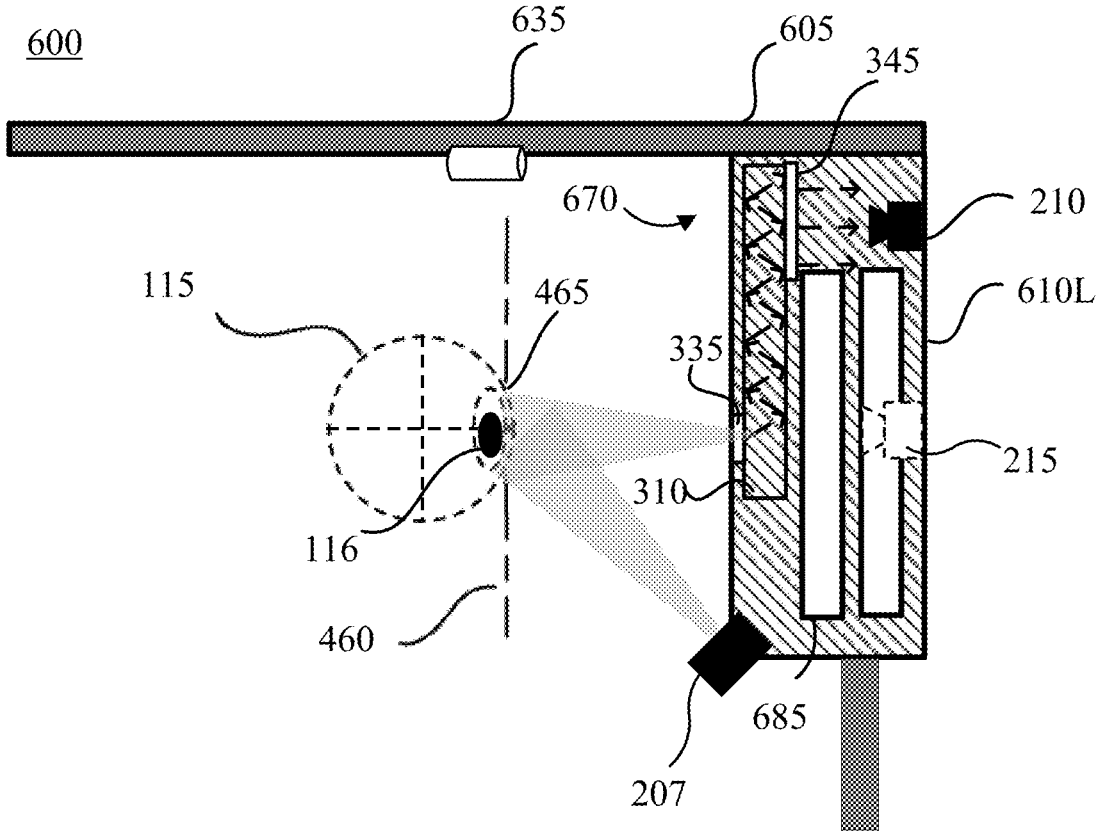
FIG. 6B is a cross sectional view of a half of the NED shown in FIG. 6A, according to an embodiment of the disclosure.

FIG. 6A illustrates a schematic diagram of a near-eye display ("NED") 600 according to an embodiment of the disclosure. FIG. 6B is a cross-sectional view of half of the NED 600 shown in FIG. 6A according to an embodiment of the disclosure. For purposes of illustration, FIG. 6B shows the cross-sectional view associated with a left-eye display system 610L. The NED 600 may include a controller (e.g., the controller 325), which is not shown in FIG. 6A or 6B. As shown in FIGS. 6A and 6B, the NED 600 may include a frame 605 configured to mount to a user's head. The frame 605 is merely an example structure to which various components of the NED 600 may be mounted. Other suitable fixtures may be used in place of or in addition to the frame 605. The NED 600 may include right-eye and left-eye display systems 610R and 610L mounted to the frame 605. The NED 600 may function as a VR device, an AR device, an MR device, or any combination thereof. In some embodiments, when the NED 600 functions as an AR or an MR device, the right-eye and left-eye display systems 610R and 610L may be entirely or partially transparent from the perspective of the user, which may provide the user with a view of a surrounding real-world environment. In some embodiments, when the NED 600 functions as a VR device, the right-eye and left-eye display systems 610R and 610L may be opaque, such that the user may be immersed in the VR imagery based on computer-generated images.

The right-eye and left-eye display systems 610R and 610L may include image display components configured to project computer-generated virtual images into left and right display windows 615L and 615R in a field of view ("FOV"). The right-eye and left-eye display systems 610R and 610L may be any suitable display systems, such as the waveguide display assembly 450 shown in FIG. 4A, the waveguide display assembly 470 shown in FIG. 4B, the waveguide display assembly 495 shown in FIG. 4C, or the display system 575 shown in FIG. 5. For illustrative purposes, FIG. 6A shows that the right-eye and left-eye display systems 610R and 610L may include a light source assembly (e.g., a projector) 635 coupled to the frame 605. The projector 635 may generate an image light representing a virtual image.

As shown in FIG. 6B, the NED 600 may also include a lens system 685 and an object tracking system 670 (e.g., eye tracking system and/or face tracking system). In some embodiments, the lens system 685 may be disposed between the object tracking system 670 and the left-eye display system 610L. The lens system 685 may be configured to guide the image light output from the left-eye display system 610L to an exit pupil 465. The object tracking system 670 may be any embodiment of the object tracking system disclosed herein, such as the object tracking system 200 shown in FIGS. 2A-2C, the object tracking system 300 shown in FIG. 3A, or the object tracking system 350 shown in FIG. 3B. With the object tracking system 670, the NED 600 may provide enhanced tracking accuracy and tracking range for eye tracking and/or face tracking. Information obtained during eye tracking and/or face tracking may be used for determining the type of information to be presented to the user of the NED 600 and/or the arrangement of the content displayed on a display screen of the NED 600, addressing the vergence-accommodation conflict, and enhancing display quality and performance of the NED 600. Accordingly, the user experience of the NED 600 may be enhanced.

For illustrative purposes, FIG. 6B shows that the object tracking system 670 may be similar to the object tracking system 300 shown in FIG. 3A. For example, the object tracking system 670 may include the light source 207, the waveguide 310 coupled with the in-coupling element 335 and the out-coupling element 345, and the optical sensor 210. The virtual, direct view camera 215 may be formed directly in front of the eye 115. Detailed descriptions of the light propagation and other elements can refer to the above descriptions rendered in connection with FIG. 3A.

Figure 7A:
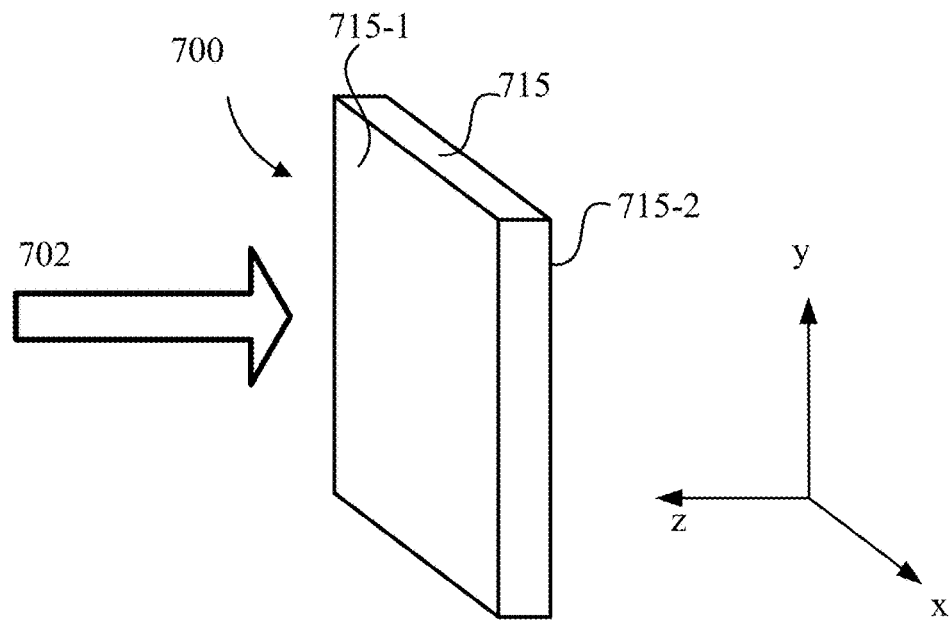
FIG. 7A schematically illustrates a three-dimensional ("3D") view of a liquid crystal polarization hologram ("LCPH") element, according to an embodiment of the present disclosure.

FIG. 7A illustrates a schematic three-dimensional ("3D") view of a liquid crystal polarization hologram ("LCPH") device or element 700 with a light 702 incident onto the LCPH element 700 along a –z-axis, according to an embodiment of the present disclosure. The LCPH element 700 described herein may be fabricated based on various methods, such as holographic interference, laser direct writing, ink-jet printing, and various other forms of lithography. Thus, a "hologram" described herein is not limited to fabrication by holographic interference, or "holography."

As shown in FIG. 7A, the LCPH element 700 may include a thin layer (or film) 715 of one or more birefringent materials with intrinsic or induced (e.g., photo-induced) optical anisotropy, such as liquid crystals, liquid crystal polymers, amorphous polymers. Such a thin layer 715 may also be referred to as a birefringent medium layer (or film) or an LCPH layer (or film) 715. The birefringent medium layer 715 may have a first surface 715-1 on one side and a second surface 715-2 on an opposite side. The first surface 715-1 and the second surface 715-2 may be surfaces along the light propagating path of the incident light 702.

In some embodiments, the birefringent medium layer 715 may be a polymer layer (or film), e.g., a polarization hologram polymer layer. For example, in some embodiments, the birefringent medium layer 715 may be a liquid crystal polymer ("LCP") layer. In some embodiments, the LCP layer may include polymerized (or cross-linked) LCs, polymer-stabilized LCs, photo-reactive LC polymers, or any combination thereof. The LCs may include nematic LCs, twist-bend LCs, chiral nematic LCs, smectic LCs, or any combination thereof. In some embodiments, the birefringent medium layer 715 may be a polymer layer including a birefringent photo-refractive holographic material other than LCs, such as an amorphous polymer. For discussion purpose, in the following descriptions, the term "LCPH" may encompass polarization holograms based on LCs and polarization holograms based on birefringent photo-refractive holographic materials other than LCs.

In some embodiments, an optic axis of the birefringent medium layer 715 may be configured with a spatially varying orientation in at least one in-plane direction. The in-plane direction may be an in-plane linear direction (e.g., an x-axis direction, a y-axis direction), an in-plane radial direction, an in-plane circumferential (e.g., azimuthal) direction, or a combination thereof. In some embodiments, the optic axis of the birefringent medium layer 715 may also be configured with a spatially varying orientation in an out-of-plane direction. For example, the optic axis of the birefringent medium layer 715 may twist in a helical fashion in the out-of-plane direction. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal.

The birefringent medium layer 715 may include optically anisotropic molecules (e.g., LC molecules) configured with a three-dimensional ("3D") orientational pattern to provide a polarization selective optical response. The orientation of the optic axis of the birefringent medium layer 715 may be configured through configuring the local orientation of directors of the optically anisotropic molecules in the birefringent medium layer 715.

Figure 7B:
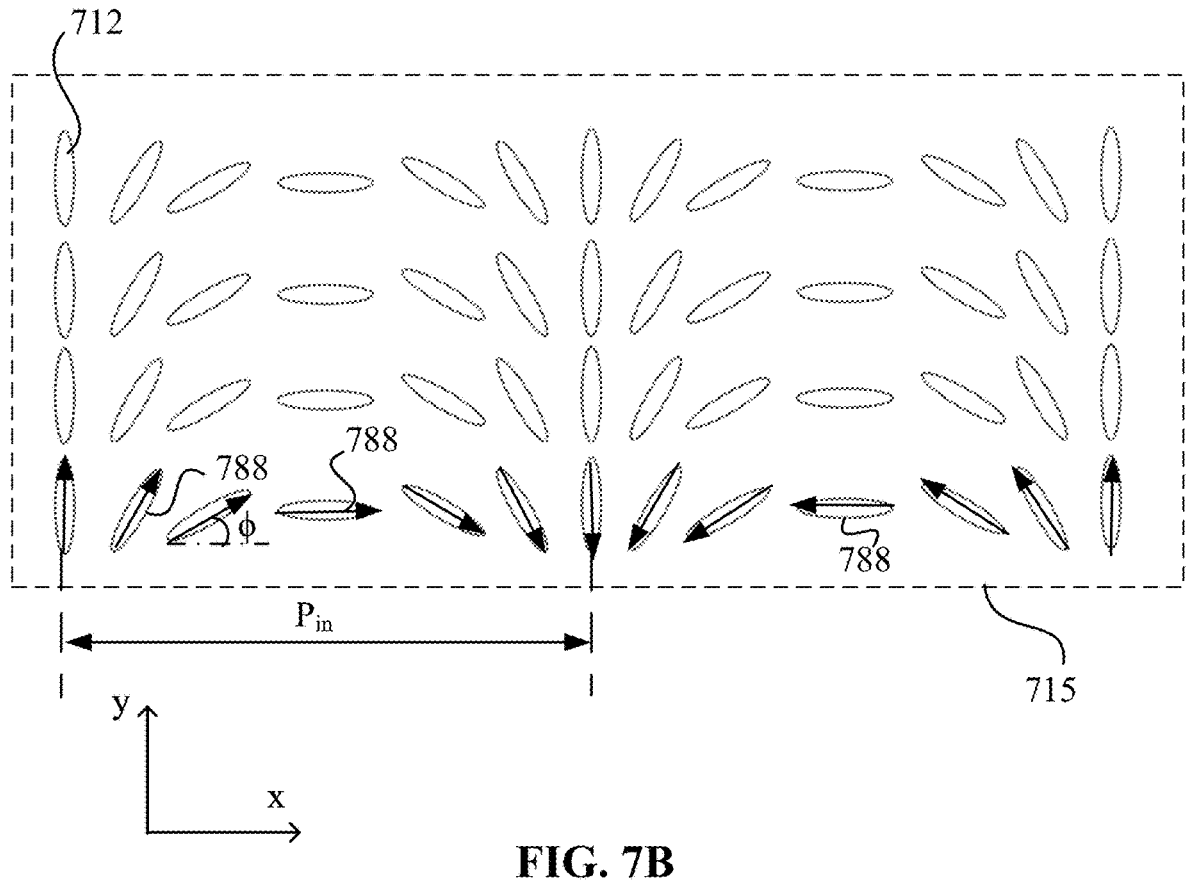
FIG. 7B schematically illustrates a sectional view of a portion of the LCPH element shown in FIG. 7A, showing in-plane orientations of optically anisotropic molecules in the LCPH element, according to an embodiment of the present disclosure.

FIG. 7B schematically illustrates an x-y sectional view of in-plane orientations of the optically anisotropic molecules 712 in the LCPH element 700, according to an embodiment of the present disclosure. The in-plane orientations of the optically anisotropic molecules 712 in the LCPH element 700 shown in FIG. 7B are for illustrative purposes. In some embodiments, the optically anisotropic molecules 712 in the LCPH element 700 may have other in-plane orientation patterns. For discussion purposes, rod-like LC molecules 712 are used as examples of the optically anisotropic molecules 712 of the birefringent medium layer 715. The rod-like LC molecule 712 may have a longitudinal axis (or an axis in the length direction) and a lateral axis (or an axis in the width direction). The longitudinal axis of the LC molecule 712 may be referred to as a director of the LC molecule 712 or an LC director. An orientation of the LC director may determine a local optic axis orientation or an orientation of the optic axis at a local point of the birefringent medium layer 715.

FIG. 7B shows that orientations of the LC directors (indicated by arrows 788 in FIG. 7B) of the LC molecules 712 located in close proximity to a surface (e.g., at least one of the first surface 715-1 or the second surface 715-2) of the birefringent medium layer 715 may exhibit a periodic rotation in a predetermined in-plane direction, e.g., an x-axis direction in FIG. 7B. The continuous rotation of orientations of the LC directors may form a periodic rotation pattern with a uniform (e.g., same) in-plane pitch Pin. The in-plane pitch Pin is defined as a distance along the in-plane direction (e.g., the y-axis direction) over which the LC directors rotate by a predetermined value (e.g., 180°) from a predetermined initial state (or reference state). In some embodiments, the periodic in-plane orientation pattern with the uniform (or same) in-plane pitch Pin shown in FIG. 7A may correspond to a grating pattern. Accordingly, the LCPH element 700 may function as a polarization selective grating, e.g., a PVH grating, or a PBP grating, etc. In addition, at the surface 715-1 or 715-2 of the birefringent medium layer 715, the orientations of the directors of the LC molecules 712 may exhibit a rotation in a predetermined rotation direction, e.g., a clockwise direction or a counter-clockwise direction. Accordingly, the rotation of the orientations of the directors of the LC molecules 712 located in close proximity to the surface of the birefringent medium layer 715 may exhibit a handedness, e.g., right handedness or left handedness. In the embodiment shown in FIG. 7B, the orientations of the directors of the LC molecules 712 located in close proximity to the surface of the birefringent medium layer 715 may exhibit a rotation in a clockwise direction. Accordingly, the rotation of the orientations of the directors of the LC molecules 712 located in close proximity to the surface of the birefringent medium layer 715 may exhibit a left handedness.

In some embodiments, although not shown, the orientations of the directors of the LC molecules 712 located in close proximity to the surface of the birefringent medium layer 715 may exhibit a rotation in a counter-clockwise direction. Accordingly, the rotation of the orientations of the directors of the LC molecules 712 in regions located in close proximity to or at the surface of the birefringent medium layer 715 may exhibit a right handedness. Although not shown, in some embodiments, in regions located in close proximity to or at the surface of the birefringent medium layer 715, domains in which the orientations of the directors of the LC molecules 712 exhibit a rotation in a clockwise direction (referred to as domains $D_L$) and domains in which the orientations of the directors of the LC molecules 712 exhibit a rotation in a counter-clockwise direction (referred to as domains $D_R$) may be alternatingly arranged in at least one in-plane direction, e.g., a first (or x-axis) in-plane direction and/or a second (or y-axis) in-plane direction.

Figure 7C:
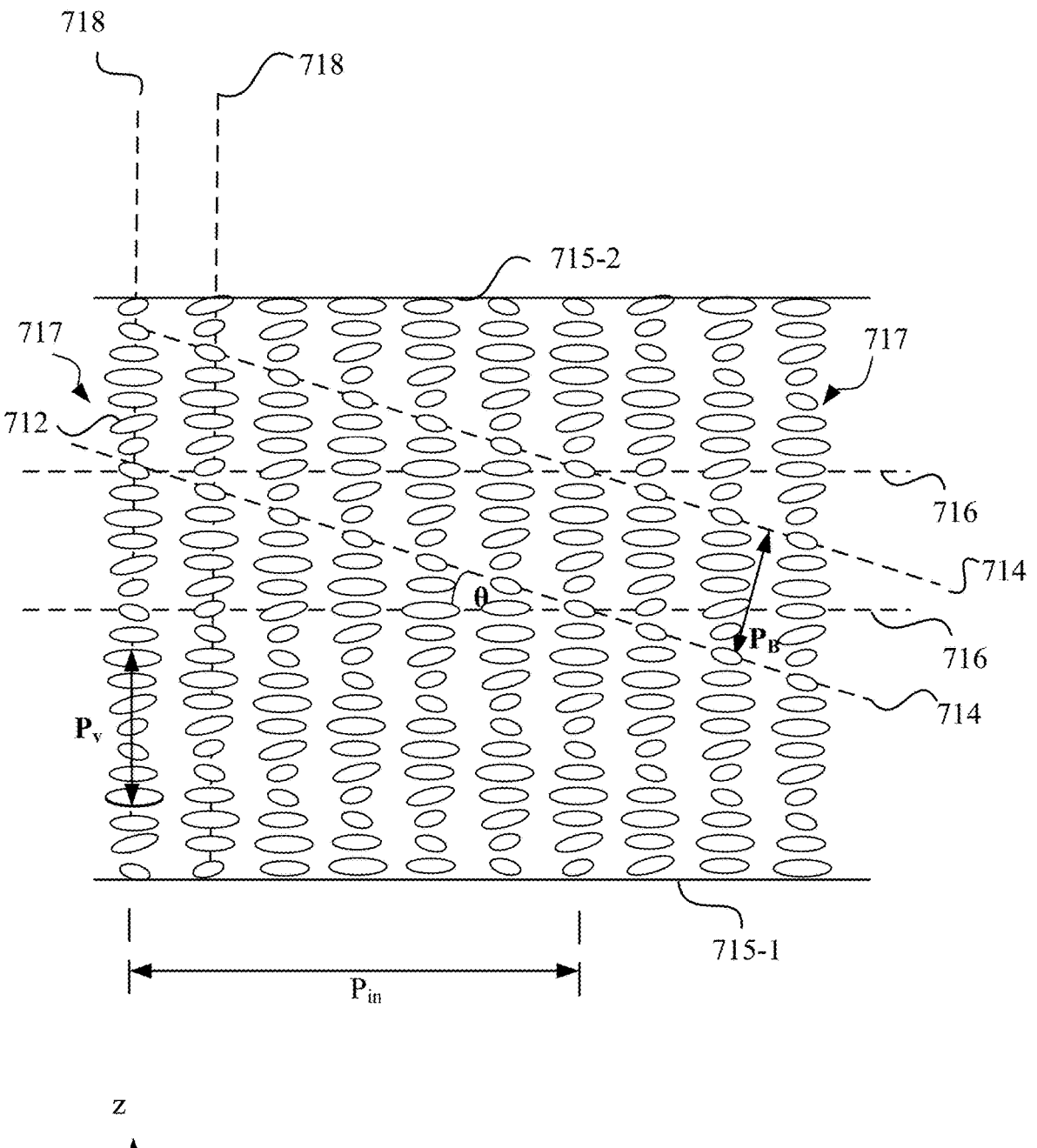
FIGS. 7C-7F schematically illustrate various views of a portion of the LCPH element shown in FIG. 7A, showing out-of-plane orientations of optically anisotropic molecules in the LCPH element, according to various embodiments of the present disclosure.

FIGS. 7C-5F schematically illustrate y-z sectional views of a portion of the LCPH element 700, showing out-of-plane orientations of the LC directors of the LC molecules 712 in the LCPH element 700, according to various embodiments of the present disclosure. As shown in FIG. 7C, within a volume of the birefringent medium layer 715, the LC molecules 712 may be arranged in a plurality of helical structures 717 with a plurality of helical axes 718 and a helical pitch $P_h$ along the helical axes ($P_h$ may be related to vertical pitch $P_v$ described below). The orientations of the LC directors of the LC molecules 712 arranged along a single helical structure 717 may exhibit a continuous rotation around the helical axis 718 in a predetermined rotation direction. Accordingly, the helical structure 717 may exhibit a handedness, e.g., right handedness or left handedness. The helical pitch $P_h$ may be defined as a distance along the helical axis 718 over which the orientations of the LC directors exhibit a rotation around the helical axis 718 by 360°, or the azimuthal angles of the LC molecules vary by 360°.

In the embodiment shown in FIG. 7C, the helical axes 718 may be substantially perpendicular to the first surface 715-1 and/or the second surface 715-2 of the birefringent medium layer 715. In other words, the helical axes 718 of the helical structures 717 may be in a thickness direction (e.g., a z-axis direction) of the birefringent medium layer 715. In the embodiment shown in FIG. 7C, the LC molecules 712 may have substantially small tilt angles (including zero degree tilt angles), and the LC directors of the LC molecules 712 may be substantially orthogonal to the helical axis 718. The birefringent medium layer 715 may also have a vertical pitch $P_v$, which may be defined as a distance along the thickness direction of the birefringent medium layer 715 over which the orientations of the LC directors of the LC molecules 712 exhibit a rotation around the helical axis 718 by 180° (or the azimuthal angles of the LC directors vary by) 180°. In the embodiment shown in FIG. 7C, the vertical pitch $P_v$ may be half of the helical pitch $P_h$.

As shown in FIG. 7C, the LC molecules 712 from the plurality of helical structures 717 having a first same orientation (e.g., same tilt angle and azimuthal angle) may form a first series of parallel refractive index planes 714 periodically distributed within the volume of the birefringent medium layer 715. Although not labeled, the LC molecules 712 with a second same orientation (e.g., same tilt angle and azimuthal angle) different from the first same orientation may form a second series of parallel refractive index planes periodically distributed within the volume of the birefringent medium layer 715. Different series of parallel refractive index planes may be formed by the LC molecules 712 having different orientations. In the same series of parallel and periodically distributed refractive index planes 714, the LC molecules 712 may have the same orientation and the refractive index may be the same. Different series of refractive index planes 714 may correspond to different refractive indices. When the number of the refractive index planes 714 (or the thickness of the birefringent medium layer) increases to a sufficient value, Bragg diffraction may be established according to the principles of volume gratings. Thus, the periodically distributed refractive index planes 714 may also be referred to as Bragg planes 714.

In some embodiments, as shown in FIG. 7C, the refractive index planes 714 may be slanted with respect to the first surface 715-1 or the second surface 715-2. In some embodiments, the refractive index planes 714 may be perpendicular to or parallel with the first surface 715-1 or the second surface 715-2. Within the birefringent medium layer 715, there may exist different series of Bragg planes. A distance (or a period) between adjacent Bragg planes 714 of the same series may be referred to as a Bragg period PB. The different series of Bragg planes formed within the volume of the birefringent medium layer 715 may produce a varying refractive index profile that is periodically distributed in the volume of the birefringent medium layer 715. The birefringent medium layer 715 may diffract an input light satisfying a Bragg condition through Bragg diffraction.

As shown in FIG. 7C, the birefringent medium layer 715 may also include a plurality of LC molecule director planes (or molecule director planes) 716 arranged in parallel with one another within the volume of the birefringent medium layer 715. An LC molecule director plane (or an LC director plane) 716 may be a plane formed by or including the LC directors of the LC molecules 712. In the example shown in FIG. 7C, the LC directors in the LC director plane 716 have different orientations, i.e., the orientations of the LC directors vary in the x-axis direction. The Bragg plane 714 may form an angle θ with respect to the LC molecule director plane 716. In the embodiment shown in FIG. 7C, the angle θ may be an acute angle, e.g., 0°<θ<90°. The LCPH element 700 including the birefringent medium layer 715 shown in FIG. 7C may function as a transmissive PVH element, e.g., a transmissive PVH grating.

Figure 7D:
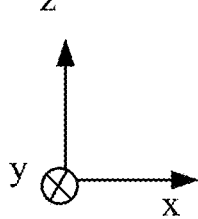

In the embodiment shown in FIG. 7D, the helical axes 718 of helical structures 717 may be tilted with respect to the first surface 715-1 and/or the second surface 715-2 of the birefringent medium layer 715 (or with respect to the thickness direction of the birefringent medium layer 715). For example, the helical axes 718 of the helical structures 717 may have an acute angle or obtuse angle with respect to the first surface 715-1 and/or the second surface 715-2 of the birefringent medium layer 715. In some embodiments, the LC directors of the LC molecule 712 may be substantially orthogonal to the helical axes 718 (i.e., the tilt angle may be substantially zero degree). In some embodiments, the LC directors of the LC molecule 712 may be tilted with respect to the helical axes 718 at an acute angle. The birefringent medium layer 715 may have a vertical periodicity (or pitch) $P_v$. In the embodiment shown in FIG. 7D, an angle θ (not shown) between the LC director plane 716 and the Bragg plane 714 may be substantially 0° or 180°. That is, the LC director plane 716 may be substantially parallel with the Bragg plane 714. In the example shown in FIG. 7, the orientations of the directors in the molecule director plane 716 may be substantially the same. The LCPH element 700 including the birefringent medium layer 715 shown in FIG. 7D may function as a reflective PVH element, e.g., a reflective PVH grating.

Figure 7E:
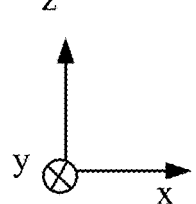

In the embodiment shown in FIG. 7E, the birefringent medium layer 715 may also include a plurality of LC director planes 716 arranged in parallel within the volume of the birefringent medium layer 715. In the embodiment shown in FIG. 7E, an angle θ between the LC director plane 716 and the Bragg plane 714 may be a substantially right angle, e.g., θ=90°. That is, the LC director plane 716 may be substantially orthogonal to the Bragg plane 714. In the example shown in FIG. 7E, the LC directors in the LC director plane 716 may have different orientations. In some embodiments, the LCPH element 700 including the birefringent medium layer 715 shown in FIG. 7E may function as a transmissive PVH element, e.g., a transmissive PVH grating.

Figure 7F:
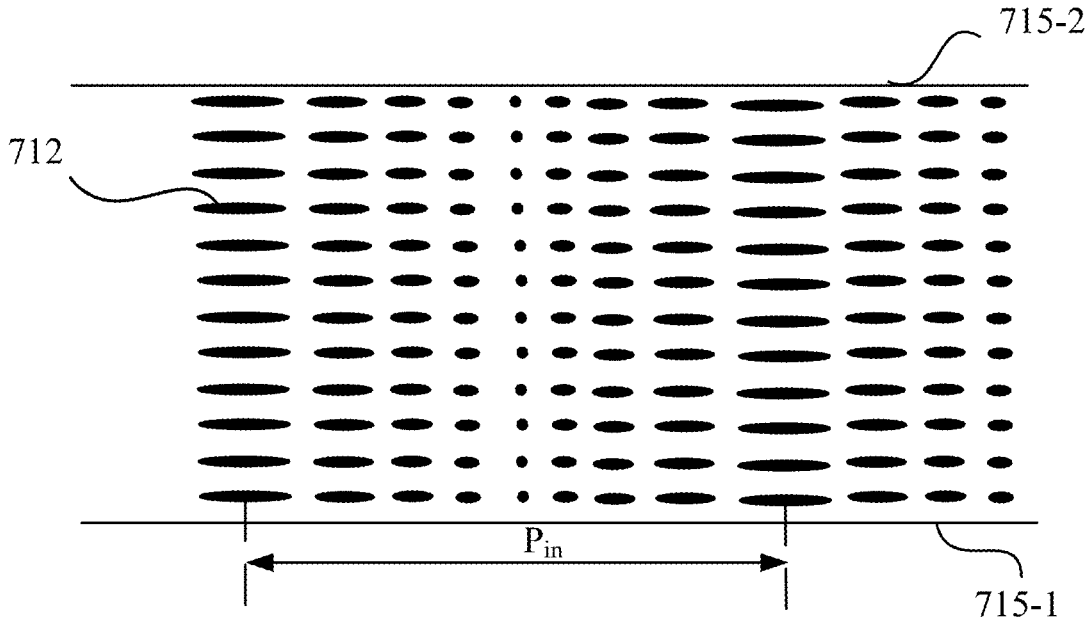
Figure 7F:
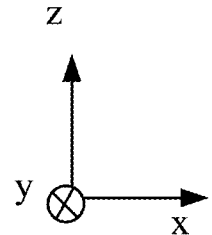

In the embodiment shown in FIG. 7F, in a volume of the birefringent medium layer 715, along the thickness direction (e.g., the z-axis direction) of the birefringent medium layer 715, the directors (or the azimuth angles) of the LC molecules 712 may remain in the same orientation (or same angle value) from the first surface 715-1 to the second surface 715-2 of the birefringent medium layer 715. In some embodiments, the thickness of the birefringent medium layer 715 may be configured as $d=\lambda/(2*\Delta n)$, where A is a design wavelength, $\Delta n$ is the birefringence of the LC material of the birefringent medium layer 715, and $\Delta n=n_e-n_o$, where $n_e$ and $n_o$ are the extraordinary and ordinary refractive indices of the LC material, respectively. In some embodiments, the LCPH element 700 including the birefringent medium layer 715 shown in FIG. 7F may function as a PBP element, e.g., a PBP grating.

Figure 8B:
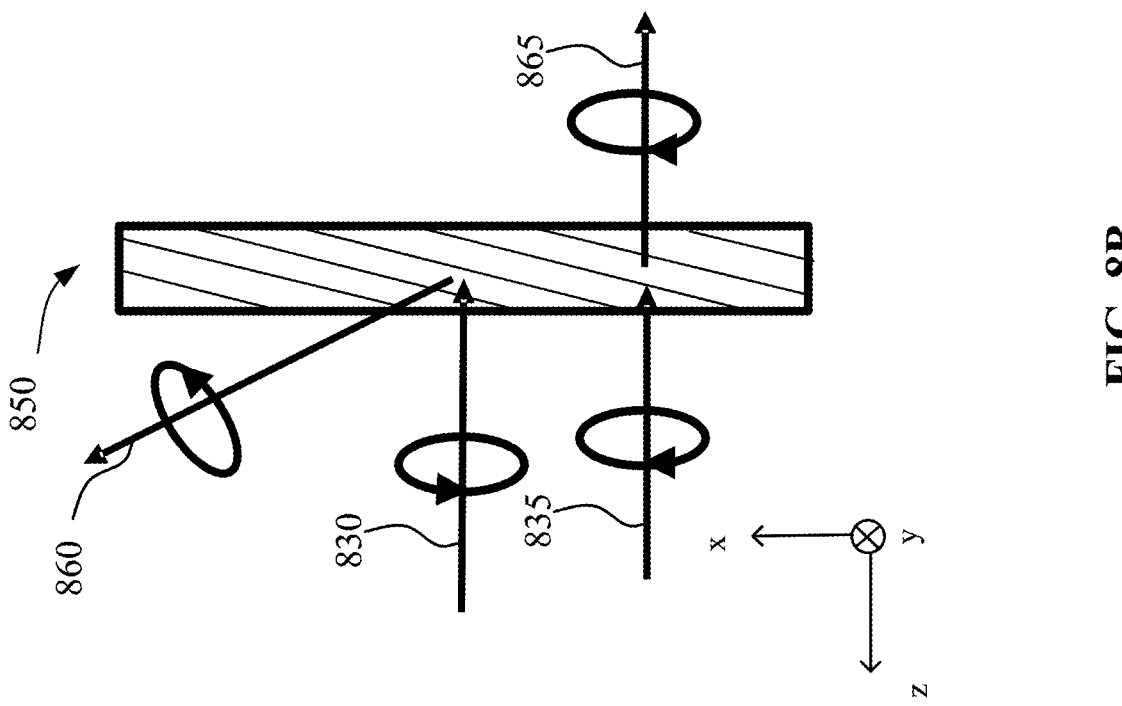
FIG. 8B illustrates diffraction orders of a reflective PVH element, according to an embodiment of the present disclosure.
Figure 8A:
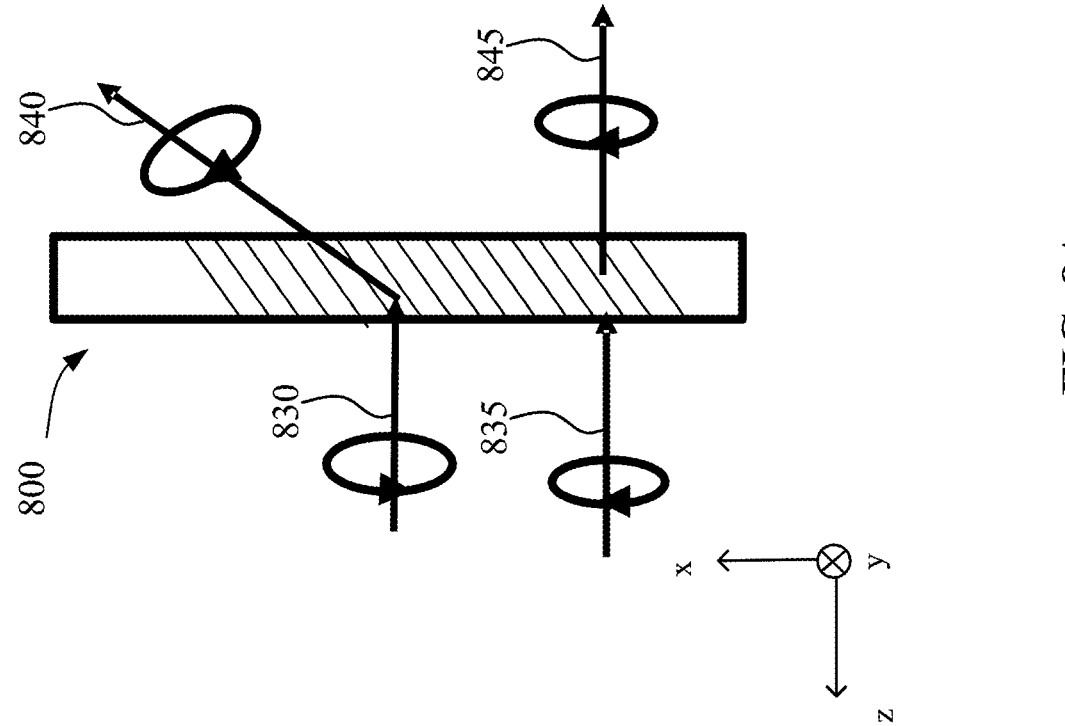
FIG. 8A illustrates diffraction orders of a polarization volume hologram ("PVH") element, according to an embodiment of the present disclosure.

FIG. 8A illustrates diffraction orders of the LCPH element 700 functioning as a transmissive PVH element 800, according to an embodiment of the present disclosure. The transmissive PVH element 800 may be configured to primarily forwardly diffract a circularly polarized light having a predetermined handedness as a diffracted light of a certain order (e.g., the 1st diffracted light). The transmissive PVH element 800 may primarily transmit (e.g., with negligible diffraction) a circularly polarized light having a handedness that is opposite to the predetermined handedness as a transmitted light (the $0^{th}$ order). In some embodiments, the transmissive PVH element 800 may be configured to reverse the handedness of the circularly polarized light diffracted thereby. For example, the diffracted light output from the transmissive PVH element 800 may be a circularly polarized light with a handedness reversed by the transmissive PVH element 800. In some embodiments, the transmissive PVH element 800 may be configured to maintain the handedness of the circularly polarized light transmitted thereby. For discussion purposes, FIG. 8A shows the transmissive PVH element 800 as a right-handed transmissive PVH, which is configured to primarily forwardly diffract an RHCP light 830 as an LHCP light 840, and primarily transmit (e.g., with negligible diffraction) an LHCP light 835 to the $0^{th}$ order as an LHCP light 845. In some embodiments, the transmissive PVH element 800 may change the polarization of the diffracted light and/or transmitted light.

FIG. 8B illustrates diffraction orders of the LCPH element 700 functioning as a reflective PVH element 850, according to an embodiment of the present disclosure. The reflective PVH element 850 may be configured to primarily backwardly diffract a circularly polarized light having a predetermined handedness as a diffracted light of a certain order (e.g., the 1st diffracted light), and primarily transmit (e.g., with negligible diffraction) a circularly polarized light having a handedness that is opposite to the predetermined handedness as a transmitted light (the $0^{th}$ order). In some embodiments, the reflective PVH element 850 may be configured to substantially maintain the handedness of the circularly polarized light diffracted thereby and the handedness of the circularly polarized light transmitted thereby. For example, the diffracted light may be a circularly polarized light with a handedness substantially maintained by the reflective PVH element 850, and the transmitted light may be a circularly polarized light with a handedness substantially maintained by the reflective PVH element 850.

For discussion purposes, FIG. 8B shows that the reflective PVH element 850 is a right-handed reflective PVH, which is configured to primarily backwardly diffract an RHCP light 830 as an RHCP light 860, and primarily transmit (e.g., with negligible diffraction) an LHCP light 835 to the $0^{th}$ order as an LHCP light 865. In some embodiments, the reflective PVH element 850 may change the polarization of the diffracted light and/or transmitted light.

In some embodiments, the present disclosure provides a system. The system includes a light source configured to emit a infrared ("IR") light for illuminating an object. The system also includes a waveguide imaging assembly including a waveguide, an in-coupling element disposed at a first portion of the waveguide, an out-coupling element disposed at a second portion of the waveguide, and an optical sensor disposed facing the out-coupling element. The in-coupling element is configured to couple the IR light reflected by the object into the waveguide, the waveguide is configured to guide the IR light to propagate toward the out-coupling element through total internal reflection, and the out-coupling element is configured to couple the IR light out of the waveguide toward the optical sensor, and the optical sensor is configured to generate a tracking signal of the object based on the IR light output from the waveguide.

In some embodiments, the in-coupling element and the out-coupling element are configured to deflect the IR light, and substantially transmit, with negligible deflection, a visible light. In some embodiments, the waveguide is configured to guide the IR light to propagate toward the out-coupling element along a width direction of the waveguide via total internal reflection, and along the width direction of the waveguide, a width of the in-coupling element is configured to be at a sub-millimeter level. In some embodiments, the width of the in-coupling element is configured to be 200-300 micrometers, 300-400 micrometers, 400-500 micrometers, or 500-600 micrometers. In some embodiments, the optical sensor is disposed off-axis with respect to the object. In some embodiments, at least one of the in-coupling element or the out-coupling element includes a diffraction grating.

In some embodiments, the in-coupling element is a first in-coupling element, and the out-coupling element is a first out-coupling element, and the system further include a second in-coupling element disposed at the second portion of the waveguide, and a second out-coupling element disposed at the first portion of the waveguide. The second in-coupling element and the second out-coupling element are configured to deflect a visible light, and substantially transmit, with negligible deflection, the IR light. In some embodiments, the second in-coupling element is configured to couple the visible light representing a virtual image into the waveguide as an in-coupled visible light that propagates inside the waveguide via total internal reflection, and the second out-coupling element is configured to couple the in-coupled visible light out of the waveguide as one or more output visible lights toward an eye-box region of the system. In some embodiments, along a width direction of the waveguide, a width of the first in-coupling element is smaller than a width of the second out-coupling element. In some embodiments, the light source is a first light source, and the system further includes a second light source disposed facing the second portion of the waveguide, and configured to output the visible light toward the second in-coupling element.

In some embodiments, the in-coupling element is a first in-coupling element, the out-coupling element is a first out-coupling element, the waveguide is a first waveguide, and the system further includes a second waveguide stacked with the first waveguide, a second out-coupling element disposed at a first portion of the second waveguide, and a second in-coupling element disposed at a second portion of the second waveguide. The second in-coupling element and the second out-coupling element are configured to deflect a visible light, and substantially transmit, with negligible deflection, the IR light. In some embodiments, the second in-coupling element is configured to couple the visible light representing a virtual image into the second waveguide as an in-coupled visible light that propagates inside the second waveguide via total internal reflection, and the second out-coupling element is configured to couple the in-coupled visible light out of the second waveguide as one or more output visible lights toward an eye-box region of the system. In some embodiments, along a width direction of the second waveguide, a width of the first in-coupling element is smaller than a width of the second out-coupling element. In some embodiments, the light source is a first light source, and the system further includes a second light source disposed facing the second portion of the second waveguide, and configured to output the visible light toward the second in-coupling element. In some embodiments, the optical sensor and the object are disposed at the same side of the waveguide. In some embodiments, the optical sensor and the object are disposed at different sides of the waveguide.

The present disclosure further provides a waveguide display system for reducing a world side ghost. A conventional waveguide (or light guide) display system may include a light source assembly that emits an image light representing a virtual image, and a waveguide (or light guide) that guides the image light to an eye-box region. The waveguide may be provided with a plurality of couplers or coupling elements that couple the image light into the waveguide and out of the waveguide toward the eye-box region. The couplers used in a geometric waveguide display system may include partially reflective couplers, whereas the couplers used in a diffractive waveguide display system may include gratings.

The waveguide may also receive a visible polychromatic light coming from a real-world environment (referred to as a real-world light). The real-world light incident onto the waveguide at a large skew angle range may also be coupled into the waveguide. The couplers may diffract, refract, and/or reflect the real-world light, causing a multicolored glare in a see-through view, especially when a user wearing the artificial reality device looks at a bright light source from certain angles. Such a see-through artifact is referred to as a "rainbow effect" or a "world side ghost", which may degrade the image quality of the see-through view. The rainbow effect may result from a light dispersion caused by the coupler, as the coupler spatially separates, e.g., via diffraction, reflection, and/or refraction, the real-world light into constituent wavelength components. Each wavelength of the incident light spectrum may be directed to a different direction, producing a rainbow of colors under a white light illumination.

Figure 9A:
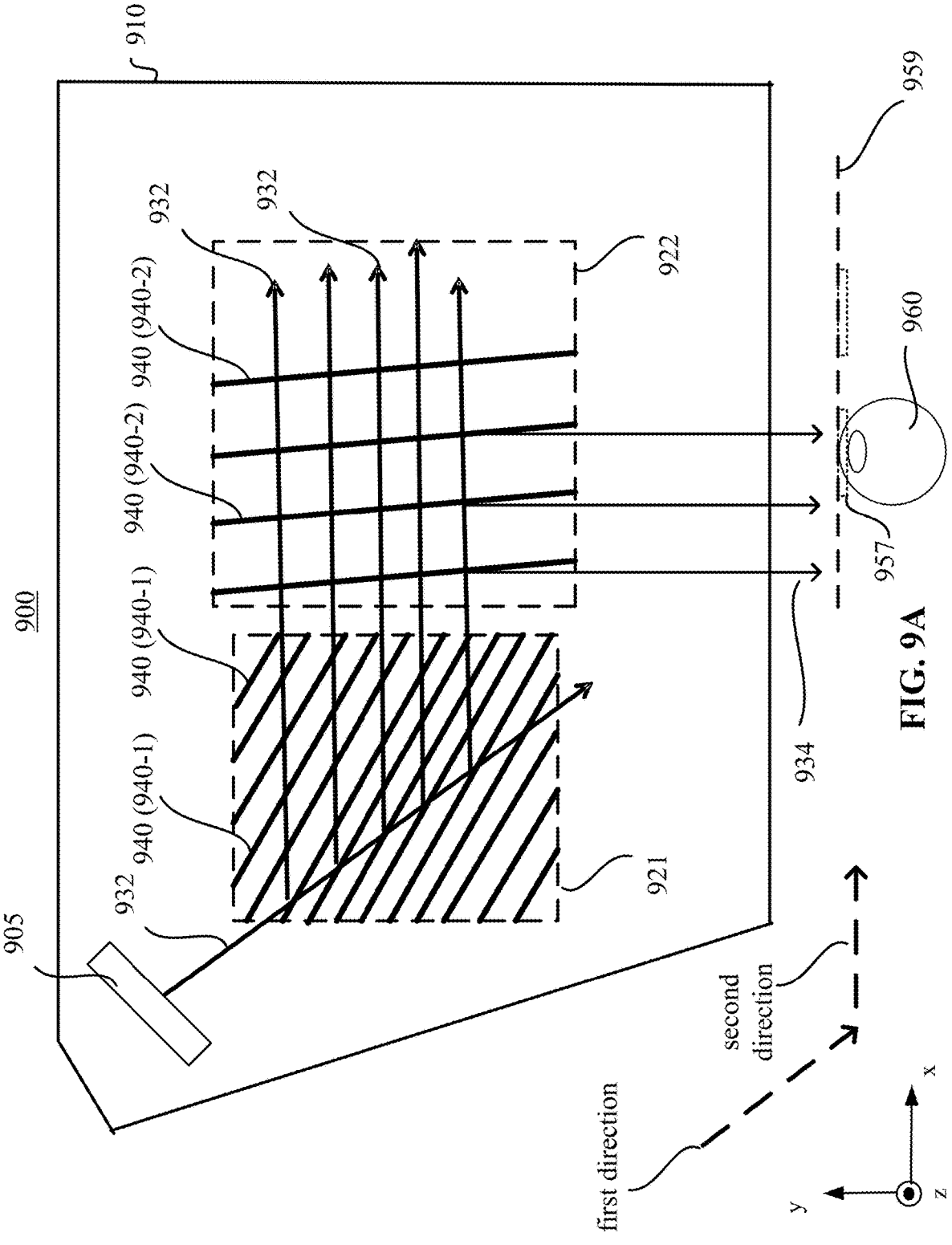
FIG. 9A illustrates a schematic diagram of a conventional waveguide display system.

FIG. 9A illustrates an x-y sectional view of a conventional geometric waveguide display system 900. As shown in FIG. 9A, the system 900 may include a light source assembly (not shown) that emits an image light representing a virtual image (referred to as an input image light), and a waveguide 910 that guides the input image light to an eye-box region 959 where an eye 960 of a user is positioned. The waveguide 910 may include an input coupler 905 that couples the input image light as an in-coupled image light 932 propagating inside the waveguide 910 via total internal reflection ("TIR"). The waveguide 910 may also include a plurality of partially reflective mirrors 940 embedded in the waveguide 910. The mirrors 940 may include a first array of mirrors 940-1 (referred to as folding mirrors 940-1) located at a first portion 921 of the waveguide 910, and a second array of mirrors 940-2 (referred to as out-coupling mirrors 940-2) located at a second portion 922 of the waveguide 910. The folding mirrors 940-1 may expand the input image light in a first direction, and the out-coupling mirrors 940-2 may expand the input image light in a second direction. Thus, the system 900 may provide a two-dimensional expansion of the input image light at the eye-box region 959.

For example, as shown in FIG. 9A, the in-coupled image light 932 may propagate inside the waveguide 910 along the first direction via TIR, toward the folding mirrors 940-1. The folding mirrors 940-1 may split (via reflection) the in-coupled image light 932 as a plurality of redirected image lights 932 propagating inside the waveguide 910 along a second direction via TIR, toward the out-coupling mirrors 940-2. The out-coupling mirrors 940-2 may couple the redirected image lights 932 out of the waveguide 910 as a plurality of output image lights 942 distributed along both the first direction and the second direction.

Figure 9B:
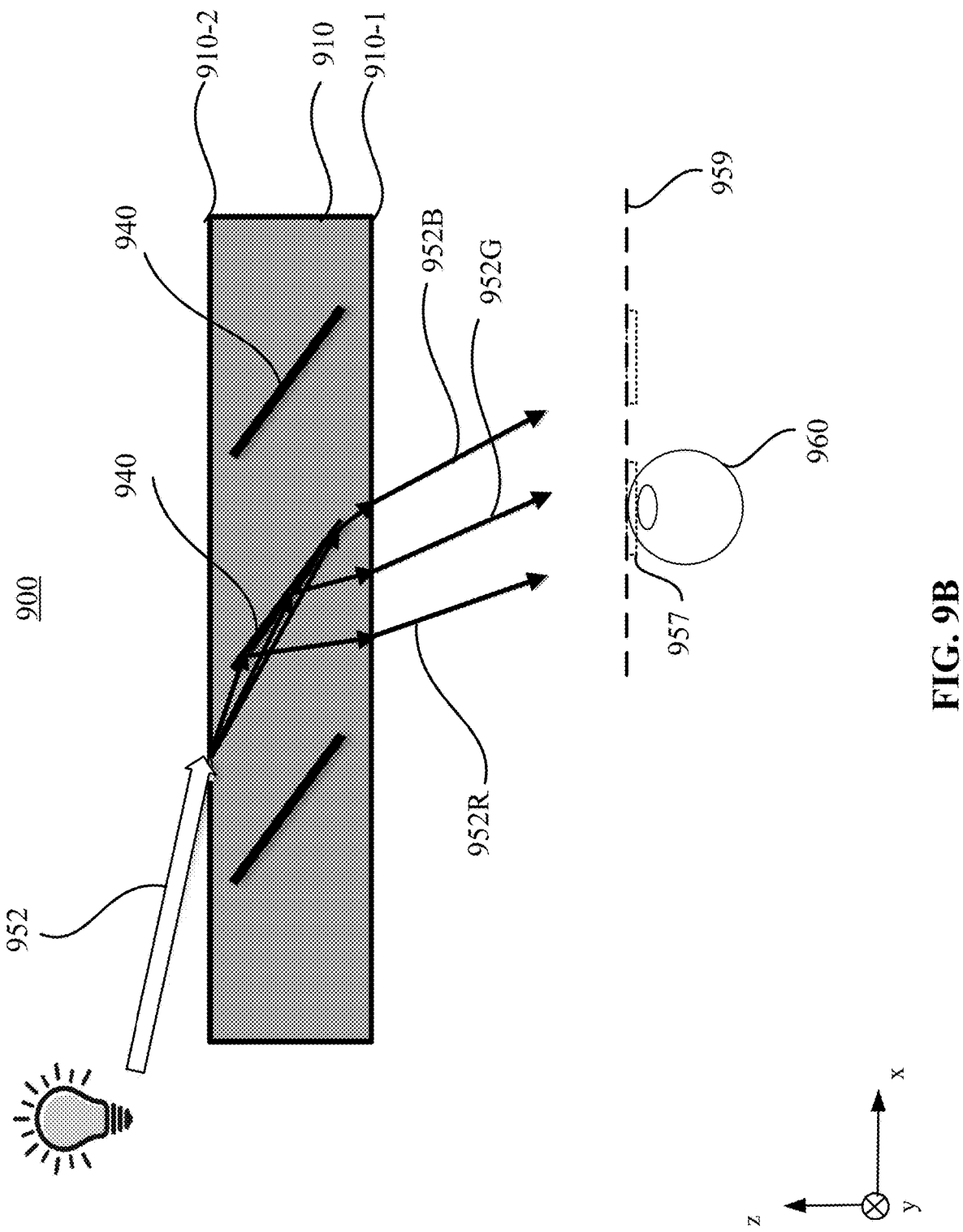
FIG. 9B illustrates a schematic diagram of a rainbow effect generated at an eye-box region of the system shown in FIG. 9A.

FIG. 9B illustrates an x-z sectional view of a portion of the conventional geometrical waveguide display system 900 shown in FIG. 9A, showing a rainbow effect perceived at the eye-box region 959 of the system 900. As shown in FIG. 9B, the mirrors 940 embedded in the waveguide 910 may also reflect a real-world light 952 toward the eye-box region 959. The waveguide 910 may have a first side or surface 910-1 (also referred to as a front surface 910-1) facing the eye-box region 959 and a second side or surface 910-2 facing the real-world environment (also referred to as a back surface 910-2). The real-world light 952 may be incident onto the second surface 910-2 of the waveguide 910. As the reflection of the real-world light 952 at the mirrors 940 is wavelength dependent, the mirrors 940 may spatially separate the real-world light 952 into constituent wavelength components propagating in different directions, e.g., a red wavelength component 952R, a green wavelength component 952G, and a blue wavelength component 952B at the eye-box region 959, causing a "rainbow effect" or a "world side ghost" in a see-through view.

Figure 10A:
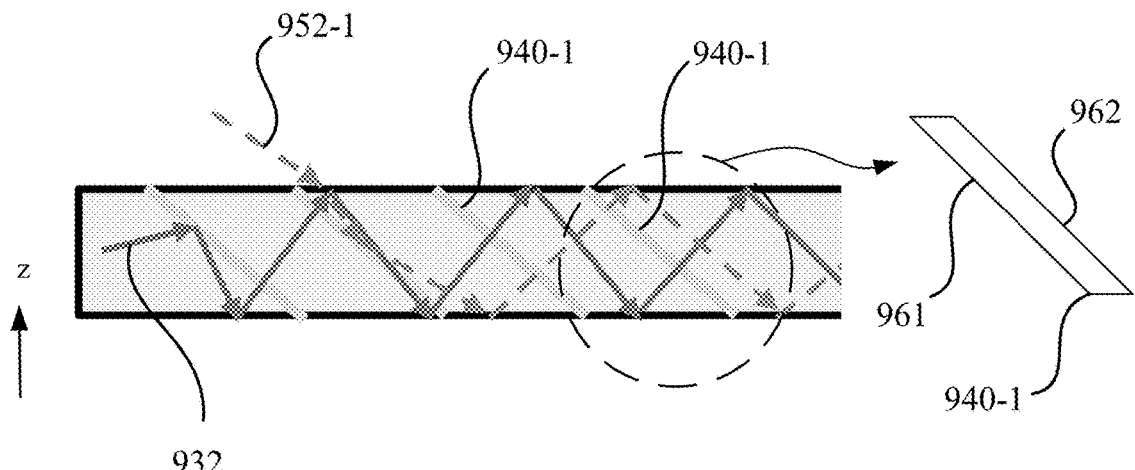
FIGS. 10A and 10B illustrate an optical path of an image light and an optical path of a real-world light that generates a first type of world side ghost (or rainbow) at an eye-box region of the system shown in FIG. 9A.
Figure 10B:
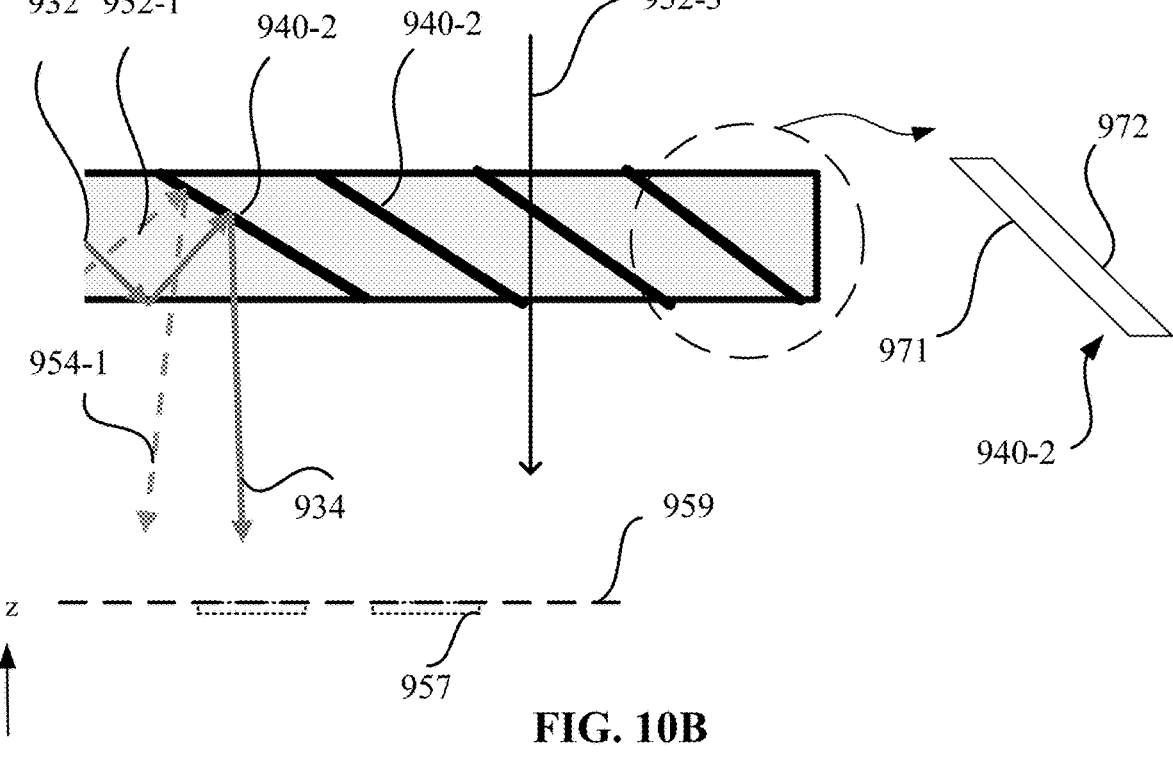

The inventors reversely traced rays for the conventional waveguide display system 900 from the eye-box region 959 to the real world environment, and observed that there are two major types of world side ghosts in the system 900, referred to as a first type of world side ghost (or rainbow) and a second type of world side ghost (or rainbow). FIGS. 10A and 10B illustrate an optical path of a real-world light 952-1 (represented by dashed arrow) that generates the first type of rainbow at the eye-box region 959, and an optical path of the in-coupled image light 932 (represented by solid arrows) from the folding mirrors 940-1 to the eye-box region 959. FIG. 10A illustrates a cross-sectional view of the folding mirrors 940-1 along the first direction shown in FIG. 9A, and an enlarged view of a folding mirror 940-1. As shown in FIG. 10A, the folding mirror 940-1 may have a front surface 961 facing the eye-box region 959, and a back surface 962 facing the real world environment. FIG. 10B illustrates a cross-sectional view of the out-coupling mirrors 940-2 along the second direction shown in FIG. 9A, and an enlarged view of an out-coupling mirror 940-2. The out-coupling mirror 940-2 may have a front surface 971 facing the eye-box region 959, and a back surface 972 facing the real world environment. As shown in FIG. 10A and FIG. 10B, the mirrors (folding or out-coupling) 940 are embedded inside the waveguide 910, and are slanted with respect to a surface of the waveguide 910.

As shown in FIG. 10A, the real-world light 952-1 (represented by dashed arrow) may be incident onto a portion of the waveguide 910 where the folding mirrors 940-1 are embedded. The real-world light 952-1 may be incident onto the back surface 962 of the folding mirror 940-1, and may be coupled into a TIR propagation path inside the waveguide 910 via the folding mirror 940-1. The real-world light 952-1 propagating inside the waveguide 910 via TIR may be incident onto the front surface 971 of the out-coupling mirror 940-2, as shown in FIG. 10B. The out-coupling mirror 940-2 may couple the real-world light 952-1 out of the waveguide 910 as a real-world light 954-1, as shown in FIG. 10B. The folding mirror 940-1 and the out-coupling mirror 940-2 may spatially separate the real-world light 952-1 into constituent wavelength components propagating in different directions toward the eye-box region 959, causing the first type of rainbow (or first type of world side ghost) in a see-through view.

That is, the first type of rainbow may be caused by the real-world light 952-1 that is coupled into the TIR propagation path inside the waveguide 910 from the back surface of the folding mirror 940-1, and that is coupled out of the waveguide 910 from the front surface 971 of the out-coupling mirror 940-2. The intensity of the real-world light 954-1 output from the waveguide 910 may be about 0.4% of the intensity of the real-world light 952-1 entering the waveguide 910. That is, the efficiency of the first type of rainbow (or first type of world side ghost) is about 0.4% at the eye-box region 959.

The inventors also observed that when the AOI of a real-world light 952-3 at the out-coupling mirrors 940-2 is substantially small (e.g., smaller than) 30°, the out-coupling mirrors 940-2 may reflect the real-world light 952-3 toward the eye-box region 959, and the rainbow effect caused by the reflected real-world light 952-3 may be substantially weak and negligible at the eye-box region 959. When the AOI of the real-world light 952-3 at the out-coupling mirrors 940-2 is large (e.g., larger than) 60°, the out-coupling mirrors 940-2 may reflect the real-world light 952-3, with a strong rainbow effect. However, the out-coupling mirrors 940-2 may substantially reflect the real-world light 952-3 to a direction outside of the FOV of the system 900. That is, the reflected real-world light 952-3 may not be perceived by the eye 960 located within the eye-box region 959 and, accordingly, the rainbow effect caused by the reflected real-world light 952-3 may not be perceived by the eye 960 located within the eye-box region 959.

Figure 10C:
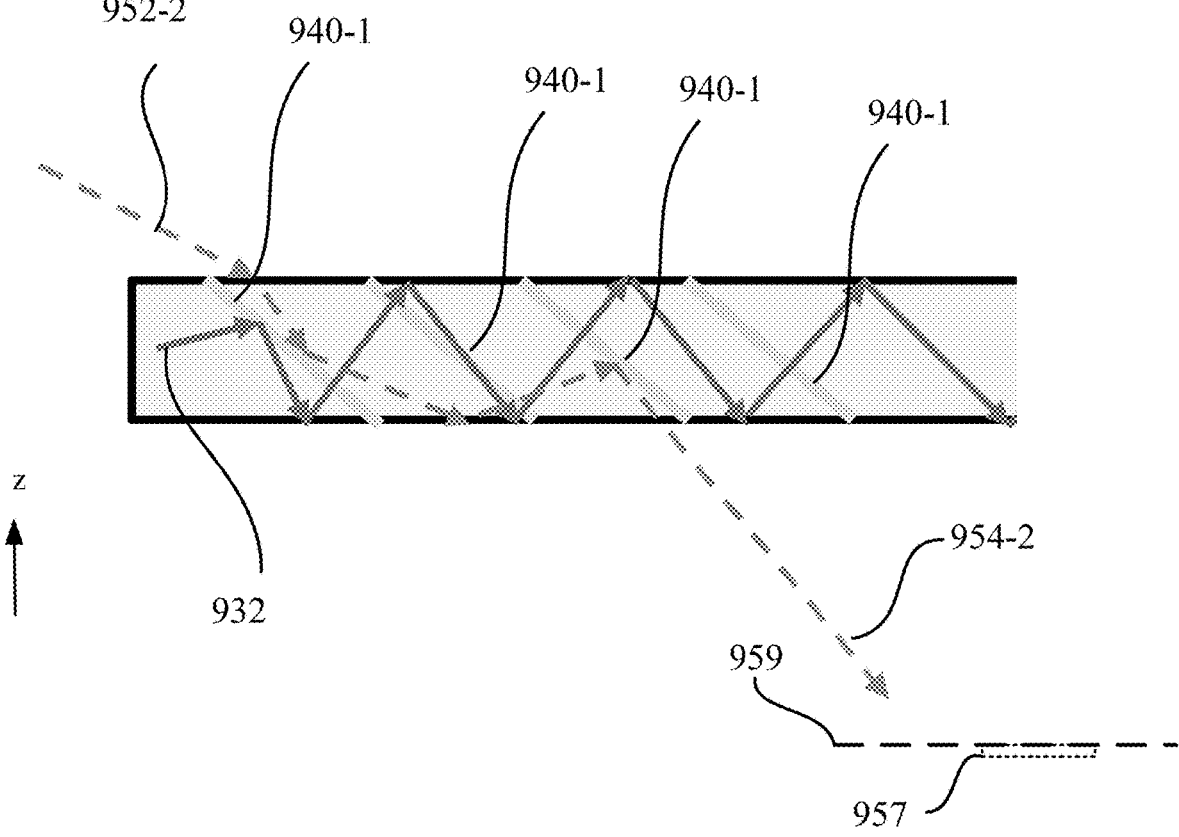
FIG. 10C illustrates an optical path of a real-world light that generates a second type of world side ghost (or rainbow) at an eye-box region of the system shown in FIG. 9A.

FIG. 10C illustrates a cross-sectional view of the folding mirrors 940-1 along the first direction shown in FIG. 9A, showing an optical path of a real-world light 952-2 (represented by a dashed arrow) that generates the second type of rainbow at the eye-box region 959. As shown in FIG. 10C, the real-world light 952-2 may be incident onto the back surface 962 of the folding mirror (referred to as a first folding mirror) 940-1, and coupled into a TIR propagation path inside the waveguide 910 via the first folding mirror 940-1. The real-world light 952-2 coupled into propagating inside the waveguide 910 via TIR may be incident onto the front surface 961 of another folding mirror (referred to as a second folding mirror) 940-1, and coupled out of the waveguide 910 via the second folding mirror 940-1 as a real-world light 954-2 propagating toward the eye-box region 959. The first and the second folding mirrors 940-1 may spatially separate the real-world light 952-2 into constituent wavelength components propagating in different directions toward the eye-box region 959, causing the second type of rainbow (or second type of world side ghost) in a see-through view.

That is, the second type of rainbow (or second type of world side ghost) may be caused by the real-world light 952-2 that is coupled into the TIR propagation path inside the waveguide 910 at the front surface, double reflected by the folding mirror 940-1, and coupled out of the waveguide 910 via the folding mirror 940-1. The intensity of the real-world light 954-2 output from the waveguide 910 may be about 0.1% of the intensity of the real-world light 952-2 entering the waveguide 910. That is, the efficiency of the second type of rainbow (or second type of world side ghost) is about 0.01% at the eye-box region 959.

Figure 10D:
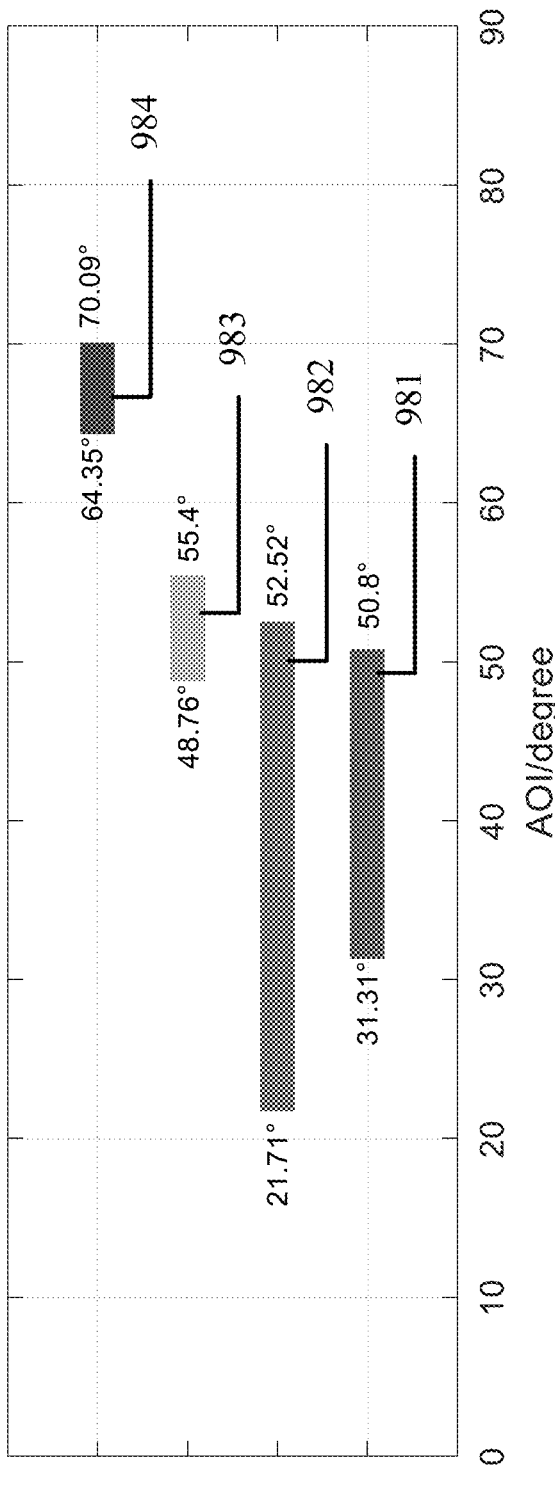
FIG. 10D illustrates simulation results showing ranges of angle of incidence ("AOI") of real-world lights and an image light at a folding mirror included in the system shown in FIG. 9A.

Inventors have evaluated the respective ranges of angle of incidence ("AOI") of the real-world lights 952-1 and 952-2 and the in-coupled image light 932 at the folding mirror 940-1. FIG. 10D illustrates simulation results showing AOI ranges of the real-world lights 952-1 and 952-2 and the in-coupled image light 932 at the folding mirror 940-1. As shown in FIG. 10D, the horizontal axis represents AOI (unit: degree (°)). A bar 981 shows that an AOI range of the image light 932 at the front surface 961 of the folding mirror 940-1 is from 31.31° to 50.8°. A bar 982 shows that an AOI range of the real-world light 952-1 at the front surface 961 of the folding mirror 940-1 is from 21.71° to 52.52°. A bar 983 shows that an AOI range of the real-world light 952-2 at the back surface 962 of the folding mirror 940-1 is from 48.76° to 55.4°. A bar 984 shows that an AOI range of the real-world light 952-2 at the front surface 961 of the folding mirror 940-1 is from 64.35° to 70.09°.

As shown in FIG. 10D, the bars 981-983 at least partially overlap with one another, indicating that the AOI range of the image light 932 at the front surface 961, the AOI range of the real-world light 952-1 at the front surface 961, and the AOI range of the real-world light 952-2 at the back surface 962 at least partially overlap with one another. The bar 984 does not overlap with any of the bars 981-183, which indicates that the AOI range of the real-world light 952-2 at the front surface 961 does not overlap with any of the AOI range of the image light 932 at the front surface 961, the AOI range of the real-world light 952-1 at the front surface 961, and the AOI range of the real-world light 952-2 at the back surface 962. In other words, the AOI range of the real-world light 952-2 at the front surface 961 can be distinguished from each of the AOI range of the image light 932 at the front surface 961, the AOI range of the real-world light 952-1 at the front surface 961, and the AOI range of the real-world light 952-2 at the back surface 962.

Figure 10E:
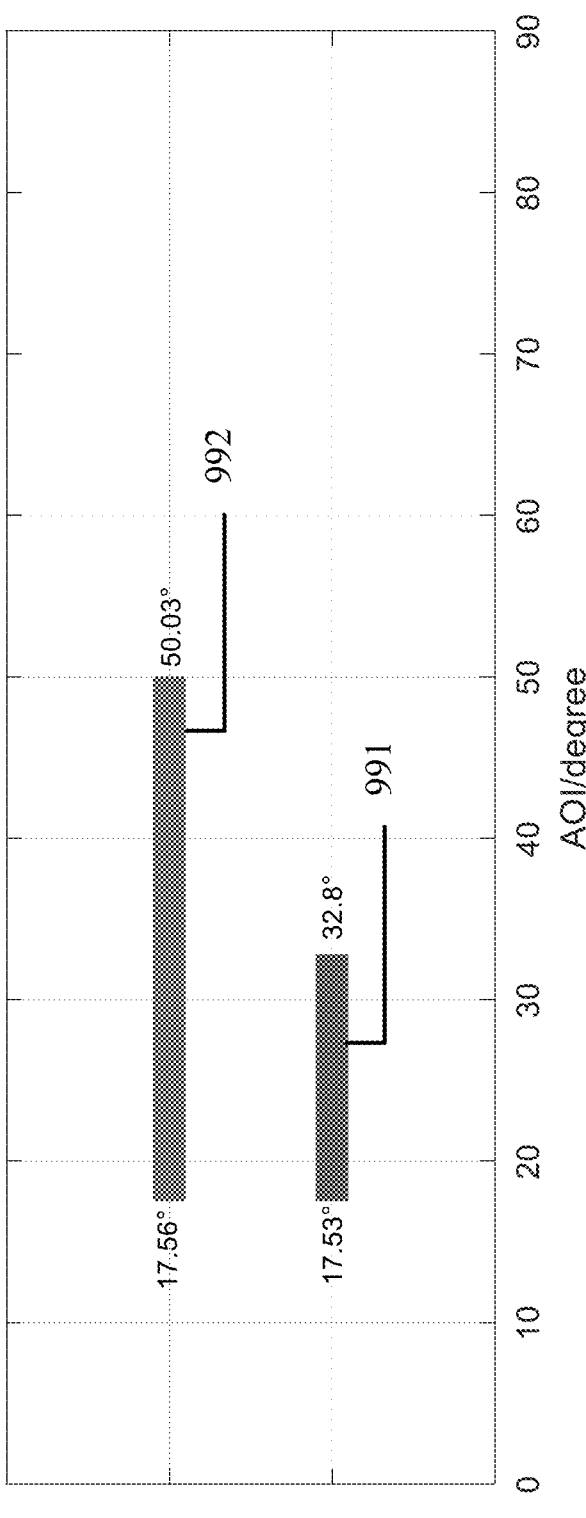
FIG. 10E illustrates simulation results showing ranges of AOI of a real-world light and an image light at an out-coupling mirror included in the system shown in FIG. 9A.

Inventors have evaluated the respective AOI ranges of the real-world lights 950-1 and 950-2 and the in-coupled image light 932 at the out-coupling mirror 940-2. FIG. 10E illustrates simulation results showing AOI ranges of the real-world lights 950-1 and 950-2 and the in-coupled image light 932 at the out-coupling mirror 940-2. As shown in FIG. 10E, the horizontal axis represents AOI (unit: degree (°)). A bar 991 shows that an AOI range of the image light 932 at the front surface 971 of the out-coupling mirror 940-2 is from 17.53° to 32.8°. A bar 992 shows that an AOI range of the real-world light 952-1 at the front surface 971 of the out-coupling mirror 940-2 is from 17.56° to 50.03°. The bars 991 and 992 at least partially overlap with one another, indicating that the AOI range of the image light 932 at the front surface 971 and the AOI range of the real-world light 952-1 at the front surface 971 at least partially overlap with one another. In other words, the AOI range of the image light 932 at the front surface 971 may not be distinguished from the AOI range of the real-world light 952-1 at the front surface 971.

Figure 10F:
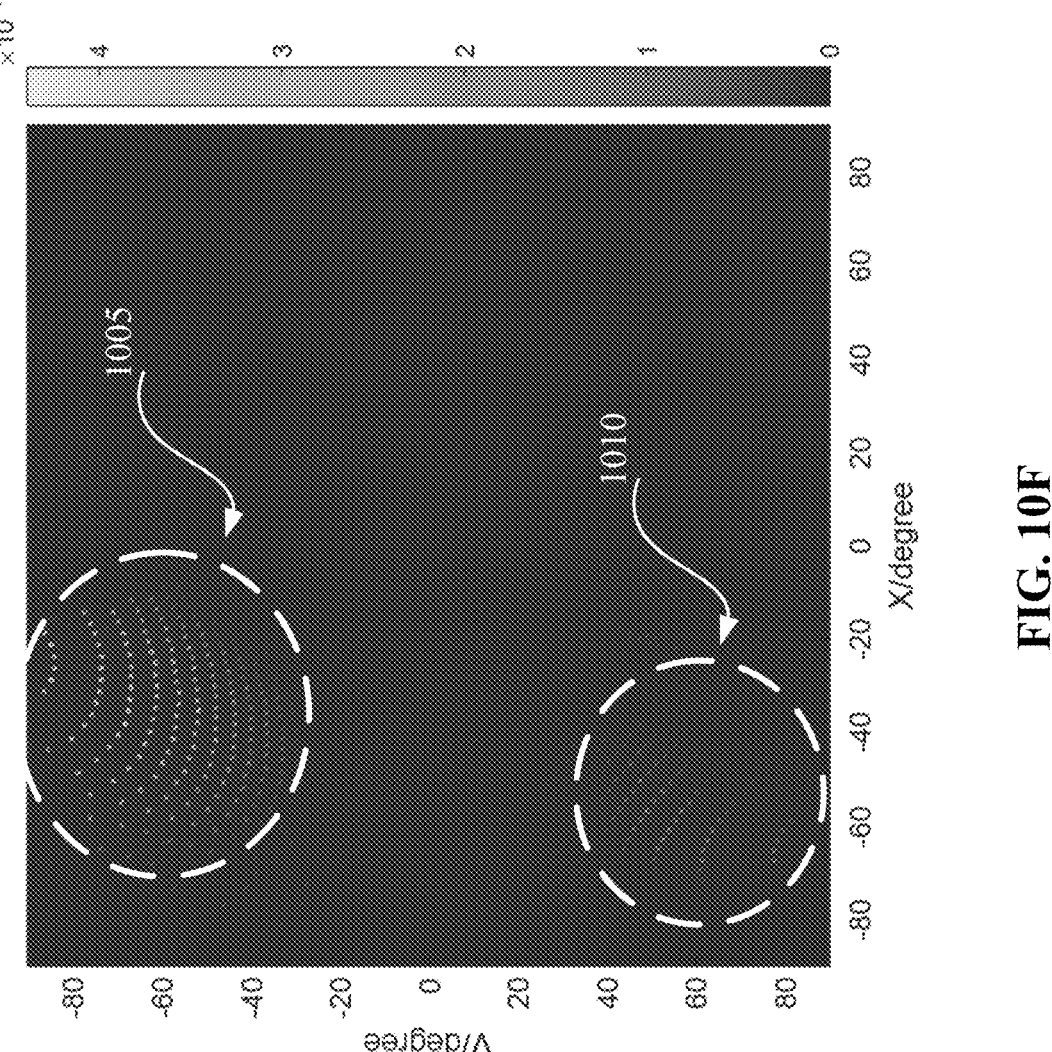
FIG. 10F illustrates simulation results showing relationships between AOI and an efficiency of the first type of world side ghost and the second type of world side ghost within a field of view of the system shown in FIG. 9A.

FIG. 10F illustrates simulation results showing angular positions of the first type of rainbow (or first type of world side ghost) and the second type of rainbow (or second type of world side ghost) within a field of view ("FOV") at the output side of the waveguide 910. As shown in FIG. 10F, the horizontal axis represents horizontal FOV direction (unit: degree (°)), and the vertical axis represents a vertical FOV direction (unit: degree (°)). The eye 960 is presumed to be at a location where both the horizontal FOV direction and the vertical FOV direction are zero degree. The negative vertical FOV directions correspond to angles above the horizontal plane (or transverse plane) of the eye 960, and the positive vertical FOV directions correspond to angles below the horizontal plane of the eye 960. The negative horizontal FOV directions correspond to angles to the left of the sagittal plane (or lateral plane) of the eye 960, and the positive horizontal FOV directions correspond to angles to the right of the median plane of the eye 960.

The first type of world side ghost has a vertical angular position ranging from about-90° to about −30° and a horizontal angular position ranging from about −70° to about −20°, as indicated by a circle 1005. The second type of world side ghost has a vertical angular position ranging from about 80° to about 40° and a horizontal angular position ranging from about −70° to about −40°, as indicated by a circle 1010. The efficiency of the world side ghost is represented by grey scales, in which the darker grey indicates a lower efficiency, and the lighter grey indicates a higher efficiency. As shown in FIG. 10F, the first type of world side ghost has a larger angular position range and a higher efficiency than the second type of world side ghost.

Figure 11A:
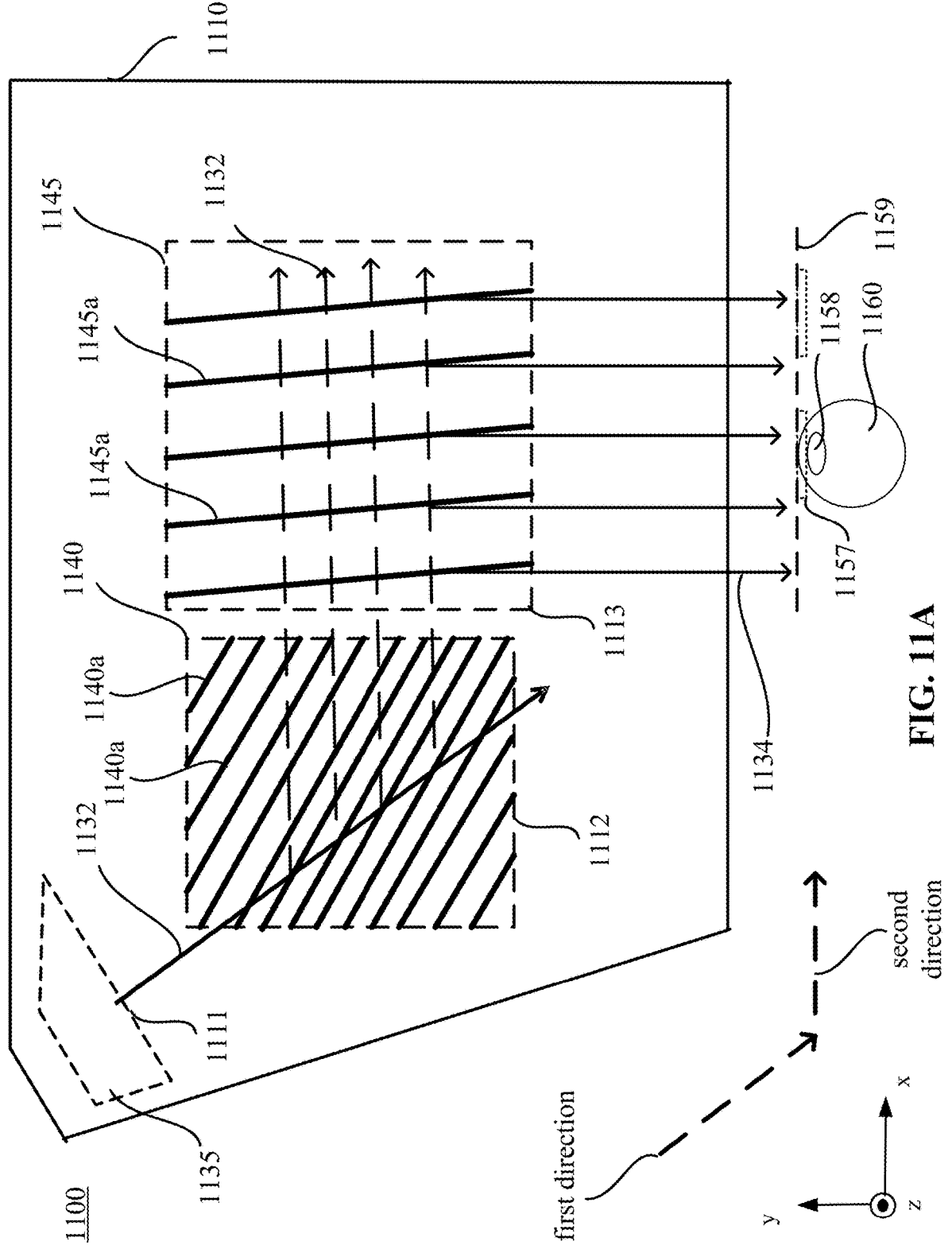
FIG. 11A illustrates a schematic diagram of a waveguide display system configured to reduce a world side ghost (or rainbow), according to an embodiment of the present disclosure.

Based on the understanding of the world side ghosts shown in FIGS. 10A-10F, the present disclosure provides various mechanisms to reduce the first type world side ghost (or rainbow) and the second type world side ghost (or rainbow) in a waveguide display system. FIG. 11A illustrates an x-y sectional view of a waveguide display system 1100 (referred to as system 1100 for simplicity) configured to reduce a rainbow effect, according to an embodiment of the present disclosure. The system 1100 may be implemented into an artificial reality device or system for AR and/or MR applications. The system 1100 may be a geometric waveguide display system. The system 1100 may include a controller (not shown), a light source assembly (not shown) that emits an image light representing a virtual image (referred to as an input image light), and a waveguide 1110 that guides the input image light to an eye-box region 1159 where an eye 1160 of a user is positioned.

The light source assembly may include a display element (e.g., micro-projector) and a collimating lens. The display element may include a plurality of pixels arranged in a pixel array, in which neighboring pixels may be separated by, e.g., a black matrix. The display element may output an image light, which includes bundles of divergent rays output from the respective pixels. The collimating lens may convert the bundles of divergent rays in the image light output from the display element into bundles of parallel rays in the input image light propagating toward the waveguide 1110. The respective bundles of parallel rays may have different incidence angles at the waveguide 1110. That is, the collimating lens may transform or convert a linear distribution of the pixels in the display element into an angular distribution of the pixels at the input side of the waveguide 1110.

In some embodiments, the waveguide 1110 may include a plurality of couplers embedded in the waveguide 1110, such as an in-coupling element 1135 embedded at a first portion 1111 (e.g., input portion) of the waveguide 1110, a folding or redirecting element 1140 embedded at a second portion 1112 of the waveguide 1110, and an out-coupling element 1145 embedded at a third portion 1113 (e.g., output portion) of the waveguide 1110 where the eye-box region 1159 is located. The second portion 1112 may be located between the first portion 1111 and the third portion 1113 of the waveguide 1110. The eye-box region 1159 may not overlap with the in-coupling element 1135 or the folding element 1140.

The in-coupling element 1135 may be configured to couple the input image light as an in-coupled image light 1132 propagating inside the waveguide 1110 via TIR. In some embodiments, the in-coupling element 1135 may include a highly reflective mirror. In some embodiments, the in-coupling element 1135 may not be embedded in the waveguide 1110. Instead, the in-coupling element 1135 may be disposed at a surface of the waveguide 1110. For example, the in-coupling element 1135 may include a prism disposed at a surface of the waveguide 1110.

The folding element 1140 may include an array of transflective elements (or partial reflectors) 1140a, referred to as folding mirrors 1140a for discussion purposes. The out-coupling element 1145 may include an array of transflective elements (or partial reflectors) 1145a, referred to as out-coupling mirrors 1145a for discussion purposes. A transflective element (or partial reflector) may be a facet having a transflective surface (or partial reflective surface) that reflects a first portion of an incident light and transmits a second portion of the incident light. The transmittance and the reflectance of the transflective element may be configurable depending on different applications. For example, in some embodiments, the transmittance and the reflectance of the folding mirror 1140a (or out-coupling mirror 1145a) may be configured to be about 85% and 15%, respectively. The transmittance and reflectance of the folding mirror 1140a may be the same as or different from the transmittance and reflectance of the out-coupling mirror 1145a.

The in-coupled image light 1132 may propagate inside the waveguide 1110 toward the redirecting element 1140 via TIR along a first direction shown in FIG. 11A (which is a first pupil expansion or replication direction). As shown in FIG. 11A, when the in-coupled image light 1132 propagating in the first direction is incident onto the array of folding mirrors 1140a, each folding mirror 1140a may reflect a portion of the in-coupled image light 1132 as a redirected image light 1132 (indicated by a dashed arrow) propagating in a second direction as shown in FIG. 11A, and transmit the rest of the in-coupled image light 1132 for further TIR propagation along the first direction toward a next folding mirror 1140a. Thus, the array of folding mirrors 1140a may split the in-coupled image light 1132 into a plurality of redirected image lights 1132 (indicated by dashed arrows) propagating inside the waveguide 1110 along different parallel paths in the second direction, toward the array of out-coupling mirrors 1145a. Thus, the redirecting element 1140 or the array of folding mirrors 1140a may expand the input image light received from the light source assembly in the first direction as shown in FIG. 11A. For discussion purposes, FIG. 11A shows four redirected image lights 1132 (denoted by dashed arrows) propagating inside the waveguide 1110 along different paths in the second direction, and a central ray of the respective redirected image light 1132.

The array of out-coupling mirrors 1145a may receive the redirected image lights 1132 from the array of folding mirrors 1140a. When a redirected image light 1132 is incident onto the array of out-coupling mirrors 1145a, each out-coupling mirror 1145a may couple, via reflection, a portion of the redirected image light 1132 out of the waveguide 1110 as an output image light 1134, and transmit the rest of the redirected image light 1132 for further TIR propagation along the second direction toward a next out-coupling mirror 1145a. Thus, each redirected image light 1132 may be reflected by the array of out-coupling mirrors 1145a as a plurality of output image lights 1134 distributed along the second direction as shown in FIG. 11A (which is a second pupil expansion direction). Thus, the array of out-coupling mirrors 1145a may expand the input image light received from the light source assembly in the second direction as shown in FIG. 11A. For discussion purposes, FIG. 11A merely illustrates five output image lights 1134, and a central ray of the respective output image light 1134.

Thus, the waveguide 1110 with the embedded out-coupling element 1145 and redirecting element 1140 may provide a first beam expansion long the first direction and a second beam expansion long the second direction, thereby realizing the 2D pupil replication at the output side of the waveguide 1110. The output image lights 1134 may be distributed along both the first direction and the second direction. The output image lights 1134 may propagate toward a plurality of exit pupils 1157 located within the eye-box region 1159 of the waveguide display system 1100. An exit pupil 1157 is a region in space where an eye pupil 1158 of an eye 1160 of a user is positioned in the eye-box region 1159 to receive the content of a virtual image output from the display element. The exit pupils 1157 may be arranged in a two-dimensional ("2D") array within the eye-box region 1159. The eye-box region 1159 overlaps with all, or most, of the possible positions of the eye pupil 1158 of the user. This feature, referred to as "pupil expansion," creates the effect of a full real-life image as perceived by the user, rather than a moving eye pupil characteristic provided by other viewing instruments (e.g., binoculars, microscopes, or telescopes).

In some embodiments, the folding mirror 1140a may be configured to be an angularly selective mirror, and the system 1100 may be configured to reduce the second type of world side ghost (or rainbow) via configuring an angular selectivity of the folding mirror 1140a. As discussed above in connection with FIG. 10D, the inventors observed that the AOI range of the real-world light 952-2 at the front surface 961 of the folding mirror 940-1 is from 64.35° to 70.09°, which does not overlap with any of the AOI range of the image light 932 at the front surface 961, the AOI range of the real-world light 952-1 at the front surface 961, and the AOI range of the real-world light 952-2 at the back surface 962. Thus, through configuring the angular selectivity of the folding mirror 1140a, the real-world light 952-2 may be diverted from propagating toward the eye-box region 1159, whereas the optical path of the image light 1132 inside the waveguide 1110 may not be affected. Accordingly, the second type of world side ghost (or rainbow) may be reduced at the eye-box region 1159.

Figure 11B:
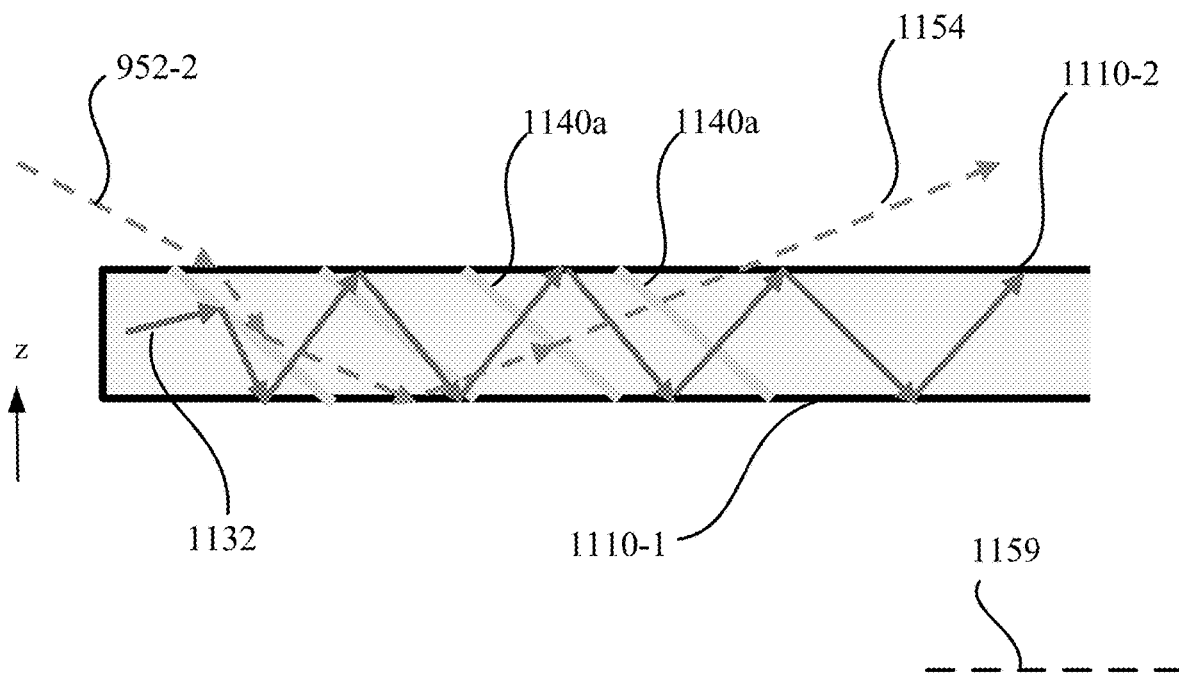
FIG. 11B illustrates a cross-sectional view of a portion of a waveguide along a first direction shown in FIG. 11A, showing an optical path of an image light and an optical path of a real-world light in the system shown in FIG. 11A, according to an embodiment of the present disclosure.
Figure 11C:
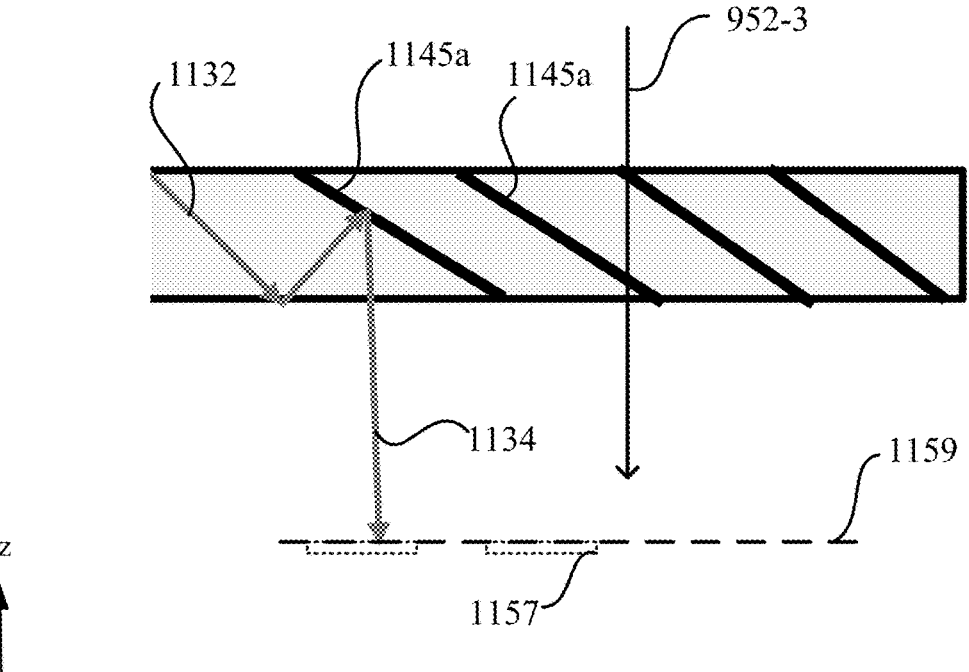
FIG. 11C illustrates a cross-sectional view of a portion of the waveguide along a second direction shown in FIG. 11A, showing an optical path of an image light and an optical path of a real-world light in the system shown in FIG. 11A, according to an embodiment of the present disclosure.
Figure 11D:
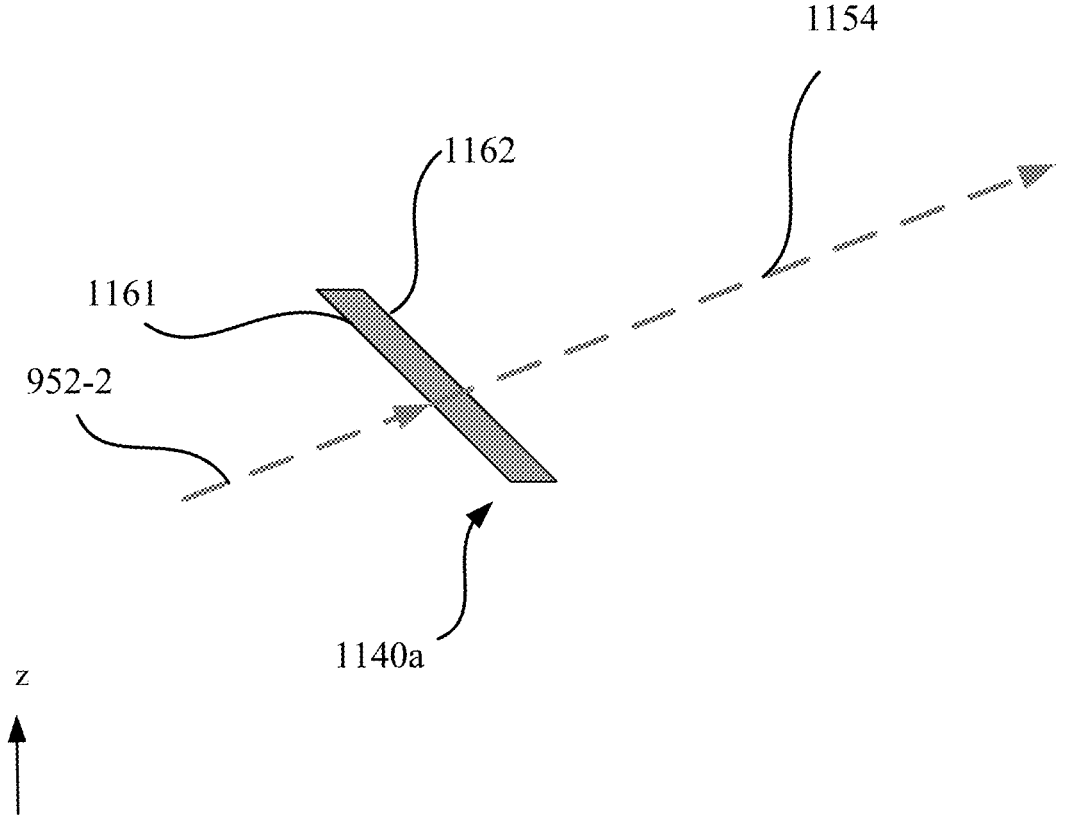
FIG. 11D illustrates a schematic diagram of a folding mirror embedded in the waveguide shown in FIG. 11B, according to an embodiment of the present disclosure.

FIG. 11B illustrates a cross-sectional view of a portion of the waveguide 1110 along the first direction shown in FIG. 11A, showing an optical path of the real-world light 952-2 (represented by a dashed arrow), and an optical path of the in-coupled image light 1132 (represented by solid arrows) inside the waveguide 1110. FIG. 11C illustrates a cross-sectional view of a portion of the waveguide 1110 along the second direction shown in FIG. 11A, showing an optical path of the in-coupled image light 1132 (represented by solid arrows) inside the waveguide 1110. FIG. 11D illustrates a cross-sectional view of the folding mirror 1140a along the first direction in FIG. 11A. As shown in FIG. 11D, the folding mirror 1140a may have a front surface 1161 facing the eye-box region 1159, and a back surface 1162 facing the real world environment.

As shown in FIG. 11B and FIG. 11D, the folding mirror 1140a may be configured to be angular selective. For example, the folding mirror 1140a may be configured to partially reflect or substantially transmit an incident light, depending on an AOI of the incident light at the front surface 1161 of the folding mirror 1140a shown in FIG. 11D. In some embodiments, when the AOI of the incident light at the front surface 1161 of the folding mirror 1140a is greater than or equal to a first predetermined angle, the folding mirror 1140a may be configured to substantially transmit the incident light (with a substantially high transmittance, e.g., above 95%). When the AOI of the incident light at the front surface 1161 of the folding mirror 1140a is less than the first predetermined angle, the folding mirror 1140a may be configured to partially reflect and partially transmit the incident light, e.g., with a 15% reflectance and 85% transmittance. In some embodiments, the folding mirror 1140a may also be referred to as an AOI cutoff coating, where the cutoff AOI is the first predetermined angle. In some embodiments, the folding mirror 1140a may include a dielectric multi-layer coating.

As shown in FIG. 11B, the waveguide 1110 may include a first side or surface 1110-1 facing the eye-box region 1159, and a second side or surface 1110-2 facing the real world environment. The real-world light 952-2 may be incident onto the second side or surface 1110-2 of the light guide 1110. As discussed above, the AOI range of the real-world light 952-2 at the front surface 1161 of the folding mirror 1140a is from 64.35° to 70.09°, and the AOI range of the in-coupled image light 1132 at the front surface 1161 of the folding mirror 1140a is from 31.31° to 50.8°. In some embodiments, the first predetermined angle may be configured to be between a maximum AOI of the AOI range of the in-coupled image light 1132 at the front surface 1161 of the folding mirror 1140a and a minimum value of the AOI range of the real-world light 952-2 at the front surface 1161 of the folding mirror 1140a. For example, the first predetermined angle may be configured to be in a range from 55° to 65°, 55° to 60°, or 60° to 65°. Thus, the folding mirror 1140a may substantially transmit the real-world light 952-2 that has been coupled into the TIR propagation path inside the waveguide 1110 toward the real world environment located outside of the second side 1110-2 of the waveguide 1110, whereas the in-coupled image light 1132 may still be partially reflected and partially transmitted.

For example, as shown in FIG. 11B, the real-world light 952-2 (represented by a dashed arrow) may be incident onto the back surface 1162 of the folding mirror (referred to as a first folding mirror) 1140a, and coupled into the TIR propagation path inside the waveguide 1110 via the first folding mirror 1140a. The real-world light 952-2 coupled into the TIR propagation path inside the waveguide 1110 may propagate inside the waveguide 1110 via TIR, and may be incident onto the front surface 1161 of another folding mirror (referred to as a second folding mirror) 1140a. As the AOI of the real-world light 952-2 at the front surface 1161 of the second folding mirror 1140a may be greater than or equal to the first predetermined angle, the second folding mirror 1140a may substantially transmit the real-world light 952-2 that has been coupled into the TIR propagation path inside the waveguide 1110 toward the real world environment located outside of the second surface 1110-2 of the waveguide 1110, thereby diverting the real-world light 952-2 from propagating toward the out-coupling mirror 1145a. That is, the real-world light 952-2, which otherwise would be incident onto the out-coupling mirror 1145a and coupled out of the waveguide 1110 via the out-coupling mirror 1145a toward the eye-box region 1159, may be substantially transmit toward the real world environment located outside of the second surface 1110-2 without reaching the out-coupling mirror 1145a.

For example, FIG. 11A shows that the second folding mirror 1140a substantially transmits the real-world light 952-2 that has been coupled into the TIR propagation path inside the waveguide 1110 as a real-world light 1154, which propagate toward the real world environment located outside of the second surface 1110-2 of the waveguide 1110. The real-world light 1154 may not be incident onto the out-coupling mirror 1145a and, thus, may not be coupled out of the waveguide 1110 via the out-coupling mirror 1145a toward the eye-box region 1159. Thus, the second type of world side ghost (or rainbow) caused by the dispersion of the real-world light 952-2 at the eye-box region 1159 may be significantly reduced.

Referring to FIGS. 11B and 11C, as the AOI of the in-coupled image light 1132 at the front surface 1161 of the folding mirror 1140a is less than the first predetermined angle, the folding mirror 1140a may partially reflect and partially transmit the in-coupled image light 1132 incident thereon. That is, the optical path of the in-coupled image light 1132 inside the waveguide 1110 may not be affected by the angular selectivity of the folding mirror 1140a. As shown in FIG. 11C, the in-coupled image light 1132 may be coupled out of the waveguide 1110 via the out-coupling mirrors 1145a as the output image lights 1134 prorogating toward the eye-box region 1159. The real-world light 952-3 incident onto the third portion 1113 of the waveguide 1110 where the array of the out-coupling mirrors 1145a are located may propagate through the waveguide 1110. Thus, the eye 1160 located within the eye-box region 1159 may perceive the virtual image superimposed with real-world image, with a reduced rainbow effect and an enhanced image quality.

Figure 11E:
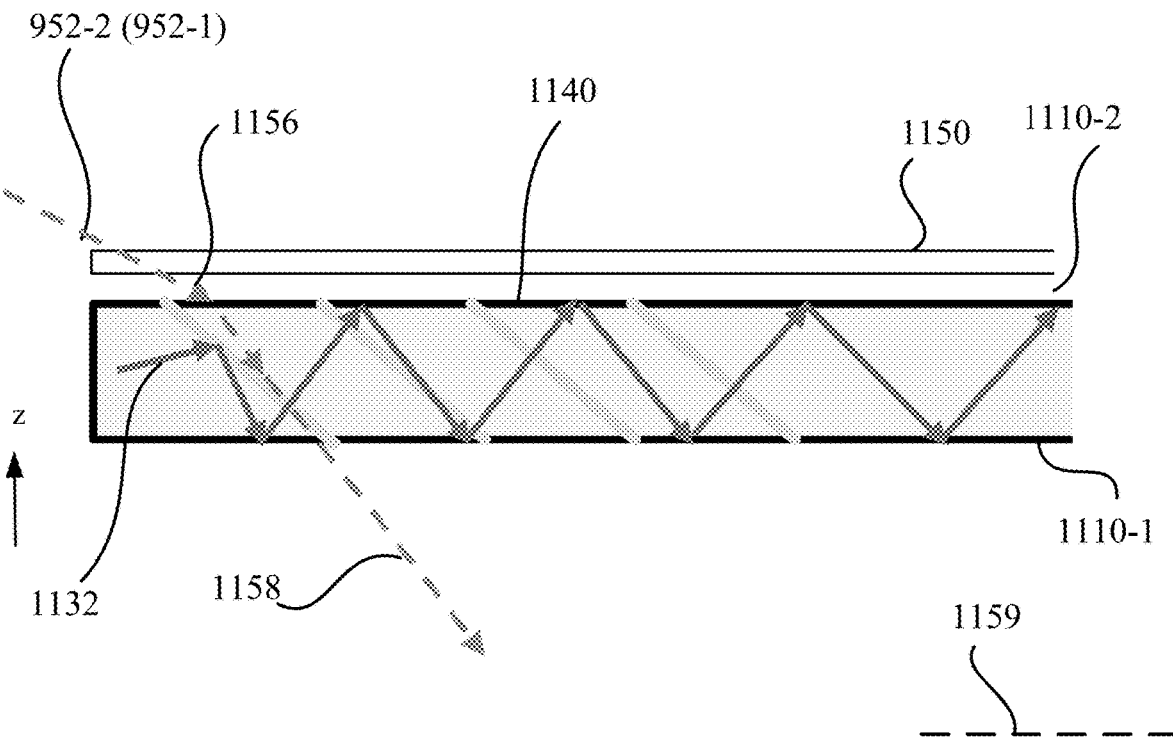
FIG. 11E illustrates a cross-sectional view of a portion of the waveguide along a first direction, showing an optical path of an image light and an optical path of a real-world light in the system shown in FIG. 11A, according to an embodiment of the present disclosure.
Figure 11F:
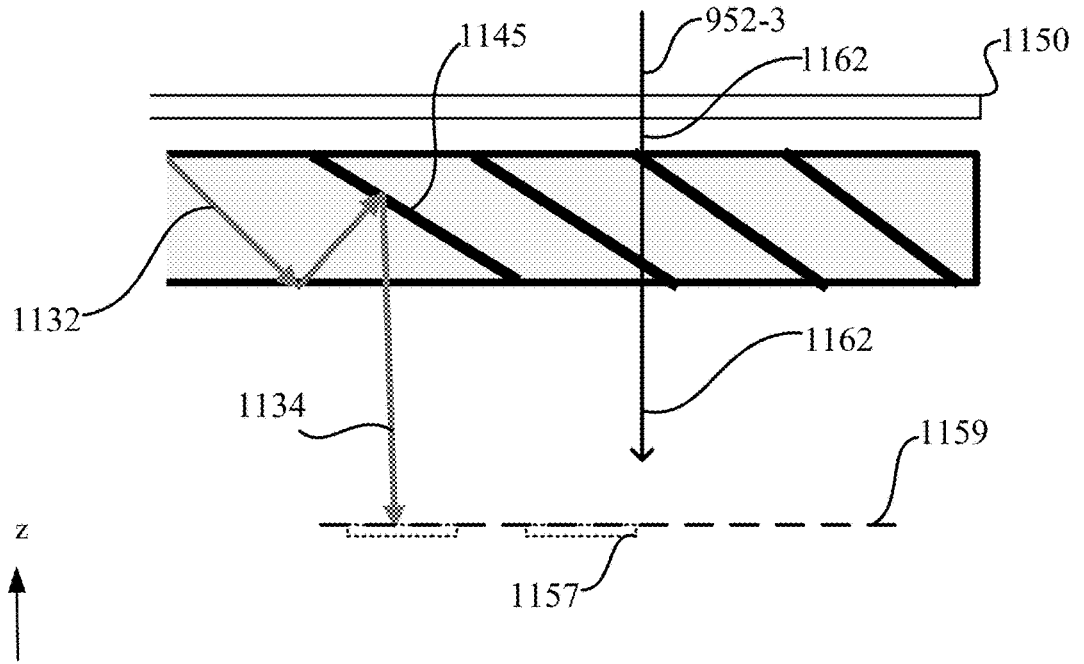
FIG. 11F illustrates a cross-sectional view of a portion of the waveguide along a second direction shown in FIG. 11A, showing an optical path of an image light and an optical path of a real-world light in the system shown in FIG. 11A, according to an embodiment of the present disclosure.

In some embodiments, the folding mirror 1140a may be configured to be a polarization selective mirror, and the system 1100 may be configured to reduce both the first type and second type of world side ghosts (or rainbows) via configuring the polarization selectivity of the folding mirror 1140a. FIG. 11E illustrates a cross-sectional view of a portion of the waveguide 1110 along the first direction shown in FIG. 11A, showing an optical path of the real-world light 952-2 (represented by a dashed arrow), and an optical path of the in-coupled image light 1132 (represented by solid arrows) inside the waveguide 1110. FIG. 11F illustrates a cross-sectional view of a portion of the waveguide 1110 along the second direction shown in FIG. 11A, showing an optical path of the in-coupled image light 1132 (represented by solid arrows) inside the waveguide 1110.

As shown in FIGS. 11E and 11F, the system 1100 may further include a polarizer 1150. The polarizer 1150 is shown as separated from the waveguide 1110 for illustrative purposes. In practice, the polarizer 1150 may be disposed directly on the second surface 1110-2 facing the real world environment, or may be disposed at a distance or gap from the second surface 1110-2 of the waveguide 1110. The polarizer 1150 may at least overlap with the second portion

1112 of the waveguide 1110 where the folding mirrors 1140a are embedded. In some embodiments, the polarizer 1150 may also overlap with the third portion 1113 of the waveguide 1110 where the out-coupling mirrors 1145a are embedded. The polarizer 1150 may be configured to substantially transmit a light having a first polarization, and substantially block a light having a second polarization that is perpendicular to the first polarization, e.g., via absorption, or reflection, etc. The first polarization and the second polarization may be two orthogonal circular polarizations or two orthogonal linear polarizations.

Referring to FIG. 11E, the folding mirror 1140a may be configured to selectively partially reflect or substantially transmit an incident light, depending on a polarization state of the incident light. In some embodiments, the folding mirror 1140a may be configured to substantially transmit the incident light (with a substantially high transmittance, e.g., above 95%) when the incident light has the first polarization, and partially reflect and partially transmit the incident light when the incident light has the second polarization that is perpendicular to the first polarization, e.g., with a 15% reflectance and 85% transmittance.

The real-world light 952-2 (represented by a dashed arrow) may be an unpolarized light, and the polarizer 1150 may transmit the real-world light 952-2 as a real-world light 1156 having the first polarization toward the folding mirror 1140a. The folding mirror 1140a may substantially transmit the real-world light 1158 having the first polarization as a real-world light 1158 propagating through the waveguide 1110. The real-world light 1158 may not interact with the out-coupling mirror 1145a. Thus, the second rainbow effect caused by the wavelength-dependent reflection of the real-world light 952-2 at the folding mirror 1140a and the out-coupling mirror 1145a may be reduced. The optical path of the real-world light 952-1 may be similar to that of the real-world light 952-2 and, thus, the first rainbow effect caused by the wavelength-dependent reflection of the real-world light 952-1 at the folding mirror 1140a may be reduced.

On the other hand, the in-coupled image light 1132 may be configured to have the second polarization. Thus, the folding mirror 1140a may partially reflect and partially transmit the in-coupled image light 1132 having the second polarization. That is, the optical path of the in-coupled image light 1132 inside the waveguide 1110 may not be affected by the polarization selectivity of the folding mirror 1140a. Referring to FIG. 11F, the in-coupled image light 1132 may be coupled out of the waveguide 1110 via the out-coupling mirrors 1145a as the output image lights 1134 prorogating toward the eye-box region 1159.

In some embodiments, the out-coupling mirror 1145a may also be configured to have the same polarization selectivity as the folding mirror 1140a. Thus, after the polarizer 1150 transmits the real-world light 952-3 as a real-world light 1162 having the first polarization, the out-coupling mirror 1145a may substantially transmit the real-world light 1162 having the first polarization toward the eye-box region 1159. Thus, the rainbow effect perceived at the eye-box region 1159 may be further reduced. Further, the out-coupling mirror 1145a may partially reflect and partially transmit the in-coupled image light 1132 having the second polarization, thereby coupling the in-coupled image light 1132 out of the waveguide 1110 as the output image lights 1134 prorogating toward the eye-box region 1159. Thus, the eye 1160 located within the eye-box region 1159 may perceive the virtual image superimposed with real-world image, with a reduced rainbow effect and an enhanced image quality. In some embodiments, the out-coupling mirror 1145a may also be configured to polarization non-selective. In some embodiments, the folding mirror 1140a may be configured to have both the angular selectivity shown in FIG. 11B and the polarization selectively shown in FIG. 11E.

Figure 12A:
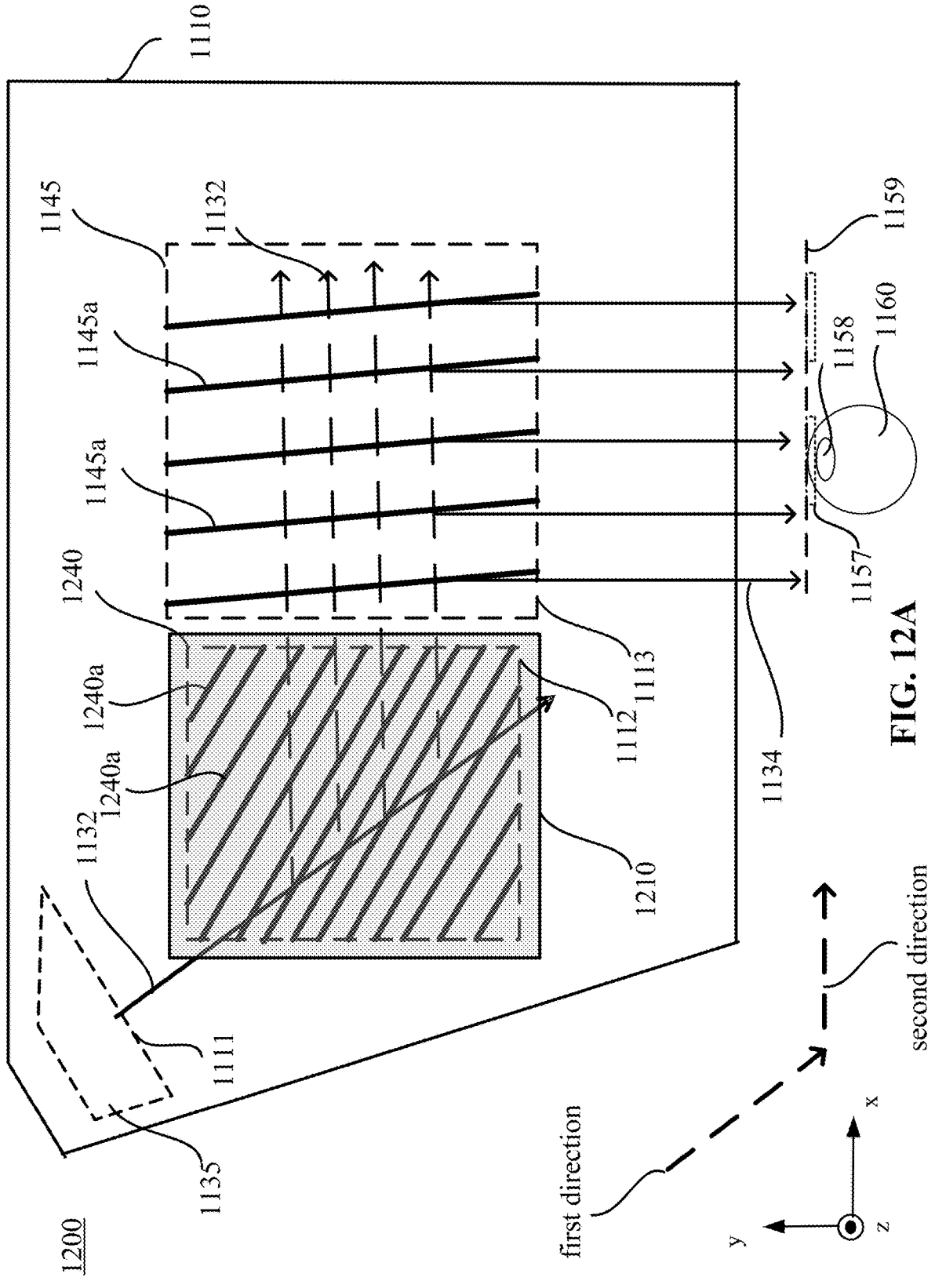
FIG. 12A illustrates a schematic diagram of a waveguide display system configured to reduce a world side ghost (or rainbow), according to an embodiment of the present disclosure.

FIG. 12A illustrates an x-y sectional view of a waveguide display system 1200 configured to reduce a rainbow effect, according to an embodiment of the present disclosure. The system 1200 may be implemented into an artificial reality device for AR and/or MR applications. The system 1200 may be a geometric waveguide display system. The system 1200 may include elements, structures, and/or functions that are the same as or similar to those included in the system 1100 shown in FIG. 11A. Detailed descriptions of the same or similar elements, structures, and/or functions may refer to the above descriptions rendered in connection with FIG. 11A. The system 1200 may include the light source assembly (not shown), the waveguide 1110, the in-coupling element 1135 embedded in the first portion 1111 of the waveguide 1110, a folding or redirecting element 1240 embedded in the second portion 1112 of the waveguide 1110, and the out-coupling element 1145 embedded in the third portion 1113 of the waveguide 1110. The folding element 1240 may include an array of folding mirrors 1240a, and the out-coupling element 1145 may include the array of out-coupling mirrors 1145a.

Figure 12B:
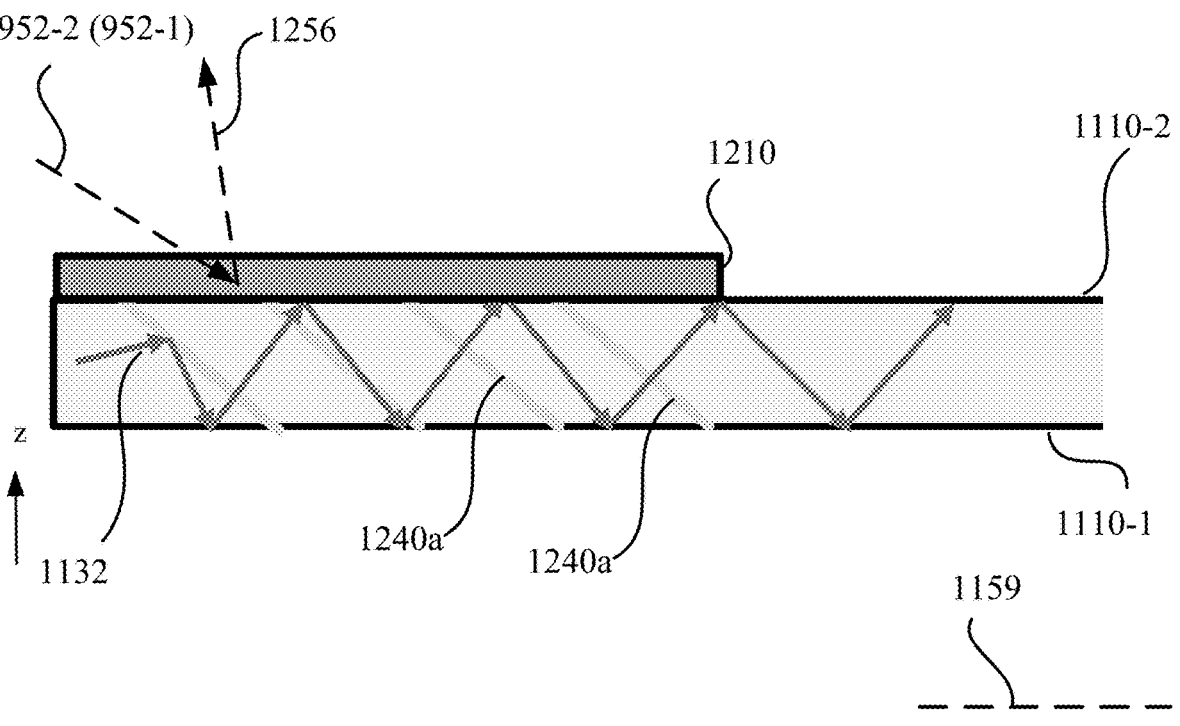
FIG. 12B illustrates a cross-sectional view of a portion of a waveguide along a first direction shown in FIG. 12A, showing an optical path of an image light and an optical path of a real-world light in the system shown in FIG. 12A, according to an embodiment of the present disclosure.
Figure 12C:
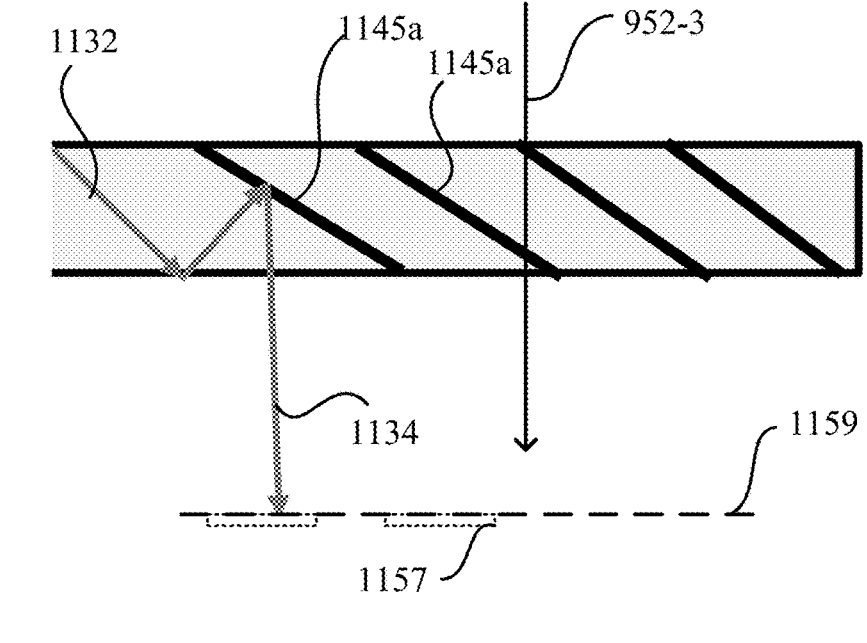
FIG. 12C illustrates a cross-sectional view of a portion of the waveguide along a second direction shown in FIG. 12A, showing an optical path of an image light and an optical path of a real-world light in the system shown in FIG. 12A, according to an embodiment of the present disclosure.

FIG. 12B illustrates a cross-sectional view of a portion of the waveguide 1110 along the first direction shown in FIG. 12A, showing an optical path of the real-world light 952-2 (represented by a dashed arrow), and an optical path of the in-coupled image light 1132 (represented by solid arrows) inside the waveguide 1110. FIG. 12C illustrates a cross-sectional view of a portion of the waveguide 1110 along the second direction shown in FIG. 12A, showing an optical path of the in-coupled image light 1132 (represented by solid arrows) inside the waveguide 1110. As shown in FIGS. 12A and 12B, the waveguide 1110 may have the first surface 1110-1 facing the eye-box region 1159 and the second surface 1110-2 opposite to the first surface 1110-1. The system 1200 include an optical filter disposed at the second surface 1110-2 of the waveguide 1110, and may be in contact with the second surface 1110-2, or may be separated from the second surface 1110-2 by another film or a small gap. Along a thickness direction of the waveguide 1110 (e.g., a z-axis direction shown in FIGS. 12A and 12B), the optical filter 1210 may at least partially overlap with the second portion 1112 of the waveguide 1110 where the array of folding mirrors 1240a are embedded, and may not overlap with the third portion 1113 of the waveguide 1110 where the array of out-coupling mirrors 1145a are disposed. In some embodiments, the optical filter 1210 may substantially overlap (e.g., 80%, 90%, 100%) with the second portion 1112 of the waveguide 1110 where the array of folding mirrors 1240a are embedded. That is, the optical filter 1210 may only interact with the real-world lights 952-1 and 952-2 that are incident onto the second portion 1112 of the waveguide 1110, and may not interact with the real-world light 952-3 that is incident onto the third portion 1113 of the waveguide 1110.

The optical filter 1210 may be an angularly selective filter, and the system 1200 may be configured to reduce the world side ghost (or rainbow) via configuring an angular selectivity of the optical filter 1210. As discussed above in connection with FIG. 10F, the inventors observed that the first type of world side ghost has a vertical angular position ranging from about −90° to about −30° and a horizontal angular position ranging from about −70° to about −20°. The second type of world side ghost has a vertical angular position ranging from about 80° to about 40° and a horizontal angular position ranging from about −70° to about −40°. Thus, through configuring the angular selectivity of the optical filter 1210, the real-world light 952-1 (and the real-world light 952-2) may be diverted from propagating toward the eye-box region 1159. Accordingly, the first type of world side ghost (and the second type of world side ghost) may be reduced at the eye-box region 1159.

Referring to FIG. 12B, in some embodiments, when the AOI of the light at the optical filter 1210 is greater than or equal to a second predetermined angle (e.g., 40°, 50°, or 60°, etc.), the optical filter 1210 may be configured to substantially deflect (via diffraction) the incident light. When the AOI of the light at the optical filter 1210 is less than the second predetermined angle (e.g., 40°, 50°, or 60°, etc.), the optical filter 1210 may be configured to substantially transmit the incident light, with negligible diffraction. Thus, the optical filter 1210 may substantially reflect (via diffraction) the real-world light 952-1 as a real-world light 1256 back to the real world environment, thereby diverting the real-world light 952-1 from propagating toward the eye-box region 1159. Accordingly, the first type of world side ghost may be reduced at the eye-box region 1159. In some embodiments, the optical filter 1210 may also substantially reflect (via diffraction) the real-world light 952-2 back to the real world environment, thereby diverting the real-world light 952-2 from propagating toward the eye-box region 1159. Accordingly, the second type of world side ghost may be reduced at the eye-box region 1159.

The optical filter 1210 may include a suitable angularly selective filter. In some embodiments, the optical filter 1210 may include a photonic crystal. In some embodiments, the optical filter 1210 may include a volume Bragg grating ("VBG") coating or film. In some embodiments, the optical filter 1210 may include a multiplexed VBG, in which a plurality of different grating periods may be recorded. Thus, the multiplexed VBG may substantially reflect (via diffraction) different wavelength components of a visible polychromatic light (e.g., a white light). For example, in some embodiments, the multiplexed VBG may be configured with three different grating periods corresponding to a red wavelength range, a green wavelength range, and a blue wavelength range, respectively. When the real-world light 952-1 having an AOI greater than or equal to the second predetermined angle is incident onto the multiplexed VBG, the multiplexed VBG may substantially reflect (via diffraction) each of the red wavelength component, the green wavelength component, and the blue wavelength component back to the real world environment.

Referring to FIG. 12C, as the optical filter 1210 does not overlap with the third portion (or the output portion) 1113 of the waveguide 1110, the optical filter 1210 may not attenuate the real-world light 952-3 incident onto the third portion 1113 of the waveguide 1110 where the array of the out-coupling mirrors 1145a are located. That is, the real-world light 952-3 may propagate through the waveguide 1110, without being attenuated by the optical filter 1210. Thus, the brightness of the see-through view observed through the third portion (or the output portion) 1113 of the waveguide 1110 may not be degraded by the optical filter 1210. Thus, the eye 1160 located within the eye-box region 1159 may perceive the virtual image superimposed with real-world image, with a reduced rainbow effect and an enhanced image quality.

Figure 13:
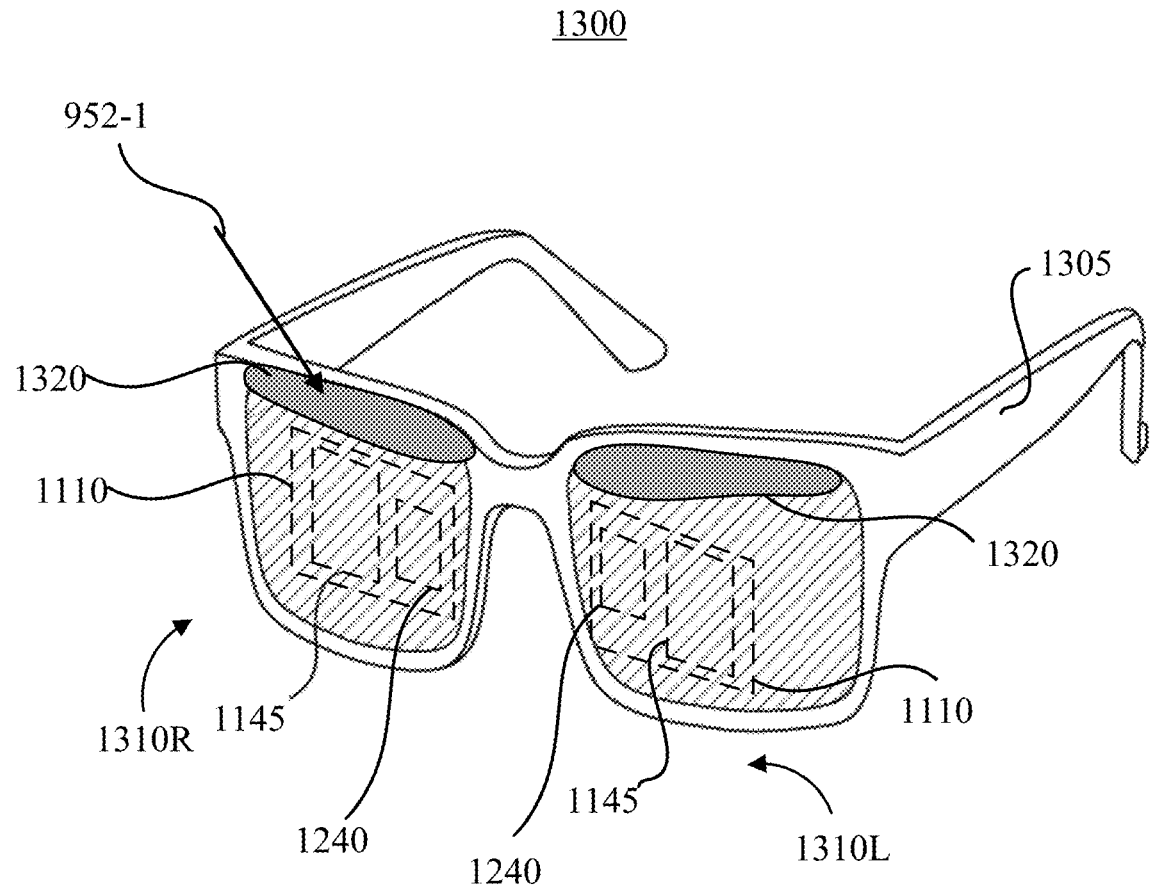
FIG. 13 illustrates a schematic diagram of an artificial reality device configured to reduce a world side ghost (or rainbow), according to an embodiment of the present disclosure.

FIG. 13 illustrates a schematic diagram of an artificial reality device 1300 configured to reduce a world side ghost (or rainbow), according to an embodiment of the present disclosure. The artificial reality device 1300 may include a frame 1305 configured to mount to a user's head. The frame 1305 is merely an example structure to which various components of the artificial reality device 1300 may be mounted. Other suitable type of fixtures may be used in place of or in combination with the frame 1305. In some embodiments, the frame 1305 may represent a frame of eyeglasses. The artificial reality device 1300 may include a right-eye display system 1310R and a left-eye display system 1310L mounted to the frame 1305. Each of the right-eye display system 1310R and the left-eye display system 1310L may include a waveguide display system. For discussion purposes, FIG. 13 merely shows the waveguide 1110, and the array of folding mirrors 1240a (1240), and the array of out-coupling mirrors 1145a (1145) embedded into the waveguide 1110.

The artificial reality device 1300 may also include a brim 1320 configured for each of the right-eye display system 1310R and a left-eye display system 1310L. In some embodiments, the brim 1320 may be mounted to the frame 1305, e.g., mounted to the horizontal piece of the frame 1305 that runs across the top of the lens. In some embodiments, the brim 1320 may be integrally formed as a part of the frame 1305. As discussed above in connection with FIG. 10F, the inventors observed that the first type of world side ghost has a vertical angular position ranging from about −90° to about −30° (the negative vertical FOV directions correspond to angles above the horizontal plane of the eye 960). The brim 1320 may be configured to absorb, reflect, and/or scatter the real-world light 952-1, thereby substantially blocking the real-world light 952-1 from being incident onto the folding mirrors 1240a. Thus, the first type of world side ghost perceived at the eye-box region 1159 may be significantly reduced.

The elements in the waveguide display systems and the features of the waveguide display systems as described in various embodiments may be combined in any suitable manner, for reducing various rainbow effects. For example, in some embodiments, the waveguide display system 1100 shown in FIG. 11A may also include the optical filter 1210 shown in FIGS. 12A and 12B. In some embodiments, waveguide display system 1200 shown in FIG. 12A may also include the folding mirror 1140a having the angular selectivity shown in FIG. 11B and/or the polarization selectively shown in FIG. 11E. In some embodiments, an artificial reality device including the waveguide display system 1100 shown in FIG. 11A may also include the brim 1320 shown in FIG. 13. In some embodiments, an artificial reality device including the waveguide display system 1200 shown in FIG. 12A may also include the brim 1320 shown in FIG. 13.

The arrangement of the various mirrors 1135, 1140a, 1145a shown in FIGS. 11A-11F, and the arrangement of the various mirrors 1135, 1240a, 1145a shown in FIGS. 12A-12C are for illustrative purposes. The mechanisms and design principles disclosed herein for reducing the rainbow effect may be applied to other suitable geometric waveguide display systems. For example, in some embodiments, the couplers in the geometric waveguide display systems may include partially mirrors, beam splitters, or fully reflective mirrors, or a combination thereof, etc. The mirrors in the geometric waveguide display systems may have suitable shapes, such as bar mirror arrays, pin-hole mirrors, etc. The geometric waveguide display system may be a 1D geometric waveguide display system, a 2D geometric waveguide display system, or a Kaleido waveguide display system, etc. The mechanisms and design principles disclosed herein for reducing the rainbow effect may also be applied to other types of waveguide which has the rainbows (world side ghosts), such as a diffractive waveguide with surface relief gratings, a diffractive waveguide with polarization volume holograms, a diffractive waveguide with volume Bragg gratings, or a mixed waveguide including both reflective coupler and diffractive couplers, etc.

Figure 14A:
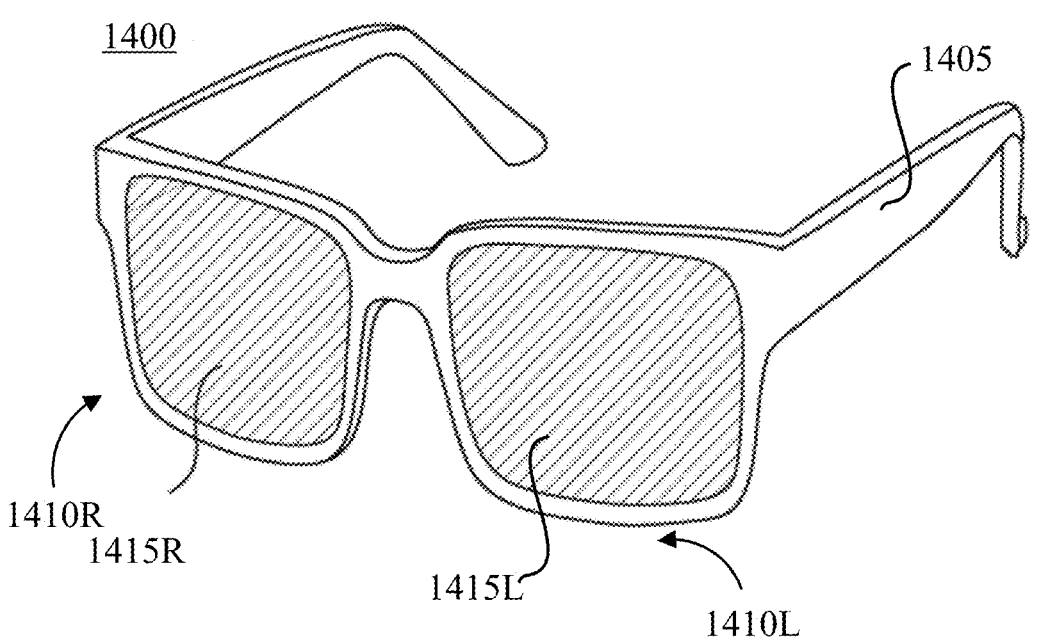
FIG. 14A illustrates a schematic diagram of an artificial reality device, according to an embodiment of the present disclosure.

FIG. 14A illustrates a schematic diagram of an artificial reality device 1400 according to an embodiment of the present disclosure. In some embodiments, the artificial reality device 1400 may produce VR, AR, and/or MR content for a user, such as images, video, audio, or a combination thereof. In some embodiments, the artificial reality device 1400 may be smart glasses. In one embodiment, the artificial reality device 1400 may be a near-eye display ("NED"). In some embodiments, the artificial reality device 1400 may be in the form of eyeglasses, goggles, a helmet, a visor, or some other type of eyewear. In some embodiments, the artificial reality device 1400 may be configured to be worn on a head of a user (e.g., by having the form of spectacles or eyeglasses, as shown in FIG. 14A), or to be included as part of a helmet that is worn by the user. In some embodiments, the artificial reality device 1400 may be configured for placement in proximity to an eye or eyes of the user at a fixed location in front of the eye(s), without being mounted to the head of the user. In some embodiments, the artificial reality device 1400 may be in a form of eyeglasses which provide vision correction to a user's eyesight. In some embodiments, the artificial reality device 1400 may be in a form of sunglasses which protect the eyes of the user from the bright sunlight. In some embodiments, the artificial reality device 1400 may be in a form of safety glasses which protect the eyes of the user. In some embodiments, the artificial reality device 1400 may be in a form of a night vision device or infrared goggles to enhance a user's vision at night.

Figure 14B:
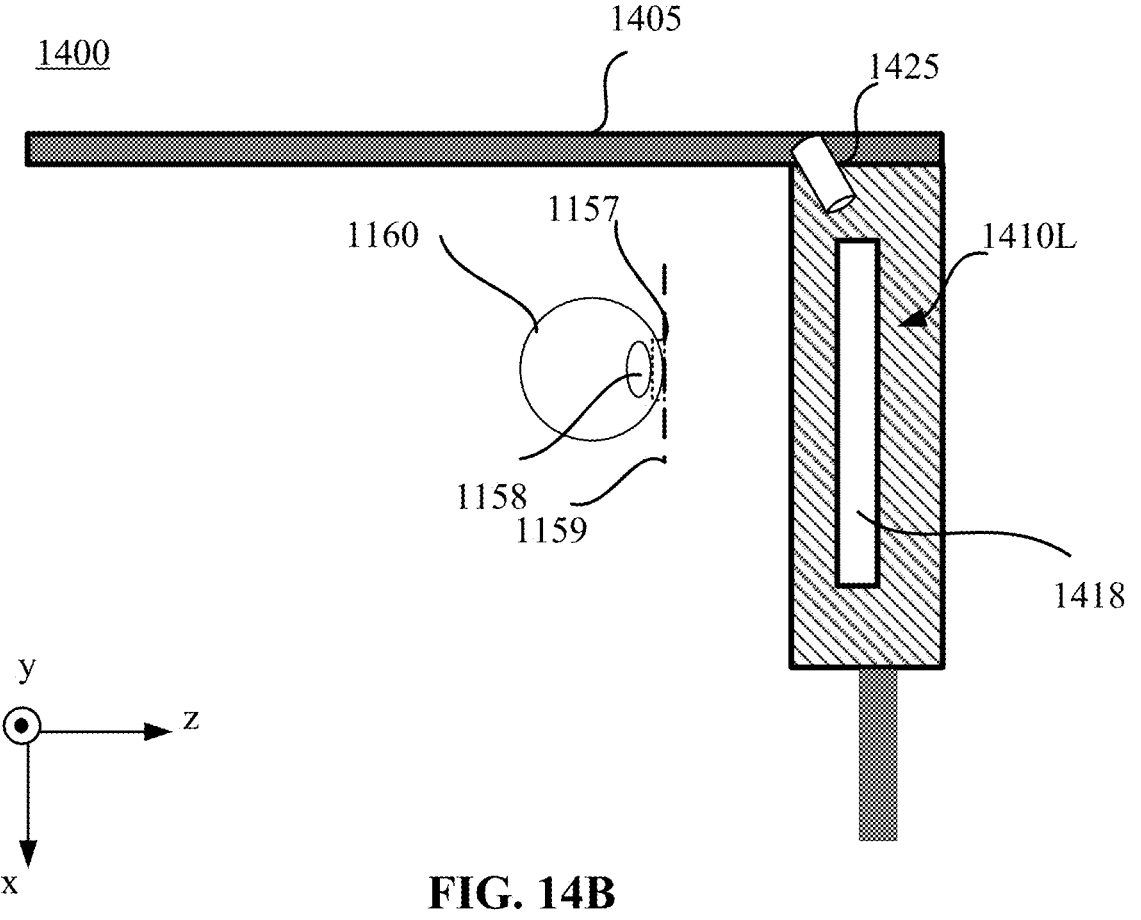
FIG. 14B illustrates a schematic cross sectional view of half of the artificial reality device shown in FIG. 14A, according to an embodiment of the present disclosure.

For discussion purposes, FIG. 14A shows that the artificial reality device 1400 includes a frame 1405 configured to mount to a user's head, and left-eye and right-eye display systems 1410L and 1410R mounted to the frame 1405. FIG. 14B is a cross-sectional view of half of the artificial reality device 1400 shown in FIG. 14A according to an embodiment of the present disclosure. For discussion purposes, FIG. 14B shows the cross-sectional view associated with the left-eye display system 1410L. The frame 1405 is merely an example structure to which various components of the artificial reality device 1400 may be mounted. Other suitable type of fixtures may be used in place of or in combination with the frame 1405.

In some embodiments, the left-eye and right-eye display systems 1410L and 1410R each may include suitable image display components configured to generate an image light representing a virtual image, and guide the image light toward the eye-box region 1159. In some embodiments, the left-eye and right-eye display systems 1410L and 1410R each may include suitable optical components configured to direct the image light toward the eye-box region 1159. For illustrative purposes, FIG. 14B shows that the left-eye display systems 1410L may include a light source assembly (e.g., a projector) 1425 coupled to the frame 1405 and configured to generate the image light representing a virtual image. In some embodiments, the left-eye and right-eye display systems 1410L and 1410R each may include a waveguide display system disclosed herein, e.g., the system 1100 shown in FIGS. 11A-11D, the system 1100 shown in FIG. 11A and FIGS. 11E and 11F, or the system 1200 shown in FIG. 12A-12C. The user of the artificial reality device 1400, e.g., wearing the artificial reality device 1400, may perceive the virtual image superimposed with real-world image, with a reduced rainbow effect and an enhanced image quality.

In some embodiments, the present disclosure provides a device. The device includes a waveguide configured to guide an image light to propagate inside the waveguide via total internal reflection ("TIR"); an array of first mirrors embedded inside a first portion of the waveguide, and configured to split the image light into a plurality of redirected image lights propagating inside the waveguide; an array of second mirrors embedded inside a second portion of the waveguide, and configured to couple the redirected image lights out of the waveguide as a plurality of output image lights; and an optical filter disposed at a surface of the waveguide and at least partially overlapping with the first portion of the waveguide. The optical filter is configured to deflect a light from a real-world environment incident onto the optical filter at an incidence angle greater than or equal to a predetermined angle back to the real-world environment.

In some embodiments, the light from the real-world environment incident onto the optical filter at the incidence angle greater than or equal to the predetermined angle is a first light having a first incidence angle, the optical filter is configured to: transmit a second light from the real-world environment incident onto the optical filter at a second incidence angle less than the predetermined angle toward the first mirrors. In some embodiments, the optical filter does not overlap with the second portion of the waveguide. In some embodiments, the optical filter includes a volume Bragg grating. In some embodiments, the volume Bragg grating is a multiplexed volume Bragg grating having a plurality of different grating periods. In some embodiments, the optical filter includes a photonic crystal.

In some embodiments, the present disclosure provides a device. The device includes a waveguide configured to guide an image light to propagate inside the waveguide via total internal reflection ("TIR"); an array of folding mirrors embedded inside the waveguide, and configured to split the image light into a plurality of redirected image lights propagating inside the waveguide; and an array of out-coupling mirrors embedded inside the waveguide, and configured to couple the redirected image lights out of the waveguide as a plurality of output image lights. Each folding mirror has a first surface facing the real-world environment and a second surface facing an eye-box region of the device, and the folding mirror is configured to substantially transmit a light from a real-world environment incident onto the second surface of the folding mirror at an incidence angle greater than or equal to a predetermined angle.

In some embodiments, the folding mirror is configured to partially reflect the image light, which is incident onto the second surface of the folding mirror at the incidence angle less than the predetermined angle, toward the array of out-coupling mirrors. In some embodiments, the array of folding mirrors include a first folding mirror and a second folding mirror arranged in parallel, the first folding mirror is configured to couple a first light from the real-world environment incident on the first surface of the first folding mirror as a second light propagating inside the waveguide via TIR toward the second folding mirror, the second light being incident onto the second surface of the second folding mirror at the incidence angle greater than or equal to the predetermined angle, and the second folding mirror is configured to substantially transmit the second light out of the waveguide and toward the real-world environment. In some embodiments, the predetermined angle is in a range of 55° to 65°.

In some embodiments, the present disclosure provides a device. The device includes a waveguide configured to guide an image light to propagate inside the waveguide via total internal reflection; an array of folding mirrors embedded inside the waveguide, and configured to split the image light into a plurality of redirected image lights propagating inside the waveguide; and an array of out-coupling mirrors embedded inside the waveguide, and configured to couple the redirected image lights out of the waveguide as a plurality of output image lights. The folding mirrors are configured to substantially transmit a light from a real-world environment having a first polarization, and partially reflect the image light having a second polarization orthogonal to the first polarization toward the array of out-coupling mirrors. In some embodiments, the folding mirrors are configured to reflect a first portion of the image light having the second polarization toward the array of out-coupling mirrors, and transmit a second portion of the image light. In some embodiments, the device further includes a polarizer disposed at a side of the waveguide facing the real-world environment, wherein the polarizer is configured to transmit an unpolarized light from the real-world environment as the light from the real-world environment having the first polarization toward the folding mirrors.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the present disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system, comprising:
a light source configured to emit an infrared ("IR") light for illuminating an object; and
a waveguide imaging assembly including a waveguide comprising:
   a first in-coupling element disposed at a first portion of the waveguide,
   a first out-coupling element disposed at a second portion of the waveguide,
   a second in-coupling element disposed at the second portion of the waveguide,
   a second out-coupling element disposed at the first portion of the waveguide, and
   an optical sensor disposed facing the first out-coupling element,
wherein:
   the first in-coupling element is configured to couple the IR light reflected by the object into the waveguide, the waveguide is configured to guide the IR light to propagate toward the first out-coupling element through total internal reflection, and the first out-coupling element is configured to couple the IR light out of the waveguide toward the optical sensor,
   the second in-coupling element and the second out-coupling element are configured to deflect a visible light, and substantially transmit, with negligible deflection, the IR light, and
   the optical sensor is configured to generate a tracking signal of the object based on the IR light output from the waveguide.

2. The system of claim 1, wherein the first in-coupling element and the first out-coupling element are configured to deflect the IR light, and substantially transmit, with negligible deflection, a visible light.

3. The system of claim 1, wherein
the waveguide is configured to guide the IR light to propagate toward the first out-coupling element along a width direction of the waveguide via total internal reflection, and
along the width direction of the waveguide, a width of the first in-coupling element is configured to be at a sub-millimeter level.

4. The system of claim 3, wherein the width of the first in-coupling element is configured to be 200-300 micrometers, 300-400 micrometers, 400-500 micrometers, or 500-600 micrometers.

5. The system of claim 1, wherein the optical sensor is disposed off-axis with respect to the object.

6. The system of claim 1, wherein at least one of the first in-coupling element or the first out-coupling element includes a diffraction grating.

7. The system of claim 1, wherein:
the second in-coupling element is configured to couple the visible light representing a virtual image into the waveguide as an in-coupled visible light that propagates inside the waveguide via total internal reflection, and
the second out-coupling element is configured to couple the in-coupled visible light out of the waveguide as one or more output visible lights toward an eye-box region of the system.

8. The system of claim 1, wherein along a width direction of the waveguide, a width of the first in-coupling element is smaller than a width of the second out-coupling element.

9. The system of claim 1, wherein the light source is a first light source, and the system further comprises:
a second light source disposed facing the second portion of the waveguide, and configured to output the visible light toward the second in-coupling element.

10. The system of claim 1, wherein the optical sensor and the object are disposed at the same side of the waveguide, or at different sides of the waveguide.

11. A system, comprising:

a light source configured to emit an infrared ("IR") light for illuminating an object; and a waveguide imaging assembly comprising:

a first waveguide comprising a first in-coupling element disposed at a first portion of the first waveguide and a first out-coupling element disposed at a second portion of the first waveguide, a second waveguide stacked with the first waveguide, the second waveguide comprising a second out-coupling element disposed at a first portion of the second waveguide, and a second in-coupling element disposed at a second portion of the second waveguide, and an optical sensor disposed facing the first out-coupling element, wherein:

the first in-coupling element is configured to couple the IR light reflected by the object into the first waveguide, the first waveguide is configured to guide the IR light to propagate toward the first out-coupling element through total internal reflection, and the first out-coupling element is configured to couple the IR light out of the first waveguide toward the optical sensor, the second in-coupling element and the second out-coupling element are configured to deflect a visible light, and substantially transmit, with negligible deflection, the IR light, and the optical sensor is configured to generate a tracking signal of the object based on the IR light output from the first waveguide.

12. The system of claim 11, wherein:

the second in-coupling element is configured to couple the visible light representing a virtual image into the second waveguide as an in-coupled visible light that propagates inside the second waveguide via total internal reflection, and the second out-coupling element is configured to couple the in-coupled visible light out of the second waveguide as one or more output visible lights toward an eye-box region of the system.

13. The system of claim 11, wherein along a width direction of the second waveguide, a width of the first in-coupling element is smaller than a width of the second out-coupling element.

14. The system of claim 11, wherein the light source is a first light source, and the system further comprises:

a second light source disposed facing the second portion of the second waveguide, and configured to output the visible light toward the second in-coupling element.

\* \* \* \* \*